United States Patent
Nakamura et al.

(10) Patent No.: US 6,809,498 B2
(45) Date of Patent: Oct. 26, 2004

(54) POWER SUPPLY APPARATUS AND ELECTRONIC EQUIPMENT

(75) Inventors: Chiaki Nakamura, Chiba (JP); Kazuo Kato, Chiba (JP); Yutaka Saitoh, Tokyo (JP); Kazuo Matsubara, Tokyo (JP); Tsutomu Tanaka, Tokyo (JP)

(73) Assignee: Seiko Instruments Inc., Chiba (JP)

(*) Notice: Subject to any disclaimer, the term of this patent is extended or adjusted under 35 U.S.C. 154(b) by 0 days.

(21) Appl. No.: 10/147,420

(22) Filed: May 16, 2002

(65) Prior Publication Data

US 2002/0190689 A1 Dec. 19, 2002

(30) Foreign Application Priority Data

May 18, 2001 (JP) .......................................... 2001-148743
May 7, 2002 (JP) .......................................... 2002-131913

(51) Int. Cl.$^7$ ............................................. H01M 10/44
(52) U.S. Cl. .......................... 320/108; 320/114; 320/137
(58) Field of Search ................................ 320/108, 107, 320/112, 114, 115, 127, 128, 137

(56) References Cited

U.S. PATENT DOCUMENTS

| | | | | |
|---|---|---|---|---|
| 3,980,996 A | * | 9/1976 | Greenspan et al. | 340/539.3 |
| 4,949,085 A | * | 8/1990 | Fisch et al. | 340/7.52 |
| 4,965,569 A | * | 10/1990 | Bennett et al. | 340/7.57 |
| 5,455,579 A | * | 10/1995 | Bennett et al. | 341/110 |
| 5,629,678 A | * | 5/1997 | Gargano et al. | 340/573.4 |
| 5,740,525 A | * | 4/1998 | Spears | 455/259 |
| 5,796,827 A | | 8/1998 | Coppersmith et al. | 380/9 |
| 5,999,138 A | * | 12/1999 | Ponce de Leon | 343/745 |
| 6,047,163 A | | 4/2000 | Miyoshi | 455/31.1 |
| 6,166,518 A | | 12/2000 | Echarri et al. | 320/106 |

FOREIGN PATENT DOCUMENTS

| | | |
|---|---|---|
| DE | 4442677 | 5/1996 |
| DE | 19617102 | 10/1997 |
| DE | 10045087 | 4/2002 |
| JP | 10146077 | 5/1998 |
| WO | 91007001 | 5/1991 |

* cited by examiner

Primary Examiner—Bao Q. Vu
(74) Attorney, Agent, or Firm—Adams & Wilks

(57) ABSTRACT

To provide a power supply apparatus that replaces a dry battery by detecting electric field energy in a free space, rectifying the energy, extracting the energy as electric power, and accumulating the electric power. In particular, there is provided a power supply apparatus that is useful for a portable electronic equipment. An electromagnetic energy conversion unit collects a radio wave propagating in the air and converts collected electromagnetic energy into electric power. A rectifying unit generates electric power having a DC waveform by rectifying electric power having an AC waveform and charges the rectified electric power having the DC waveform into a secondary battery. An electric load is supplied with the rectified electric power having the DC waveform or with electric power having a DC waveform discharged from the secondary battery.

101 Claims, 35 Drawing Sheets

INPUT

OUTPUT

FIG.16
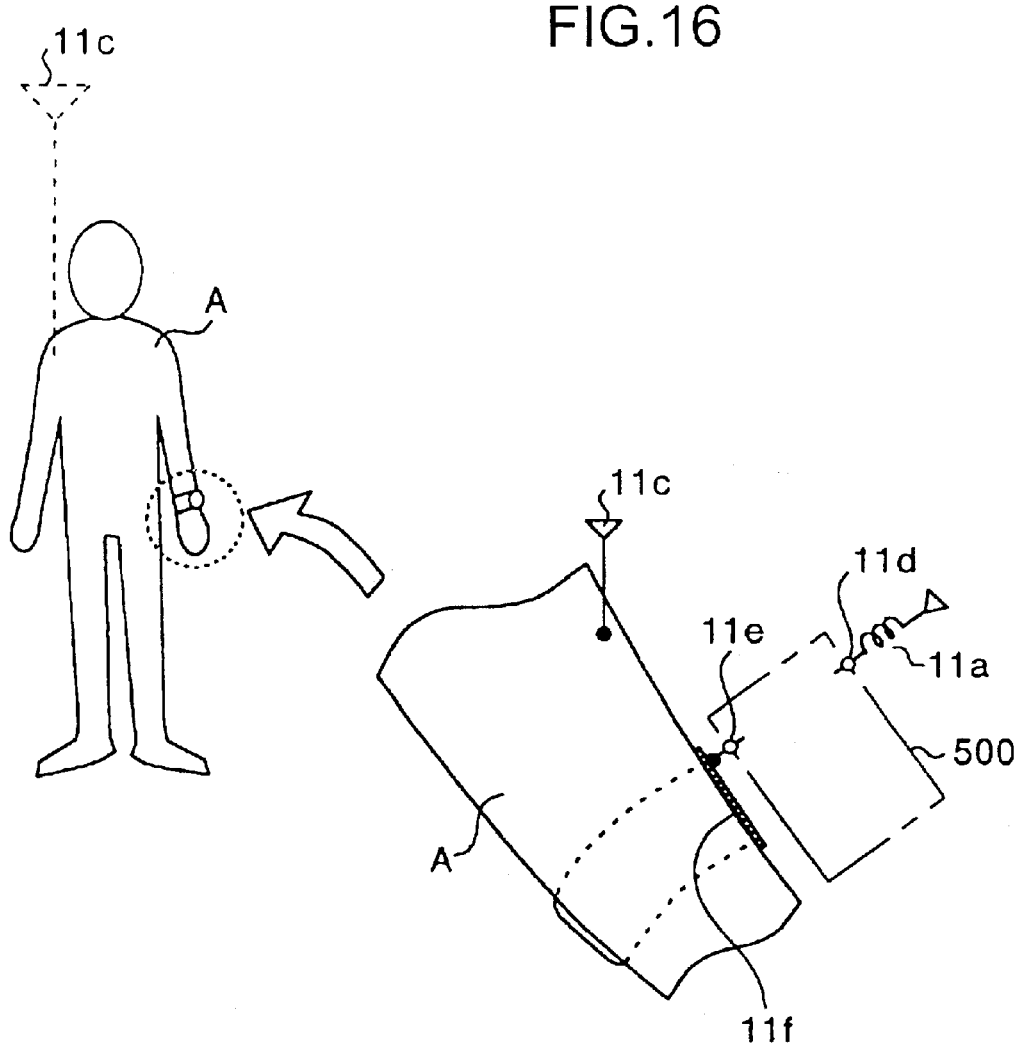
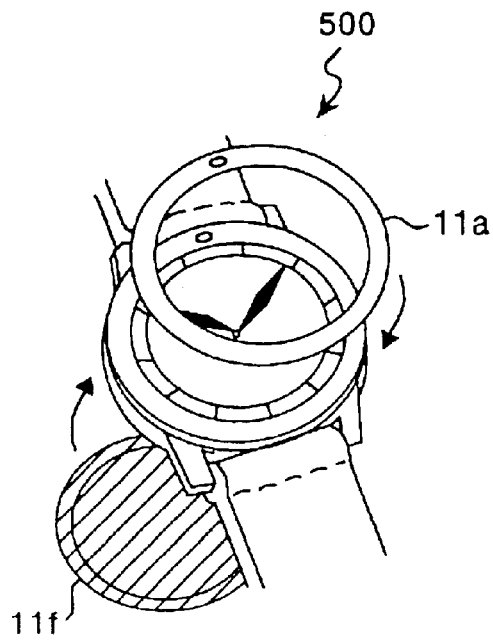
FIG.17

FIG.24
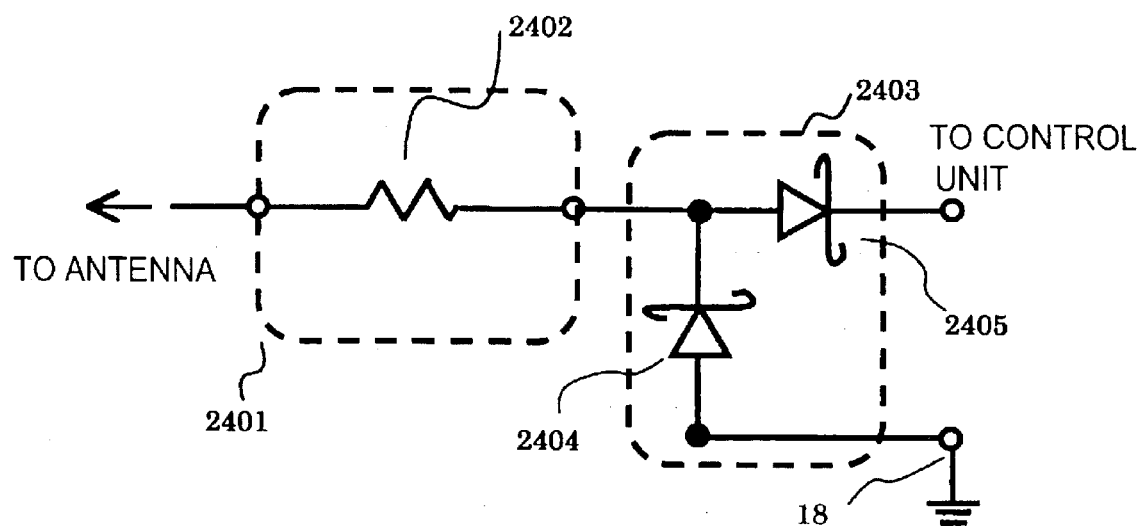
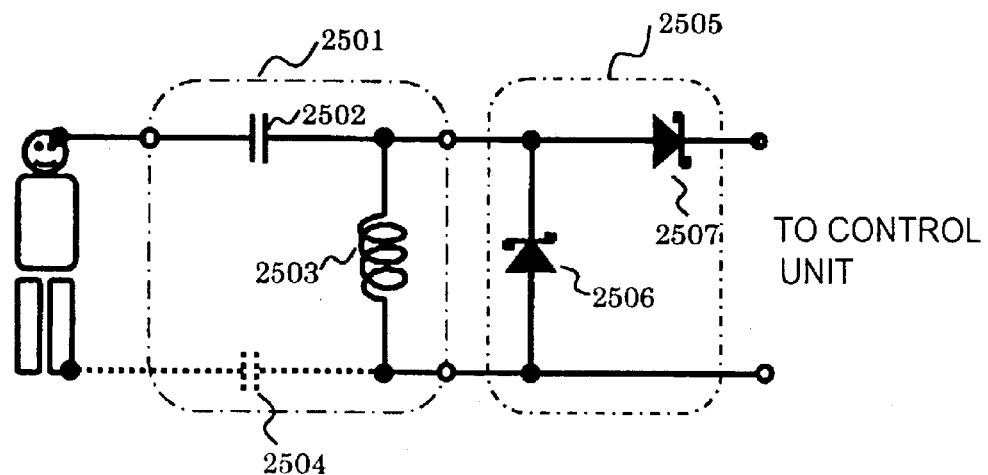
FIG.25

DIRECTION OF CURRENT

DIRECTION OF CURRENT OF IMAGE ANTENNA

GROUND

GROUND

FIG.34A
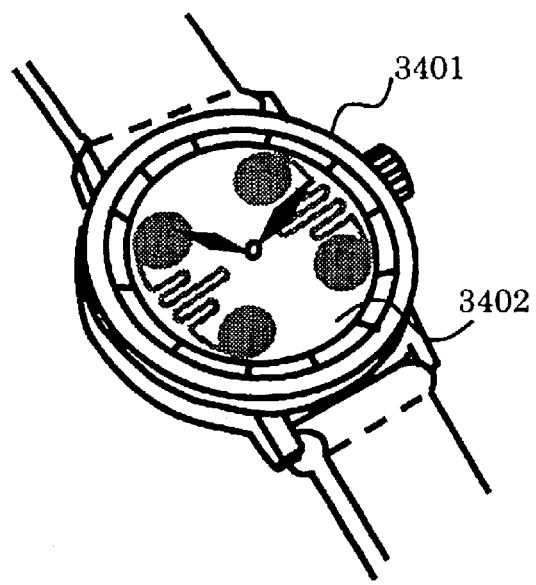
FIG.34B
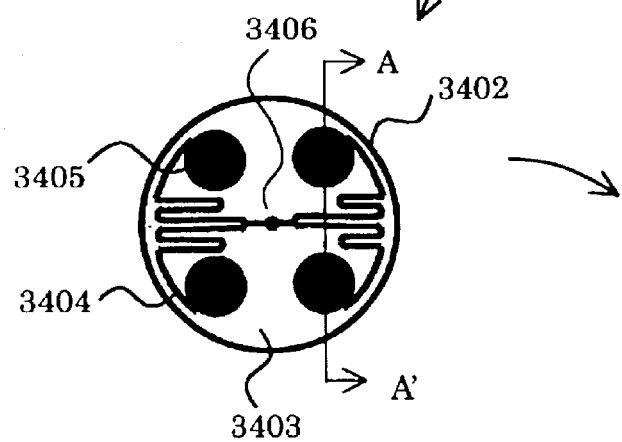
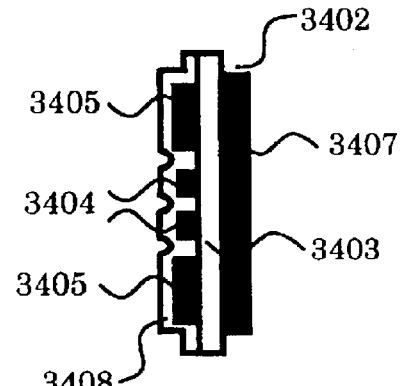
FIG.34C
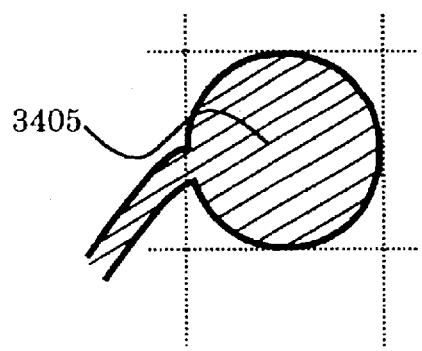
FIG.34D

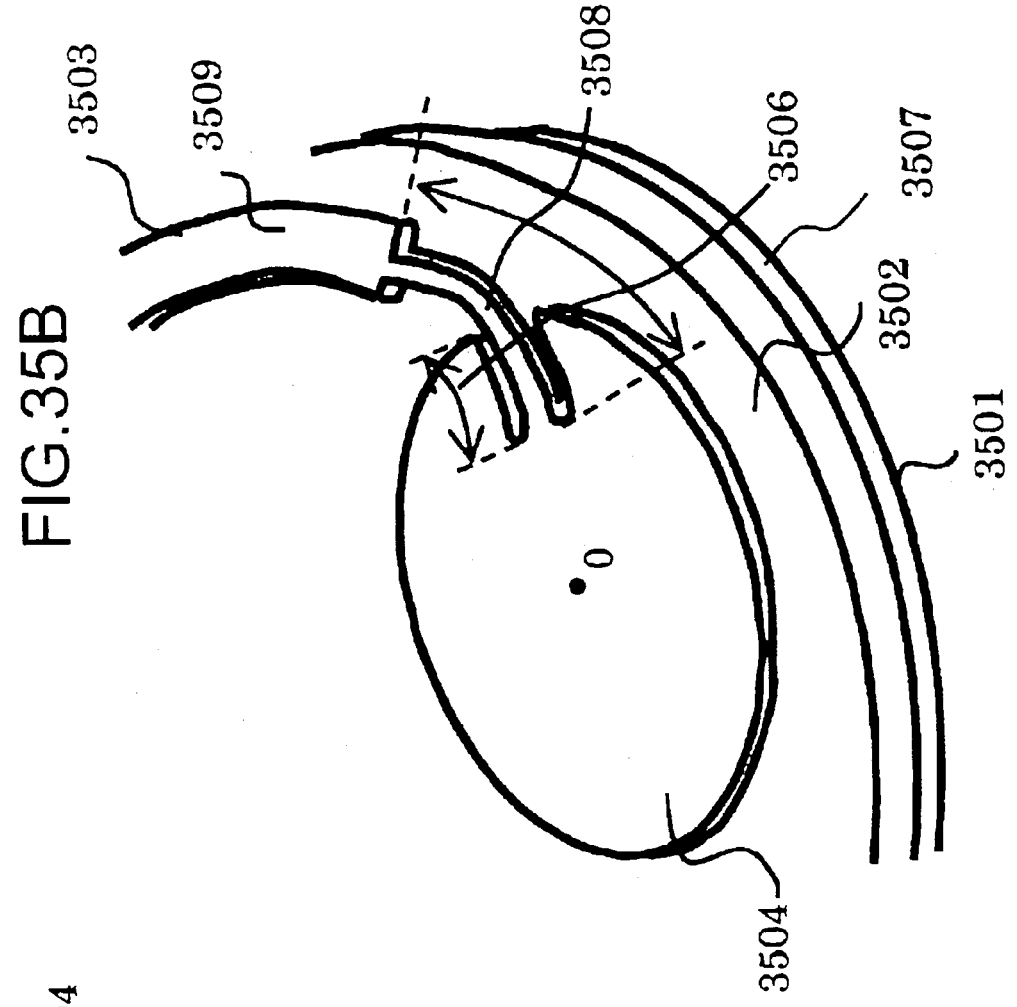
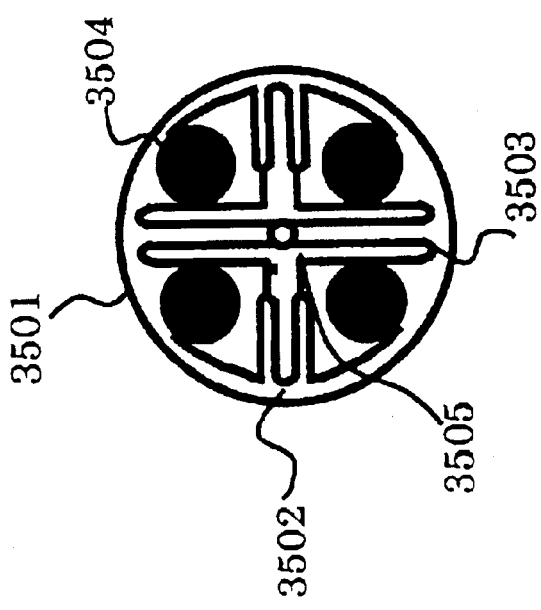

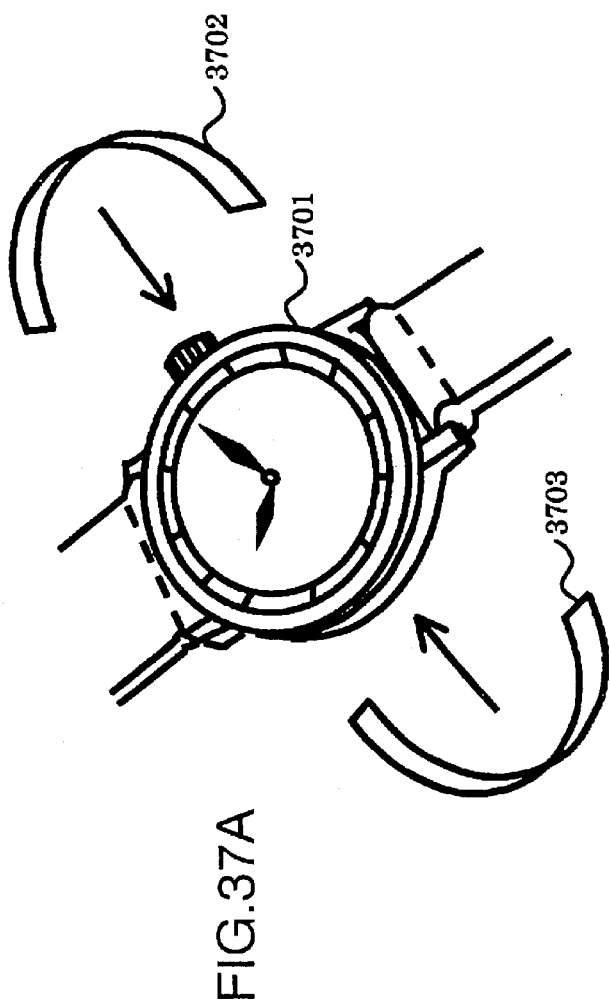
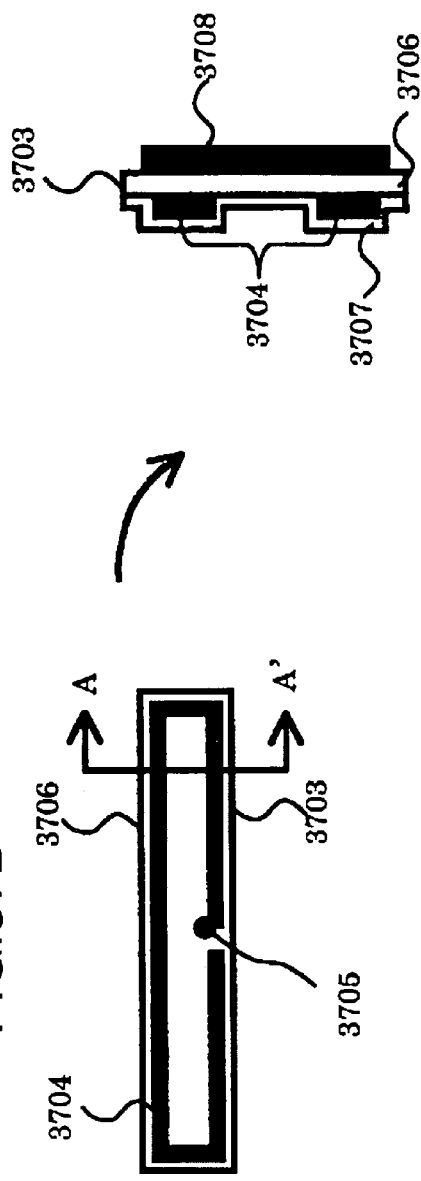
FIG.37A
FIG.37B
FIG.37C

POWER SUPPLY APPARATUS AND ELECTRONIC EQUIPMENT

BACKGROUND OF THE INVENTION

1. Field of the Invention

The present invention relates to a power supply apparatus for electronic equipment, and more specifically relates to a power supply apparatus that is useful for supplying electric power to a portable electronic equipment, such as a wrist watch or a mobile telephone, and to electronic equipment that uses the power supply apparatus.

2. Description of the Prior Art

In general, a battery is provided in portable electronic equipment, such as a wrist watch or a mobile telephone, to supply electric power thereto. For instance, a button-type (coin-type) battery is used for a wrist watch and a rechargeable battery that is charged using a transmitted AC power supply is used for a mobile telephone.

However, in the case where there is used a non-rechargeable battery such as a button-type battery or a dry battery, a supply voltage is gradually reduced due to a usage thereof or a secular variation, which leads to a problem that it is required to frequently perform battery exchanging.

On the other hand, in the case of a rechargeable battery, it is necessary to remove the battery from the casing of a portable electronic equipment and set the battery in a battery charger. Also, in the case where battery charging is performed by setting the battery in the charger without removing the battery from the casing, it takes around several to 10 hours to perform the battery charging. As a result, there occurs a problem that the charging operation is burdensome.

Incidentally, the number of portable communication terminals has been rapidly increased in recent years, with the result that radio waves (electric fields, magnetic fields) are surely increased in urban spaces. In addition, the usable frequencies are shifted to high frequencies, which results in a situation where spatial electric fields have become higher than ever. In more detail, new usable frequencies are shifted to a GHz band or higher, which leads to a situation where the electric fields exceed 100 dB$\mu$V/m in general. It is believed that this trend will be continuously accelerated at a considerable momentum for the moment by the introduction of the WCDMA system into the mobil telephone field and the widespread use of cordless telephones based on the PHS system at homes in the future.

SUMMARY OF THE INVENTION

Consequently, in view of the problems and the situation of spatial electric fields described above, the object of the present invention is to provide a power supply apparatus that replaces a dry battery by detecting/rectifying electric field energy in a free space, extracting the energy as electric power, and accumulating the electric power. In particular, the object of the present invention is to provide a power supply apparatus that is useful for a portable electronic equipment.

In order to achieve the above-mentioned object, a power supply apparatus according to the present invention is characterized by comprising: an electromagnetic energy conversion unit for collecting electromagnetic energy of a radio wave, which propagates in the air, and converting the electromagnetic energy into electric power; a rectifier unit for rectifying the electric power having an AC waveform inputted from the electromagnetic energy conversion unit and outputting electric power having a DC waveform; a storage battery that is charged with the rectified electric power having the DC waveform and discharges the charged electric power; and a control unit for controlling the charging and discharging of the storage battery.

Therefore, it is possible to collect a radio wave propagating in the air, convert collected electromagnetic energy into electric power, generate electric power having a DC waveform by rectifying electric power having an AC waveform, charge the rectified electric power having the DC waveform into a storage battery, and supply an electric load with the rectified electric power having the DC waveform or with electric power having a DC waveform discharged from the storage battery.

In this case, it is possible to employ a structure such that a power supply apparatus comprises: a first input terminal that contacts a human body and inputs the electromagnetic energy of the radio wave propagating in the air via the human body; and a second input terminal that connects a ground of an electronic circuit within the apparatus to the human body, wherein the rectifier unit rectifies the electric power having the AC waveform inputted from the electromagnetic energy conversion unit and the input terminal, and outputs the electric power having the DC waveform.

Also, a power supply apparatus according to the present invention is characterized by comprising: an electromagnetic energy conversion unit for collecting electromagnetic energy of a radio wave, which propagates in the air, and converting the electromagnetic energy into electric power; an input terminal that contacts a human body and inputs electromagnetic energy of a radio wave propagating in the air via the human body; a rectifier unit for rectifying the electric power having an AC waveform inputted from the electromagnetic energy conversion unit or the input terminal and outputting electric power having a DC waveform; a storage battery that is charged with the rectified electric power having the DC waveform and discharges the charged electric power; and a control unit for controlling the charging and discharging of the storage battery.

Also, a power supply apparatus according to the present invention is characterized by comprising: an input terminal that contacts a human body and inputs electromagnetic energy of a radio wave propagating in the air via the human body; a rectifier unit for rectifying electric power having an AC waveform inputted from the input terminal and outputting electric power having a DC waveform; a storage battery that is charged with the rectified electric power having the DC waveform and discharges the charged electric power; and a control unit for controlling the charging and discharging of the storage battery.

In this case, a structure may be adopted such that the input terminal includes a positive electrode terminal and a negative electrode terminal that contact the human body, and the positive electrode terminal and the negative electrode terminal are formed so that one of the terminals has a circular shape, whose center is the other of the terminals, or both of the terminals have a dotted shape.

Also, a structure may be adopted such that a power supply apparatus further comprises a matching unit that establishes impedance matching between a rectifier unit side and one of the electromagnetic energy conversion unit and the input terminal.

Also, a structure may be adopted such that the matching unit is constructed from a resistance.

Also, a structure may be adopted such that the matching unit is a serial resonance circuit constructed from a capacitor and an inductor.

Also, a structure may be adopted such that the matching unit is a parallel resonance circuit constructed from a capacitor and an inductor.

Also, a structure may be adopted such that the control unit includes: two backflow prevention rectifier elements that perform rectification toward the storage battery at a subsequent stage; and a voltage step-up circuit that steps up, to a predetermined value, a voltage of the electric power having the DC waveform connected to an input terminal side of one of the backflow prevention rectifier elements.

Also, a structure may be adopted such that the control unit includes: an input voltage monitoring means for monitoring an input voltage of the electric power having the DC waveform inputted from the rectifier unit; and a monitoring means for, if the input voltage is higher than the predetermined value, terminating an operation of the voltage step-up circuit so that the inputted electric power having the DC waveform is directly supplied to the storage battery and, if the input voltage is lower than the predetermined value, controlling an operation of the voltage step-up circuit so that the input voltage is stepped up by the voltage step-up circuit and is supplied to the storage battery.

Also, a structure may be adopted such that the control unit further includes a storage battery voltage monitoring means for monitoring a storage battery voltage on the storage battery side, and if the storage battery voltage is a predetermined value or more, the monitoring means terminates driving of the voltage step-up circuit.

Also, a structure may be adopted such that the voltage step-up circuit provided for the control unit is of a switched capacitor type constructed by connecting a switch element to a capacitor, and the voltage step-up circuit is provided with an oscillation circuit that oscillates a clock signal for controlling timing of a step-up operation of a voltage.

Also, a structure may be adopted such that a buffer circuit is provided to follow the oscillation circuit, the buffer circuit amplifying a potential at one end of the capacitor in accordance with the clock signal, a power supply of the buffer circuit is connected to an output side of the rectifier unit, and the buffer circuit is operated by the electric power having the DC waveform that is transmitted from the electromagnetic energy conversion unit via the matching unit and the rectifier unit.

Also, a structure may be adopted such that the electromagnetic energy conversion unit is a flat antenna obtained by overlaying a back plane, an insulating layer, and an antenna conductor on a cross-sectional lower layer.

Also, a structure may be adopted such that the antenna conductor is formed using one of a circular pattern, a rectangular pattern, and another flat pattern.

Also, a structure may be adopted such that the antenna conductor has a construction where a wiring pattern is allowed to extend from the flat pattern and is arranged at a position at which the wiring pattern also opposes the back plane.

Also, a structure may be adopted such that the flat pattern and the wiring pattern are formed so as to become a same plane.

Also, a structure may be adopted such that the flat pattern and the wiring pattern are formed so as to have one of a stepped surface and an inclined surface.

Also, a structure may be adopted such that the wiring pattern is arranged on the insulating layer.

Also, a structure may be adopted such that the flat antenna is formed so as to have one of a flat plate shape, a bent shape, and a ring shape.

Also, a structure may be adopted such that the electromagnetic energy conversion unit is one of a whip antenna using a spiral electric wire and a dielectric antenna using a dielectric.

Also, a structure may be adopted such that the rectifier unit includes a half wave voltage doubler rectifier circuit constructed from a first diode and a second diode that are connected in a forward direction.

Also, a structure may be adopted such that If/IR of one of the first and second diodes that is connected to the storage battery side is smaller than If/IR of the other of the first and second diodes.

Also, a structure may be adopted such that the rectifier unit includes a single diode and an inductor that gives a bias to the diode.

Also, a structure may be adopted such that the rectifier unit includes: a diode whose anode is connected to a ground side and cathode is connected to an AC signal side; a $\lambda/4$ line whose one end is connected to a cathode of the diode; a conductor that is arranged so as to oppose the $\lambda/4$ line; and a capacitor that is connected between the other end of the $\lambda/4$ line and a ground.

Also, a structure may be adopted such that the rectifier unit includes a MOSFET that substitutes for the diode.

Also, an electronic equipment according to the present invention has a structural characteristic of including a power source apparatus of the present invention, the power source apparatus supplying an electric power having a DC waveform to the electronic equipment.

BRIEF DESCRIPTION OF THE SEVERAL VIEWS OF THE DRAWINGS

A preferred form of the present invention is illustrated in the accompanying drawings in which:

FIG. 16 is a drawing illustrating a concept of an electronic equipment according to a fifth embodiment mode of the present invention;

FIG. 17 is a perspective view illustrating an example of the electronic equipment (electronic wrist watch) according to the fifth embodiment mode of the present invention;

FIG. 24 is a circuit diagram illustrating a construction of a matching unit used in an embodiment mode of the present invention;

FIG. 25 is a circuit diagram illustrating another construction of the matching unit used in the embodiment mode of the present invention;

FIGS. 34A–34D are drawings showing an antenna used by an electronic equipment according to an embodiment mode of the present invention;

FIGS. 35A an 35B are drawings showing another antenna used by the electronic equipment according to the embodiment mode of the present invention;

FIGS. 37A–37C are drawings showing still another antenna used by the electronic equipment according to the embodiment mode of the present invention;

DETAILED DESCRIPTION OF THE PREFERRED EMBODIMENTS

The present invention will be described in detail below with reference to the drawings. Note that there is no intention to limit the present invention to the following embodiment modes.

(First Embodiment Mode)

Figure 1:
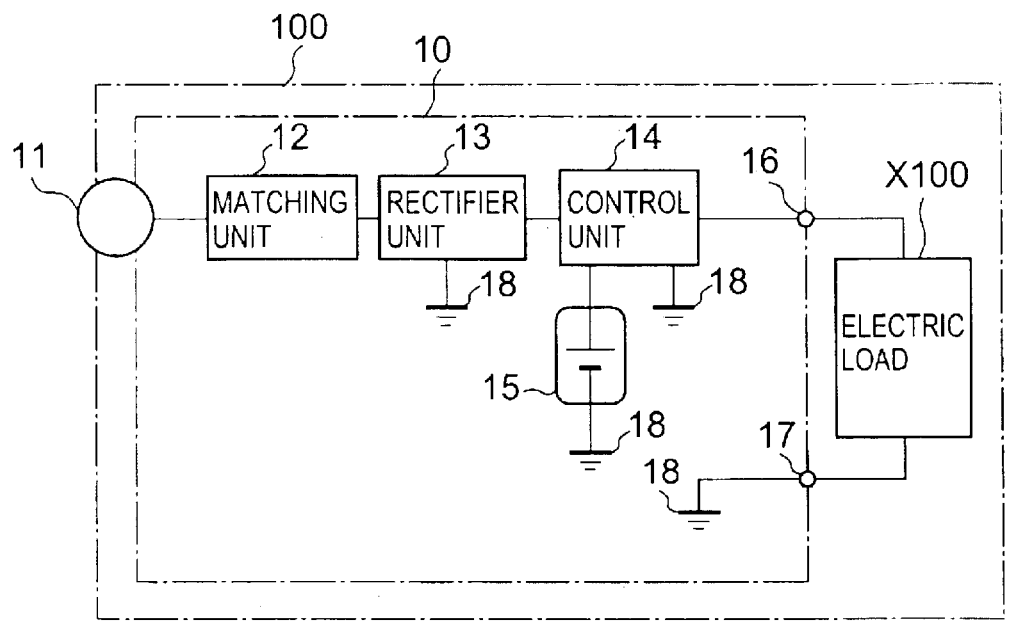
FIG. 1 is a block diagram illustrating a functional construction of an electronic equipment according to a first embodiment mode of the present invention.

FIG. 1 is a block diagram illustrating the functional construction of an electronic equipment according to the first embodiment mode of the present invention. This electronic equipment 100 includes a power supply apparatus 10 that is unique to the first embodiment mode of the present invention, and an electric load X100 such as an oscillation circuit for a watch or a step motor driving circuit for electrically processing various kinds of functions such as a clock function or a telephone function of a wrist watch, a mobile telephone, or the like.

The power supply apparatus 10 extracts electrical energy from a radio wave (electric field, magnetic field) propagating in the air, performs charging, and supplies the electric load X100 with electric power. This power supply apparatus 10 mainly includes an electromagnetic energy conversion unit 11, a matching unit 12, a rectifier unit 13, a control unit 14, and a secondary battery 15.

This power supply apparatus 10 is connected to the electric load X100 by an output terminal 16 and a ground (GND) terminal 17 of the apparatus. The terminal 16 is connected to the output side from the control unit 14. Also, the GND terminal 17 is connected to the GND 18 of the electronic circuit within the apparatus. Also, to this GND 18, there are connected the rectifier unit 13, the control unit 14, and the secondary battery 15.

The electromagnetic energy conversion unit 11 is an antenna or an aerial wire and is means that reacts to a radio wave (electric field, magnetic field) and extracts the radio wave as electricity. For instance, as will be described later, examples of this unit are a spiral antenna and an antenna obtained through ceramic-type capacity coupling or the like.

The matching unit 12 is means for establishing impedance matching (LCR resonance) between the electromagnetic energy conversion unit 11 that receives a radio wave propagating in the air and a DC circuit side at the subsequent stage (the rectifier unit 13 and the following units), thereby extracting electrical energy with efficiency. For instance, as will be described later, this unit 12 is constructed of capacitors.

The rectifier unit 13 is means for converting alternating current caused by a radio wave into a direct current and extracting a positive potential with reference to the GND 18. The control unit 14 is means for controlling the charging of the secondary battery 15 and controlling a voltage supplied to the electric load X100.

The secondary battery 15 is charged and supplies electric power to the electric load X100 under the control by the control unit 14. For instance, this battery 15 is a rechargeable battery of Ni-MH type or Li-ion type.

Next, how the power supply apparatus 10 operates will be described. First, the electromagnetic energy conversion unit 11 inputs a radio wave, converts it into electric power having an AC waveform, and transmits the electric power having the AC waveform to the matching unit 12. The matching unit 12 establishes impedance matching between the electromagnetic energy conversion unit 11 at a previous stage and the rectifier unit 13 and the following units at the subsequent stage, and transmits the extracted electric power having the AC waveform to the rectifier unit 13. Here, as to the impedance matching, the radio wave propagating in the air are basically transmitted at 50 Ω in many cases, but the impedance in a free space is 120 π (370 Ω) even if the radio wave comes flying from a distant place. The impedance matching means that the electromagnetic energy conversion unit, which is to say an antenna unit, establishes matching for this radio wave as an LCR resonance circuit in a preferable manner where SWR (reflected waves) are reduced.

The present invention uses a construction where the rectifier unit is provided immediately after the electromagnetic energy conversion unit, so that the power transmission efficiency impedance does not become 50 Ω. Strictly speaking, the unit that establishes matching at 50 to 370 Ω with respect to the air is the electromagnetic energy conversion unit, that is, the antenna unit. The rectifier unit 13 converts the electric power having an AC waveform into electric power, which has a DC waveform with a positive potential, with reference to the GND 18 and transmits the electric power having the DC waveform to the control unit 14. The control unit 14 charges the secondary battery 15 using the electric power having the DC waveform.

Figure 2:
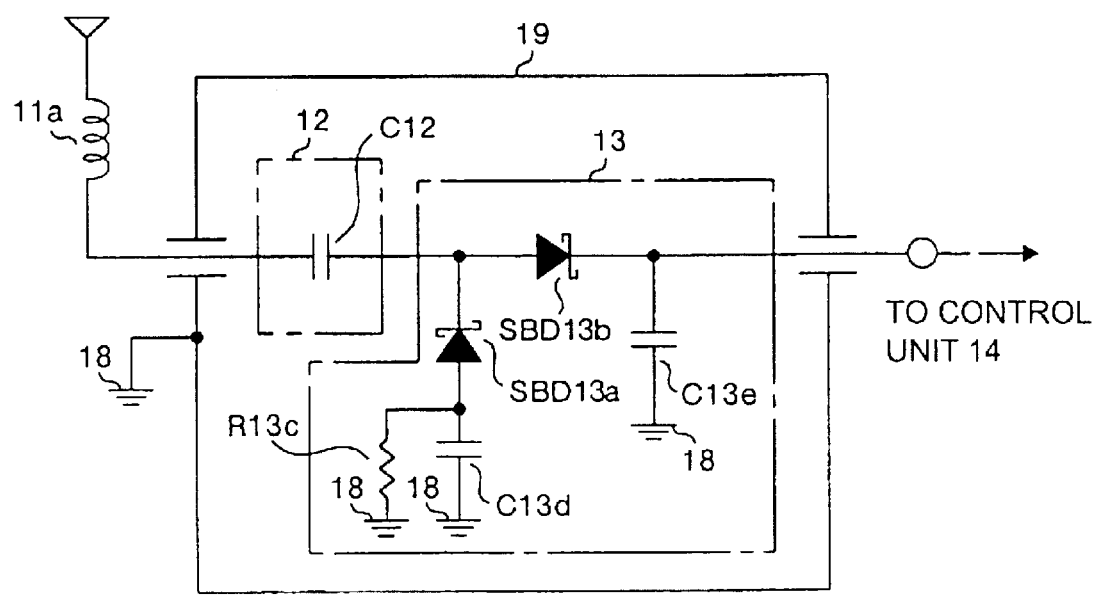
FIG. 2 is a circuit diagram illustrating a circuit construction of a matching unit and a rectifier unit of a power supply apparatus shown in FIG. 1.

FIG. 2 is a circuit diagram illustrating the circuit construction of the matching unit and the rectifier unit of the power supply apparatus shown in FIG. 1. The electromagnetic energy conversion unit 11 shown in FIG. 1 is constructed of an antenna 11$a$ of electric wire type (L among LCR is symbolized). Note that the outgoing line of the antenna 11$a$ is electrically separated and insulated from a shielding casing 19 that is made of a metal and surrounds the matching unit 12 and the rectifier unit 13. Also, the casing 19 is connected to the GND 18 and is grounded.

The matching unit 12 is constructed of a capacitor C12. As to this capacitor C12, the antenna 11$a$ and the rectifier unit 13 are C-connected and a space therebetween is DC-separated from each other, thereby preventing a situation where it becomes impossible to extract electric power due to the leakage at SBDs 13$a$ and 13$b$ to be described later.

The rectifier unit 13 is constructed of the SBDs (Schottky Barrier Diodes) 13$a$ and 13$b$, a resistor R13$c$, and capacitors C13$e$ and C13$d$. The SBDs 13$a$ and 13$b$ are connected parallel to each other with respect to the capacitor C12 of the matching unit 12. To the SBD 13$a$, there are connected the resistor R13$c$ and the capacitor C13$d$ in series. The resistor R13$c$ and the capacitor C13$d$ are each connected to the GND 18 and are grounded.

Also, the capacitor C13$e$ is connected to the SBD 13$b$ parallel to the wiring on the output side connected to the control unit 14. This capacitor C13$e$ is connected to the GND 18 and is grounded. That is, the SBD 13$a$ is connected so that a rectifying action is caused in a direction from the GND side to the SBD 13$b$ side. Also, the SBD 13$b$ is connected so that a rectifying action is caused in a direction from the antenna side to the control unit 14 side at the subsequent stage. Accordingly, electric power having an AC waveform passing through the capacitor C12 is subjected to half wave voltage doubler rectification by the SBDs 13$a$ and 13$b$, the resistor R13$c$, and the capacitors C13$e$ and C13$d$, and is transmitted to the control unit 14 as electric power having a DC waveform.

Figure 3:
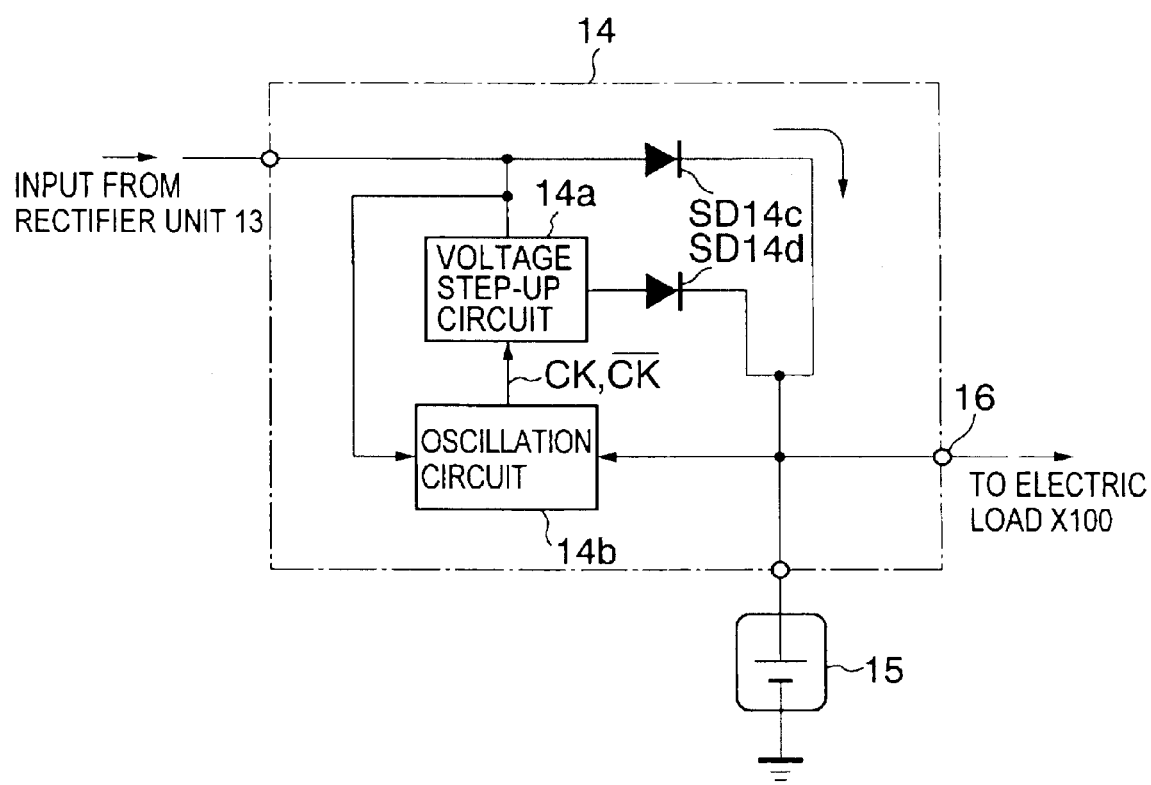
FIG. 3 is a circuit diagram illustrating a circuit construction of a control unit of the power supply apparatus shown in FIG. 1.

FIG. 3 is a circuit diagram illustrating the circuit construction of the control unit of the power supply apparatus shown in FIG. 1. This control unit 14 is constructed of a voltage step-up circuit 14$a$, an oscillation circuit 14$b$, and SDs (Silicon diodes) 14$c$ and 14$d$. The voltage step-up circuit 14$a$ is a circuit that performs a step-up operation based on a clock signal oscillated by the oscillation circuit 14$b$ in the case where a voltage having a DC waveform transmitted from the rectifier unit 13 is smaller than a predetermined value.

The oscillation circuit 14$b$ is a circuit that oscillates a clock signal. The SD 14$c$ directly transmits the DC electric power that is transmitted from the rectifier unit 14$c$ to the secondary battery 15 side in the case where the DC electric power is at least equal to the predetermined value. The SD 14$d$ transmits the electric power having the DC waveform stepped up by the voltage step-up circuit 14$a$ to the secondary battery 15 side in the case where the voltage of the electric power having the DC waveform transmitted from the rectifier unit 13 does not exceed the predetermined value.

With this construction, in the case where the voltage of electric power having a DC waveform generated from a radio wave is at least equal to the predetermined value, the secondary battery 15 is charged with the electric power having the DC waveform generated from the radio wave. Also, in the case where the voltage of the electric power having the DC waveform generated from the radio wave does not exceed the predetermined value, the secondary battery 15 is charged by stepping up the voltage using the voltage step-up circuit 14a. Accordingly, the secondary battery 15 is charged with the radio wave. Also, required electric power having a DC waveform is given to the electric load X100 using the radio wave.

In particular, in the case where the voltage does not exceed the predetermined value, the charging is performed after a step-up operation. Therefore, for instance, by setting the predetermined value to a minimum voltage that is required by the electric load X100, it becomes possible to have the electric load X100 operate normally even if the electromagnetic energy generated from a radio wave is somewhat low.

Figure 4:
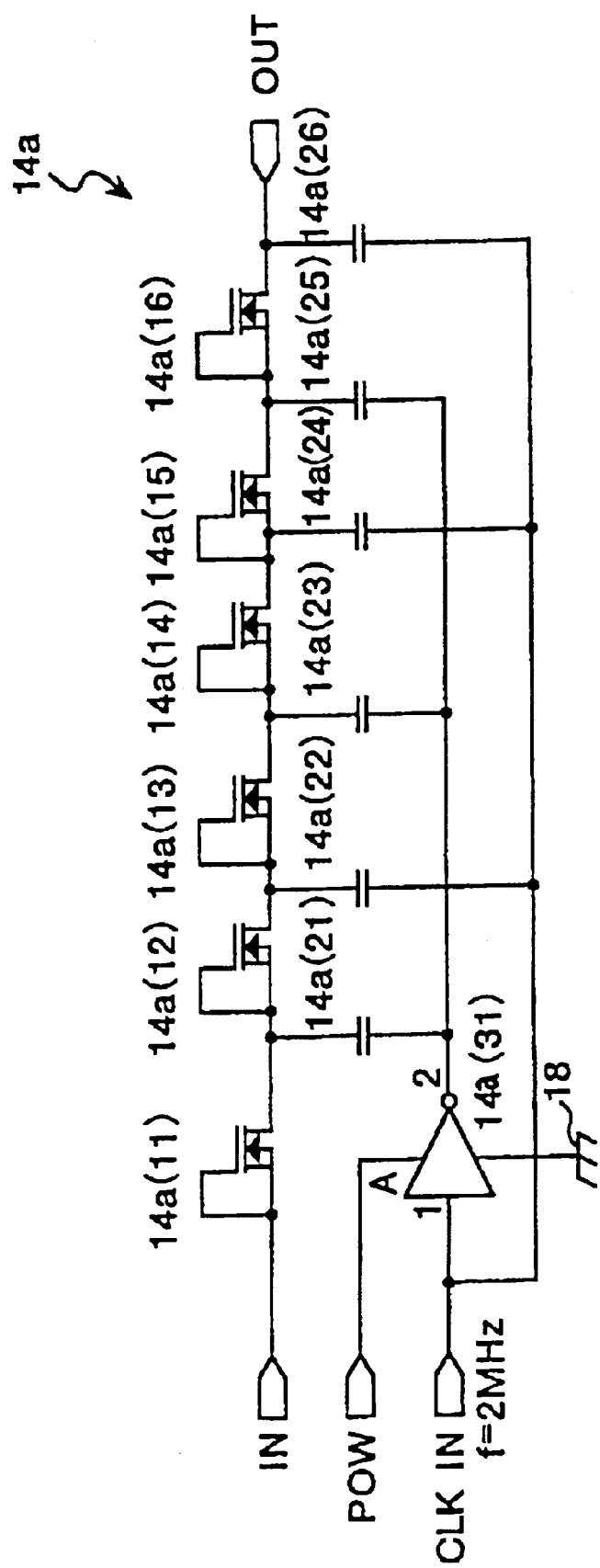
FIG. 4 is a circuit diagram illustrating a circuit construction of a voltage step-up circuit of the control unit shown in FIG. 3.

FIG. 4 is a circuit diagram illustrating the circuit construction of the voltage step-up circuit of the control unit shown in FIG. 3. This voltage step-up circuit 14a is a switched capacitor circuit of a charge pump (bucket relay) type using an NchMOSFET (depression type) (hereinafter referred to as the "transistor Tr") and a capacitor, and accumulates electric charges in a capacitor having a large capacity at a last stage.

Transistors Tr 14a (11), 14a (12), 14a (13), 14a (14), 14a (15), and 14a (16) are connected in series between the rectifier unit 13 side (in) and the secondary battery 15 side (out). The capacitors C14a (21), 14a (22), 14a (23), 14a (24), 14a (25), and 14a (26) are alternately connected parallel to each other with respect to wiring connecting the transistors Tr 14a (11), 14a (12), 14a (13), 14a (14), 14a (15), and 14a (16). Among these, the capacitors C14a (21), 14a (23), and 14a (25) are connected to the output side of the inverter 14a (31). The capacitors C14a (22), 14a (24), and 14a (26) are connected to the input side of the inverter 14a (31) and are connected to the GND 18.

The inverter 14a (31) does not output a clock signal in the case where a clock signal is output from the oscillation circuit 14b. Accordingly, in this case, the clock signal output from the oscillation circuit 14b is inputted into the capacitors C14a (23), 14a (25), and 14a (27) as it is. On the other hand, this inverter 14a (31) outputs a clock signal in the case where no clock signal is output from the oscillation circuit 14b. Accordingly, in this case, the clock signal output from the inverter 14a (31) is input into the capacitors C14a (21), 14a (23), and 14a (25).

The voltage step-up circuit 14a performs a step-up operation. To do so, the voltage step-up circuit 14a controls the charging and discharging of the capacitors C14a (21), 14a (22), 14a (23), 14a (24), 14a (25), and 14a (26) using a clock signal output by the oscillation circuit 14b and an inverting amplifier 14a (31). Also, the voltage step-up circuit 14a turns on/off the transistors Tr 14a (11), 14a (12), 14a (13), 14a (14), 14a (15), and 14a (16) in accordance with this charging and discharging.

Figure 5:
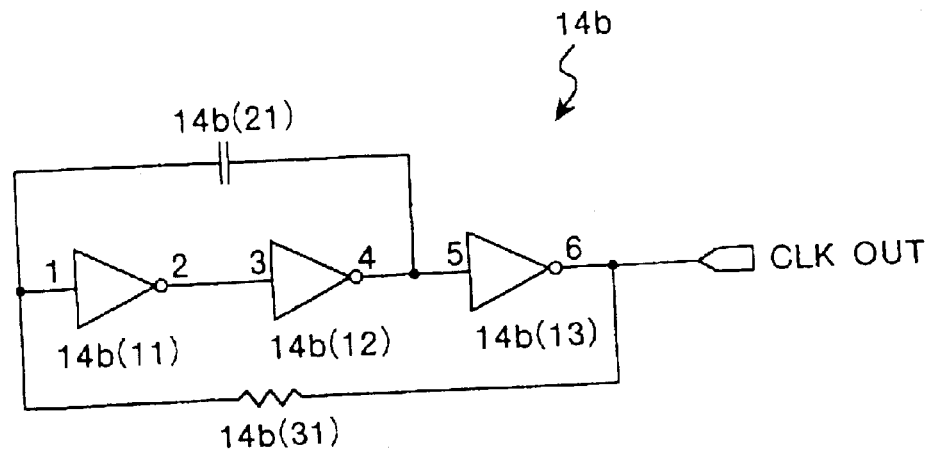
FIG. 5 is a circuit diagram illustrating a circuit construction of an oscillation circuit of the control unit shown in FIG. 3.

FIG. 5 is a circuit diagram illustrating a circuit construction of the oscillation circuit of the control unit shown in FIG. 3. As to this oscillation circuit 14b, inverters 14b (11), 14b (12), and 14b (13) are connected in series to realize a function of oscillating a clock signal for operating the voltage step-up circuit 14a described above (see FIGS. 3 and 4).

Also, the capacitor C14b (21) is connected to the wiring that extends from between the output terminal side of the inverter 14b (12) and the input terminal side of the inverter 14b (13), and is connected to the input terminal side of the inverter 14b (11). Further, a resistor R14b (31) is connected to the wiring that connects the input terminal side of the inverter 14b (11) and the input terminal side of the inverter 14b (13).

Figure 6:
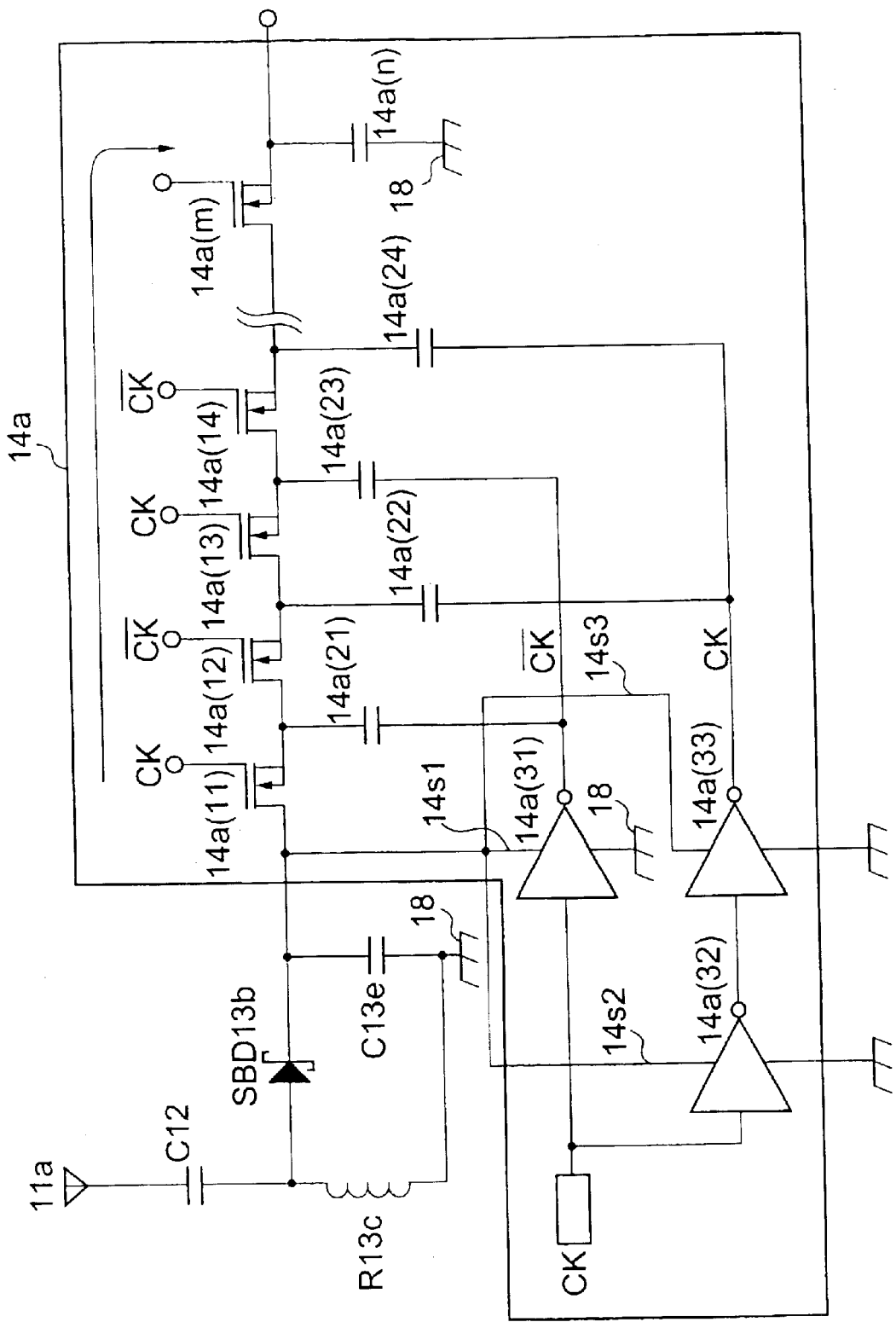
FIG. 6 is a circuit diagram of another example illustrating a step-up operation of a voltage according to an embodiment mode of the present invention.

FIG. 6 is a circuit diagram of another example illustrating the step-up operation according to this embodiment mode of the present invention. In this circuit, electric power having an AC waveform generated from electromagnetic energy of a radio wave incoming from the antenna 11a is sent to the voltage step-up circuit 14a via the capacitor C12, the SBD 13b, and the voltage step-up circuit 14a or via the capacitor C12, the resistor R13c, and the capacitor C13e. Then, electric charges are accumulated in the capacitor 14a (m) at the subsequent stage.

The voltage step-up circuit 14a steps up the voltage of electric power having an AC waveform from the antenna 11a by having the transistors Tr14a (11), 14a (12), 14a (13), 14a (14), . . . , and 14a (m) and the capacitors 14a (21), 14a (22), 14a (23), . . . , and 14a (n) operate using an oscillated clock signal. Note that the clock signal is inputted into the capacitors 14a (21), 14a (22), 14a (23), . . . , and 14a (m) via the buffer circuits (inverters) 14a (31), 14a (32), and 14a (33).

It should be noted here that it is preferable that a clock signal is oscillated by the oscillation circuit 14b at a speed where a target reception pulse width is divided by ten or the like. For instance, the pulse wave of a mobile telephone in the PDC system is 20 msec and the pulse wave of a mobile telephone in the CDMA system is around 60 $\mu$sec, so that the clock rate becomes 2 msec in the former case and becomes as high as around 6 $\mu$sec in the latter case.

When a high clock rate like this is set, even if a reception wave is a pulse wave, a step-up operation is continuously performed so that incoming electric charges are quickly sent before being consumed as leakage. As a result, it becomes possible to extract electric power with efficiency. This is because even if the clock rate is increased, it is possible to suppress the self power consumption by limiting the load placed on the oscillation circuit to the load for striking the gates of the transistors, as will be described later.

Also, like this circuit, it is preferable that as to the inverters 14a (31), 14a (32), 14a (33), their power supplies 14s1, 14s2, and 14s3 are connected immediately after the rectifier circuit unit (immediately after the SBD 13b) and electric power generated from a radio wave is used as the power supplies. That is, this is because, by extracting a potential (power supply) for boosting one ends of the capacitor 14a and the like from the side on which a radio wave is inputted, it becomes possible to reduce power consumption by the voltage step-up circuit itself.

Incidentally, in the case where a continuous radio wave other than a pulse wave described above is used, it becomes possible to continuously extract electromagnetic energy, and then there does not occur voltage dropping due to a leakage current described above. Therefore, that it is enough that electric power is transported as it is from the rectifier unit to the subsequent stage like in a case of a circuit that is applied to ordinary data transmission and reception.

However, in order to efficiently extract electromagnetic energy from a radio wave that is used by a mobile telephone or the like to perform data transmission and reception in recent years, to charge the electromagnetic energy into the secondary battery 15, and to transport electric power to the electric load X100, the consideration must be given to the leakage current that occurs at the SBDs 13a and 13b during the discharging of the capacitor C13e. That is, it is required to transport the electric power to the subsequent stage so as to compensate for the leakage current.

Figure 7:
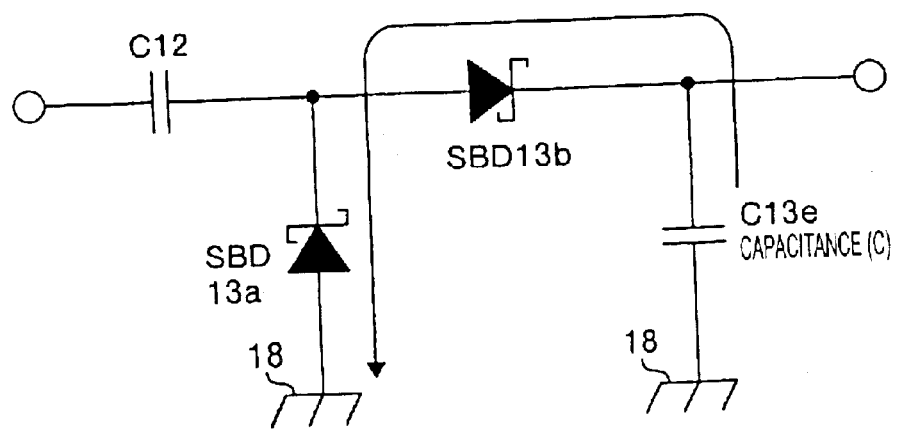
FIG. 7 is a drawing illustrating leakage current of the rectifier unit.
Figure 8A:
FIGS. 8A and 8B are conceptual drawings of pulse wave.

FIG. 7 is a drawing illustrating a leakage current of the rectifier unit. FIG. 8 is a conceptual drawings of a pulse wave. A current generated by a pulse wave like the pulse wave shown in FIG. 8A flows from the capacitor C12 to the capacitor C13e via the SBD 13b and electric charges are accumulated in the capacitor C13e. The charging into this capacitor C13e is performed at a portion of a voltage with a high pulse wave. That is, the capacitor C13e performs discharging instead of charging at narrow intervals between respective pulses and transports electric power to the subsequent stage.

Figure 8B:

However, as indicated by the arrow in the drawings, the SBDs 13a and 13b allow leakage current due to the discharging of the capacitor C13e to flow, so that the pulse wave (output) transmitted to the subsequent stage is attenuated as shown in FIG. 8B. That is, the voltage of the capacitor C13e is rapidly reduced before a saturated situation is obtained because there exists the leakage current due to the SBDs 13a and 13b.

In view of this problem, as described above, the technique according to this embodiment mode of the present invention makes it possible to also step up input electric power, whose voltage is relatively low, using the switched capacitor type voltage step-up circuit 14a and to accumulate the electric power in a large capacitor (storage battery) at a last stage. In addition, an operation is performed so that the backflow is stopped by performing switching at each required moment. As a result, it also becomes possible to transport electric power without leakage by sending the electric power in a bucket relay manner before the backflow occurs due to the leakage.

As a result, it becomes possible to efficiently extract electromagnetic energy from a radio wave used by a mobile telephone or the like to perform data transmission and reception in recent years, to charge the energy into the secondary battery 15, and to transport electric power to the electric load X100.

With the technique according to the first embodiment mode described above, it becomes possible to collect a radio wave propagating in the air, convert collected electromagnetic energy into electric power, generate electric power having a DC waveform by rectifying electric power having an AC waveform, charge the rectified electric power having the DC waveform into a secondary battery, and supply an electric load with the rectified electric power having the DC waveform or with electric power having a DC waveform discharged from the secondary battery.

(Second Embodiment Mode)

Figure 9:
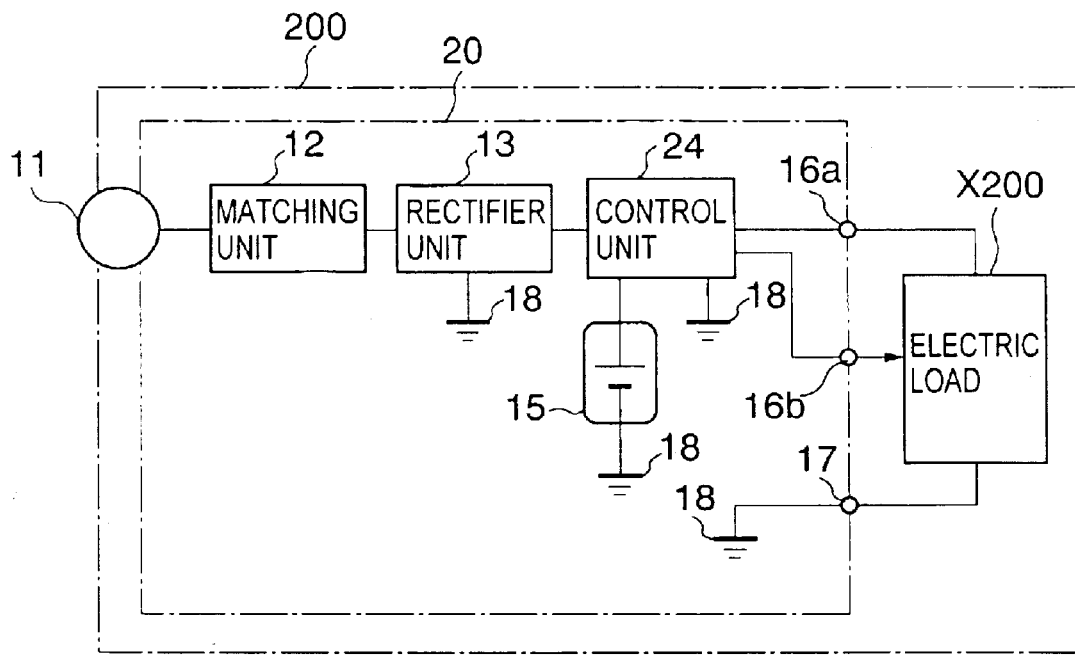
FIG. 9 is a block diagram illustrating a functional construction of an electronic equipment according to a second embodiment mode of the present invention.

FIG. 9 is a block diagram illustrating the functional construction of an electronic equipment according to a second embodiment mode of the present invention. This electronic equipment 200 includes a power supply apparatus 20 that is unique to the second embodiment mode of the present invention, and an electric load X200 such as an oscillation circuit for a watch or a step motor driving circuit for electrically processing various kinds of functions such as a clock function or a telephone function of a wrist watch, a mobile telephone, or the like. Note that the same construction elements as those described in the aforementioned first embodiment mode are given the same reference numerals and the detailed description concerning these elements is omitted.

The power supply apparatus 20 extracts electrical energy from a radio wave (electric field, magnetic field) propagating in the air, performs charging, and supplies the electric load X200 with electric power. This power supply apparatus 20 mainly includes an electromagnetic energy conversion unit 11, a matching unit 12, a rectifier unit 13, a control unit 24, and a secondary battery 15. In particular, like the power supply apparatus 10, this power supply apparatus 20 is suited to extracting electrical energy from a pulse wave in a radio wave propagating in the air.

This power supply apparatus 20 is connected to the electric load X200 by output terminals 16a and 16b and a GND terminal 17. The terminal 16a is connected to the output side from the control unit 24. The terminal 16b is a terminal via which the control unit 24 sends a signal for controlling the operation of the electric load X200 in accordance with a voltage value of the secondary battery 15. Also, the GND terminal 17 is connected to a GND 18. Also, to this GND 18, there are connected the rectifier unit 13, the control unit 24, and the secondary battery 15.

The control unit 24 is means for controlling the charging into the secondary battery 15, monitoring a voltage of the secondary battery 15, and controlling the operation of the electric load X200 in accordance with the monitored voltage of the secondary battery 15 by monitoring the voltage.

Figure 10:
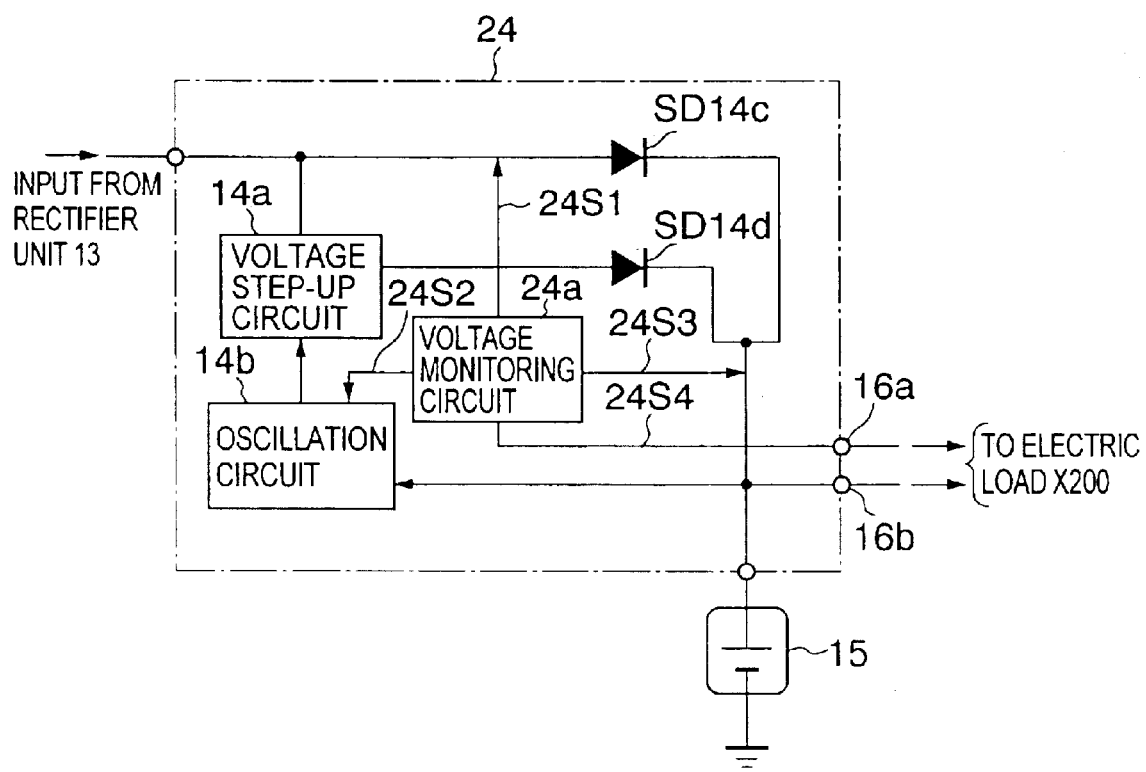
FIG. 10 is a circuit diagram illustrating a circuit construction of another example of a control unit of a power supply apparatus shown in FIG. 9.

FIG. 10 is a circuit diagram illustrating the circuit construction of another example of the control unit of the power supply apparatus shown in FIG. 9. This control unit 24 is constructed of the voltage step-up circuit 14a, the oscillation circuit 14b, SDs (Silicon Diodes) 14c and 14d, and a voltage monitoring circuit 24a. Note that the same construction elements as in the first embodiment mode described above are given the same reference numerals and the detailed description concerning these elements is omitted.

To the voltage monitoring circuit 24a, there are connected a signal line 24S1 that measures an input side voltage of the SD 14c, a signal line 24S2 that controls the oscillation circuit 14b, a signal line 24S3 that measures the voltage of the secondary battery 15, and a signal line 24S4 that sends a signal for controlling an operation to the electric load X200.

The control unit 24 charges the secondary battery 15 with sent electric power having a DC waveform. During this operation, the voltage monitoring circuit 24a controls the driving of the oscillation circuit 14b and the electric load X200 in accordance with the relation between the input side voltage of the SD 14c and the voltage of the secondary battery 15.

For instance, it is assumed that a voltage that is required to drive the electric load X200 is 0.7 [V] and a voltage, which can be stepped up to the voltage of 0.7 [V] required to drive the electric load X200, is 0.3 [V]. In this case, it is possible to perform control in the following three patterns.

(1) In the case where the signal line 24S1 is at least equal to 0.3 [V] and the signal line 24S3 does not exceed 0.7 [V], it is advantageous that accumulation is performed by performing a step-up operation. Consequently, a signal instructing the oscillation circuit 14b to oscillate a clock is outputted from the signal line 24S2 and a signal instructing to stop the electric load X200 is outputted from the signal line 24S4.

(2) In the case where the signal line 24S1 does not exceed 0.3 [V] and the signal line 24S3 does not exceed 0.7 [V], it is impossible to perform a step-up operation and to drive the electric load X200. Consequently, a signal instructing the oscillation circuit 14b to stop the oscillation of a clock is outputted from the signal line 24S2 and a signal instructing to stop the electric load X200 is outputted from the signal line 24S4.

(3) In the case where the signal line 24S1 is at least equal to 0.7 [V] and the signal line 24S3 does not exceed 0.3 [V], it is possible to supply a voltage that is enough to drive the electric load X200. Consequently, a signal instructing the oscillation circuit 14b to stop the oscillation of a clock is outputted from the signal line 24S2 and a signal instructing to drive the electric load X200 is outputted from the signal line 24S4. Here, for instance, in the case where 24S3 is at least equal to 1.2 [V] and is sufficiently high and 24S1 is in a range of from 0.3 [V] and 0.7 [V], it is useless to perform oscillation because it is impossible to additionally accumulate electric charges even if a step-up operation is performed. As a result, there is outputted a signal instructing the stoppage.

With the technique according to the second embodiment mode described above, during an operation for collecting a radio wave propagating in the air, convert collected electromagnetic energy into electric power, generate electric power having a DC waveform by rectifying electric power having an AC waveform, charge the rectified electric power having the DC waveform into a secondary battery, and supply an electric load with the rectified electric power having the DC waveform or with electric power having a DC waveform discharged from the secondary battery, it becomes possible to supply electric power having a voltage value required by the electric load by performing a step-up operation until a predetermined voltage value is obtained in accordance with a level of obtained electromagnetic energy.

(Third Embodiment Mode)

Figure 11:
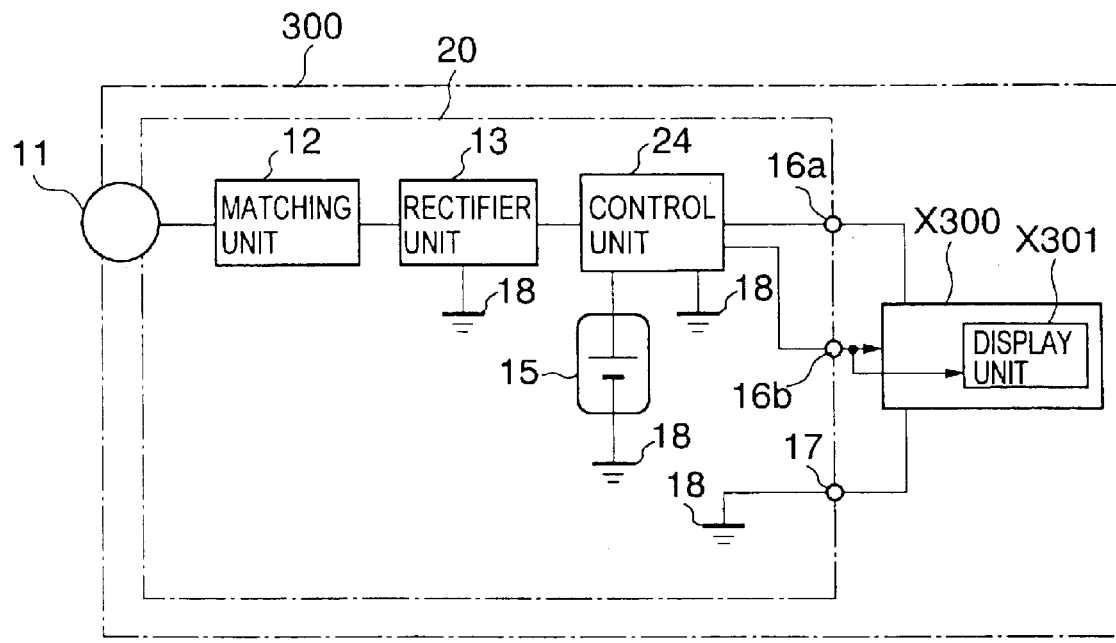
FIG. 11 is a block diagram illustrating a functional construction of an electronic equipment according to a third embodiment mode of the present invention.

FIG. 11 is a block diagram illustrating the functional construction of an electronic equipment according to a third embodiment mode of the present invention. This electronic equipment 300 includes the power supply apparatus 20 that has been described in the second embodiment mode of the present invention, and an electric load X300 such as an oscillation circuit for a watch or a step motor driving circuit for electrically processing various kinds of functions such as a clock function or a telephone function of a wrist watch, a mobile telephone, or the like. Note that construction elements that are the same as those described in the aforementioned first embodiment mode are given the same reference numerals and the detailed description concerning these elements is omitted.

The power supply apparatus 20 controls a step-up operation and the driving of the electric load X300 in accordance with respective voltages on the input side and the output side, as described above. In this case, there is obtained a construction where a reception (input) strength, the amount of charges remaining in the second battery 15, and the like are displayed on a display unit X301, such as an LCD, on the electric load X300 side during this operation. Consequently, as to the electric load X300, an unillustrated CPU recognizes a voltage value sent from the power supply apparatus 20, stores the value in an unillustrated storage unit, and controls the display on the display unit X301. Note that it is possible to perform this control through the reading of a program for the control from an unillustrated storage unit and the execution of the read program by the unillustrated CPU.

Figure 12:
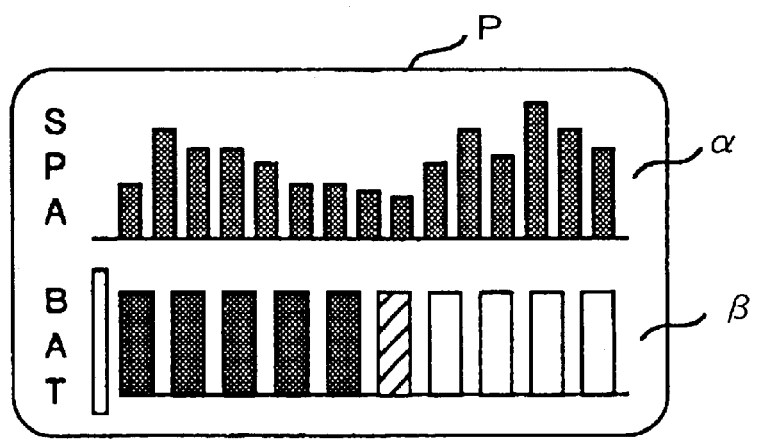
FIG. 12 is a drawing illustrating an example of a display screen illustrated in FIG. 11.

FIG. 12 is a drawing showing an example of a display screen illustrated in the FIG. 11. In this example, a graph α and a graph β are displayed on a display screen P. As to the graph α, the vertical axis represents a reception strength, the horizontal axis represents an elapsed time, and an average level during the latest five minutes is shown at the right end. The graph β shows the current remaining amount of charges in the battery and the right end represents that the battery is fully charged. Also, during a sleep mode, "SLEEP" or the like may be displayed.

With the technique according to the third embodiment mode described above, a reception (input) strength, the remaining amount of charges in the secondary battery, and the like are displayed on the display unit such as an LCD. This makes it possible for a user to confirm the usage state of the electric load and the like.

(Fourth Embodiment Mode)

Figure 13:
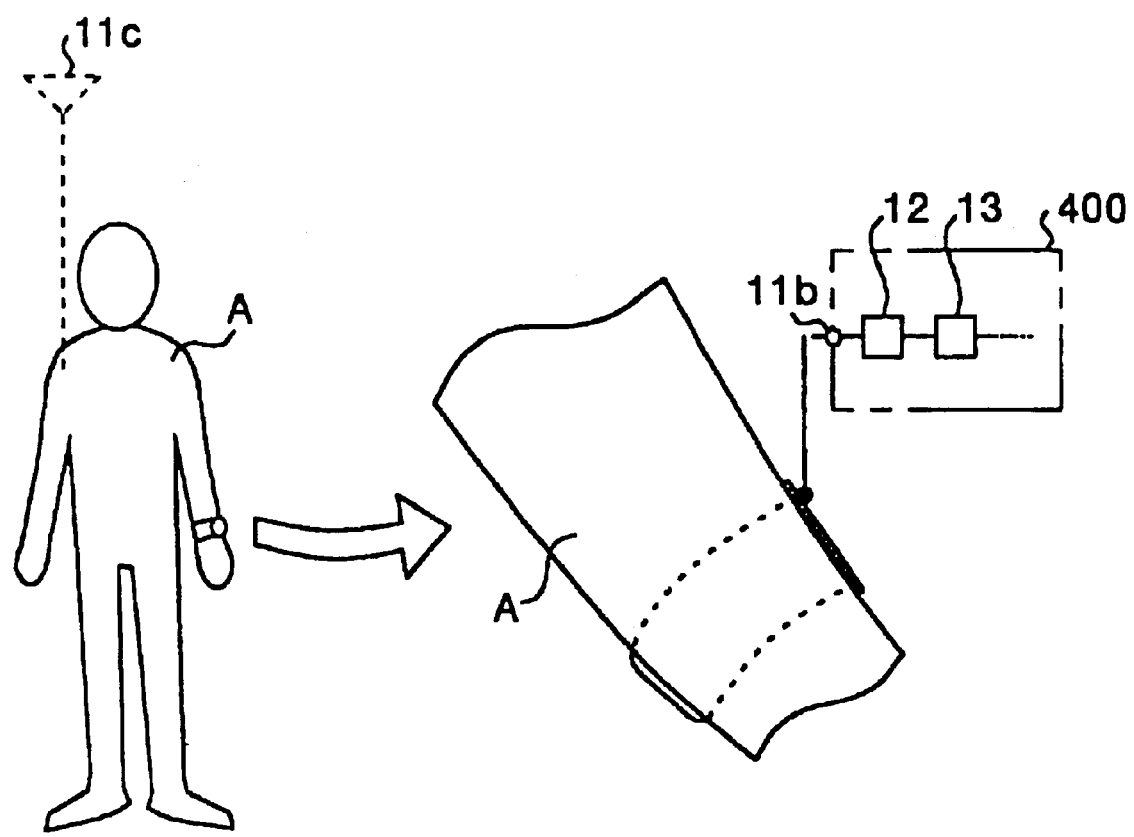
FIG. 13 is a drawing illustrating a concept of an electronic equipment according to a fourth embodiment mode of the present invention.

FIG. 13 is a drawing illustrating the concept of an electronic equipment according to a fourth embodiment mode of the present invention. Note that this electronic equipment 400 is an electronic wrist watch in which there is mounted a power supply apparatus 10 described in the aforementioned first embodiment mode and an electric load X100 is used as means for realizing a clock function. Also, the construction elements of the power supply apparatus 10 are the same as the functions described in the aforementioned first embodiment mode and are given the same reference numerals. Therefore, the detailed description concerning these functions is omitted.

When the electronic equipment 400 is placed on a human body (arm) A, the antenna terminal 11b of the electronic equipment 400 contacts the human body (arm) A. Under this condition, the human body A functions as a virtual antenna 11c.

Figure 14:
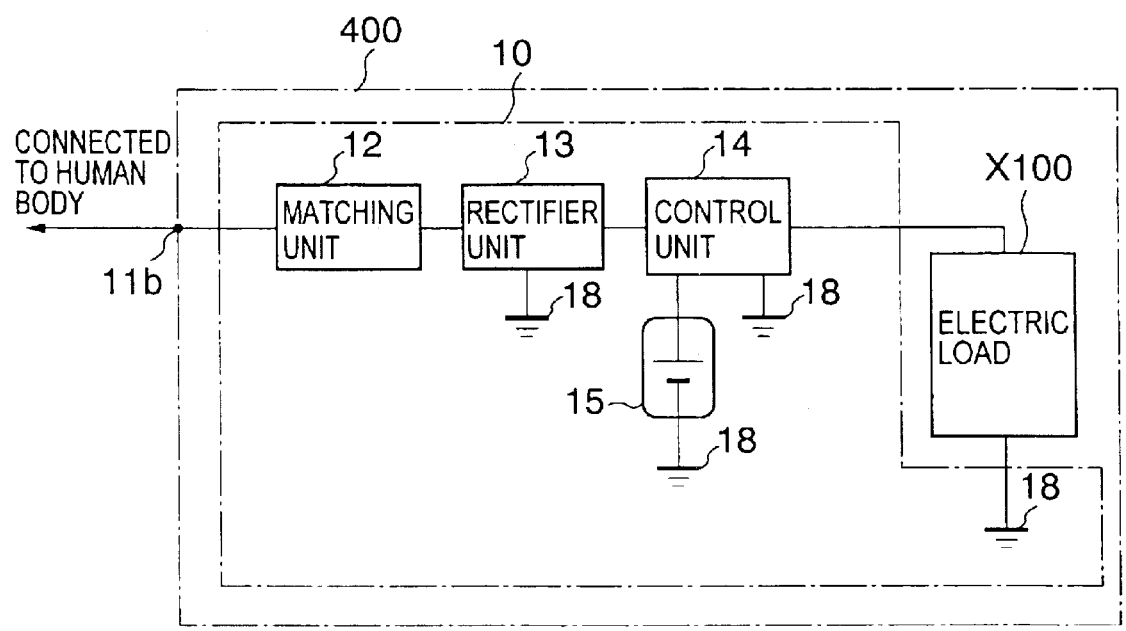
FIG. 14 is a block diagram illustrating a functional construction of the electronic equipment according to the fourth embodiment mode of the present invention.

FIG. 14 is a block diagram illustrating the functional construction of the electronic equipment according to the fourth embodiment mode of the present invention. As described above, the construction of the electronic equipment 400 according to this fourth embodiment mode is basically the same as the construction elements described in the aforementioned first embodiment mode and is given the same reference numerals. Therefore, the detailed description concerning this construction is omitted. Note that this electronic equipment 400 includes an antenna terminal 11b for establishing contact with the human body A. This antenna terminal 11b contacts the human body A and inputs a radio wave propagating in a free space from the human body A as described above. The human body A, through which a radio wave propagating in a free space is inputted in this manner, will be hereinafter referred to as the "human body antenna" for the sake of convenience.

Figure 15:
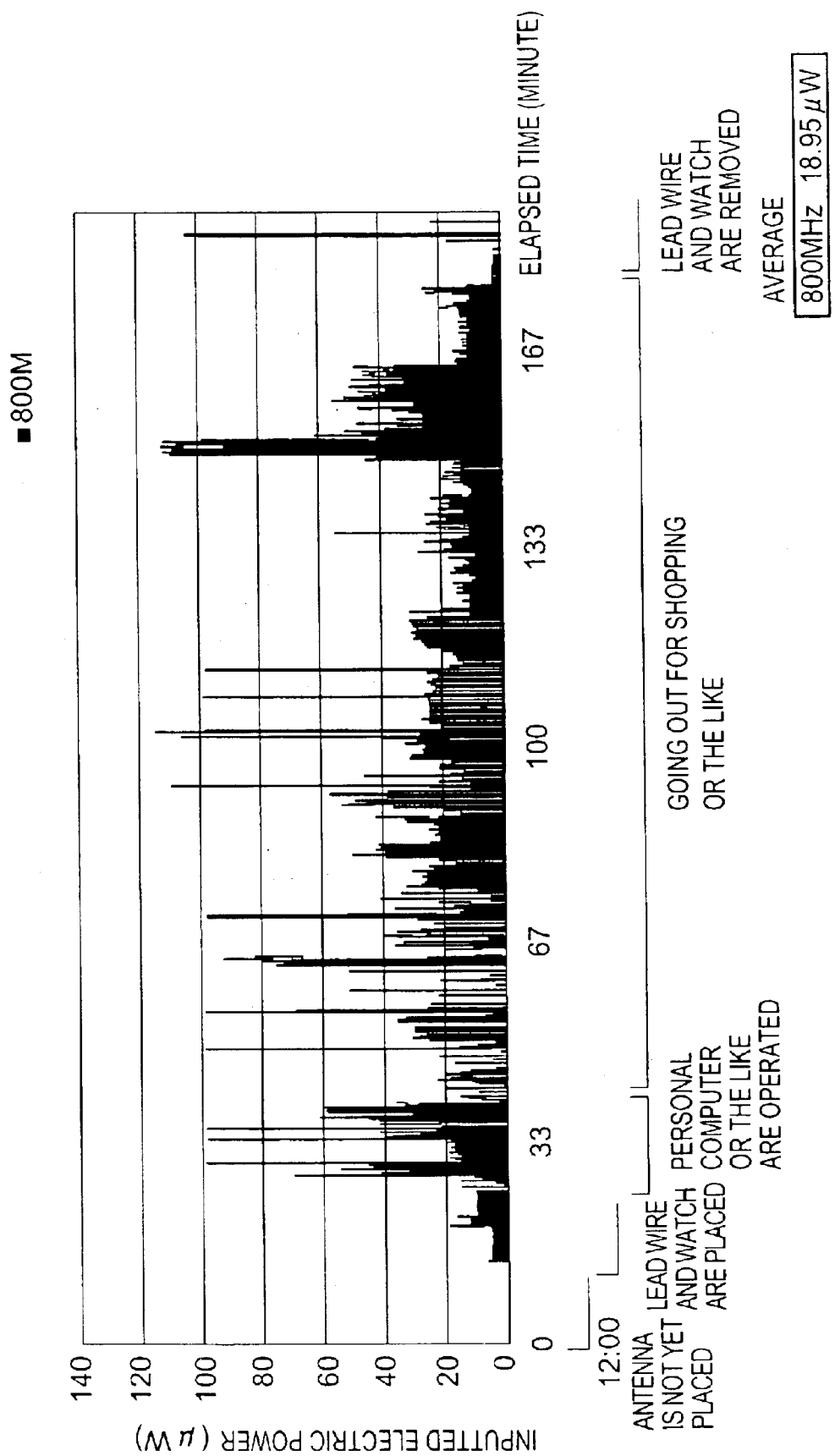
FIG. 15 is a graph illustrating experimental results concerning the level of input electric power of the electronic equipment according to the fourth embodiment mode of the present invention.

FIG. 15 is a graph illustrating experimental results concerning the level of input electric power of the electronic equipment according to the fourth embodiment mode of the present invention. In this graph, there are shown results of measurement of the level of the input electric power under various kinds of circumstances, that is, a state where the electronic equipment 400 is placed on the arm, a state where the electronic equipment 400 is removed from the arm, and a state where the electronic equipment 400 is placed on the arm. The vertical axis represents the input electric power ($\mu$W) and the horizontal axis represents the state under the various kinds of circumstances.

The states under the various kinds of circumstances include a state where the antenna is not placed, a state where the antenna is placed on the arm (a lead line and the watch are placed thereon), a state where a personal computer or the like are operated under a state where the antenna is placed, a state where a user goes outside for shopping or the like, and a state where the antenna is removed from the arm. As shown in this graph, it is found that the electronic equipment 400 exhibits high numerical values in places while the antenna is placed on the arm. That is, it is found that the human body functions as an antenna.

With the technique according to the fourth embodiment mode described above, it becomes possible to collect a radio wave propagating in the air through a human body, convert collected electromagnetic energy into electric power, generate electric power having a DC waveform by rectifying electric power having an AC waveform, charge the rectified electric power having the DC waveform into a secondary battery, and supply an electric load with the rectified electric power having the DC waveform or with electric power having a DC waveform discharged from the secondary battery.

(Fifth Embodiment Mode)

FIG. 16 is a drawing illustrating the concept of an electronic equipment according to a fifth embodiment mode of the present invention. Note that this electronic equipment 500 is an electronic wrist watch in which there is mounted a power supply apparatus 50 and an electric load X100 is used as means for realizing a clock function. Also, among construction elements of the power supply apparatus 50, functions that are the same as those described in the aforementioned first embodiment mode are given the same reference numerals and the detailed description concerning these functions is omitted.

When the electronic equipment 500 is placed on a human body (arm) A, an antenna terminal lie of the electronic equipment 500 contacts the human body (arm) A. Under this condition, the human body A functions as a virtual antenna 11c. Also, aside from the virtual antenna 11c, an antenna 11a inputs a radio wave propagating in a free space. Note that the antenna 11a is connected to an antenna terminal 11d. Also, the antenna terminal 11e contacts the human body A through a back lid 11f of the electronic equipment 500.

FIG. 17 is a perspective view illustrating an example of the electronic equipment (electronic wrist watch) according to the fifth embodiment mode of the present invention. This electronic equipment (electronic wrist watch) 500 has a construction where a ring-shaped antenna 11a is attached on a dial plate side, and the back lid 11f functions as the antenna terminal 11e that contacts the human body A.

Figure 18:
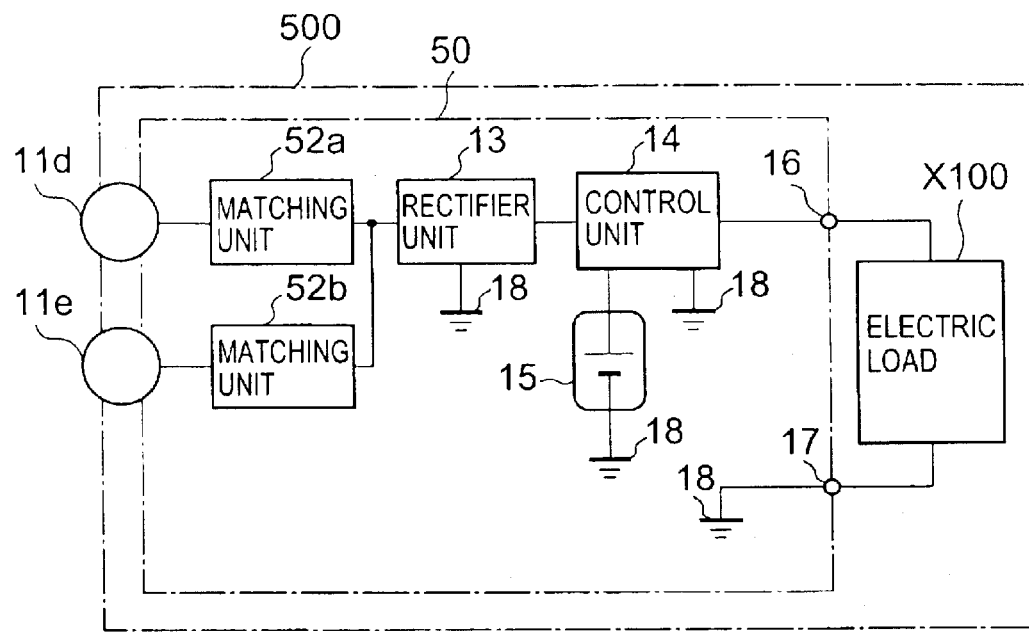
FIG. 18 is a block diagram illustrating a functional construction of the electronic equipment according to the fifth embodiment mode of the present invention.

FIG. 18 is a block diagram illustrating the functional construction of the electronic equipment according to the fifth embodiment mode of the present invention. As described above, the construction of the electronic equipment 500 according to this fifth embodiment mode is basically the same as the construction elements described in the aforementioned first embodiment mode and is given the same reference numerals. Therefore, the detailed description concerning this construction is omitted.

Note that this electronic equipment 500 includes the antenna terminal 11e that establishes contact with the human body A, a matching unit 52b for establishing impedance matching between the human body A side and the control unit 14 side, an antenna 11a through which a radio wave is directly input from a free space, and a matching unit 52a for establishing impedance matching between the antenna 11a side and the control unit 14 side.

With the technique according to the fifth embodiment mode described above, it becomes possible to collect a radio wave propagating in the air through a human body and an antenna, convert collected electromagnetic energy into electric power, generate electric power having a DC waveform by rectifying electric power having an AC waveform, charge the rectified electric power having the DC waveform into a secondary battery, and supply an electric load with the rectified electric power having the DC waveform or with electric power having a DC waveform discharged from the secondary battery.

(Sixth Embodiment Mode)

Figure 19:
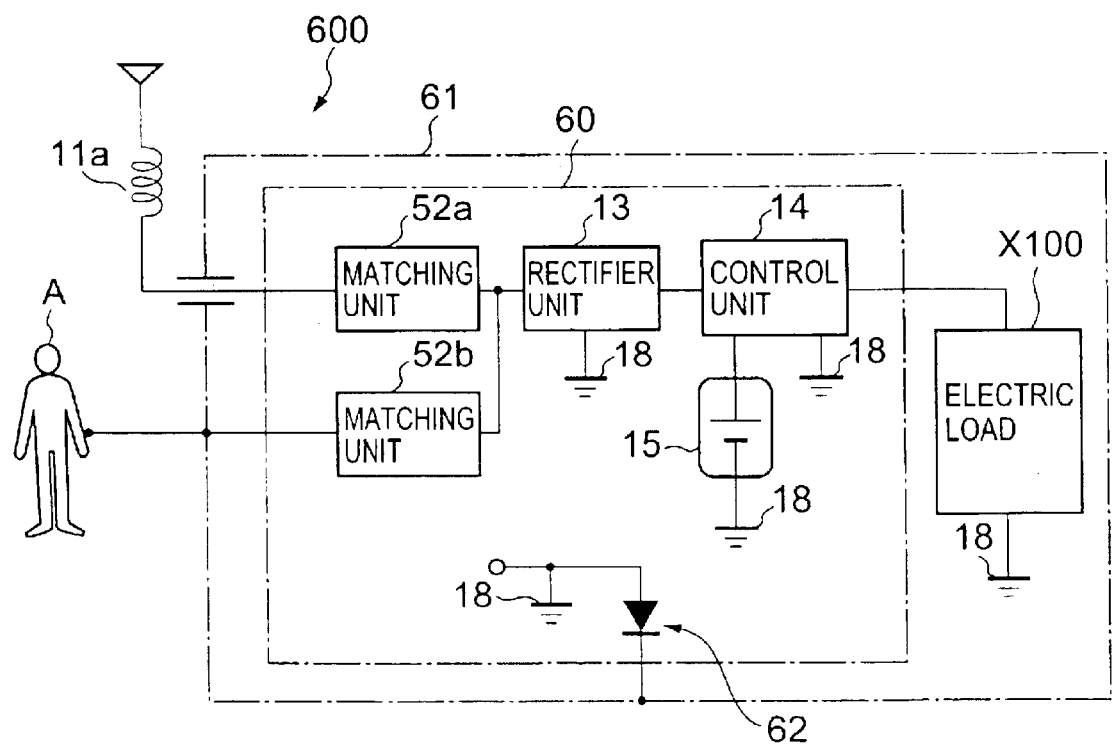
FIG. 19 is a block diagram illustrating a functional construction of an electronic equipment according to a sixth embodiment mode of the present invention.

FIG. 19 is a block diagram illustrating the functional construction of an electronic equipment according to a sixth embodiment mode of the present invention. Note that this electronic equipment 600 is an electronic wrist watch in which there is mounted a power supply apparatus 60 and the electric load X100 is used as means for realizing a clock function. Also, among construction elements of the power supply apparatus 60, functions that are the same as those described in the aforementioned first or fifth embodiment mode are given the same reference numerals and the detailed description concerning these functions is omitted.

When the electronic equipment 600 is placed on the human body (arm) A, the antenna terminal 11e of the electronic equipment 600 contacts the human body (arm) A. Under this condition, the human body A functions as a virtual antenna and the antenna 11a inputs a radio wave propagating in a free space, aside from the virtual antenna, like in the aforementioned fifth embodiment mode.

This electronic equipment 600 has a construction where a casing 61 does not contact the antenna 11a but contacts the antenna terminal 11e that contacts the human body A. Also, the casing 61 is connected to a rectifier element 62, such as a silicon diode, in a forward direction from the GND 18 to the human body A. With this construction, it becomes possible to have the human body A function as the GND 18 of the antenna 11a and to improve the input sensitivity concerning a radio wave.

With the technique of the sixth embodiment mode described above, it becomes possible to collect a radio wave propagating in the air through a human body and an antenna, convert collected electromagnetic energy into electric power, generate electric power having a DC waveform by rectifying electric power having an AC waveform, charge the rectified electric power having the DC waveform into a secondary battery, and supply an electric load with the rectified electric power having the DC waveform or with electric power having a DC waveform discharged from the secondary battery.

(Seventh Embodiment Mode)

Figure 20:
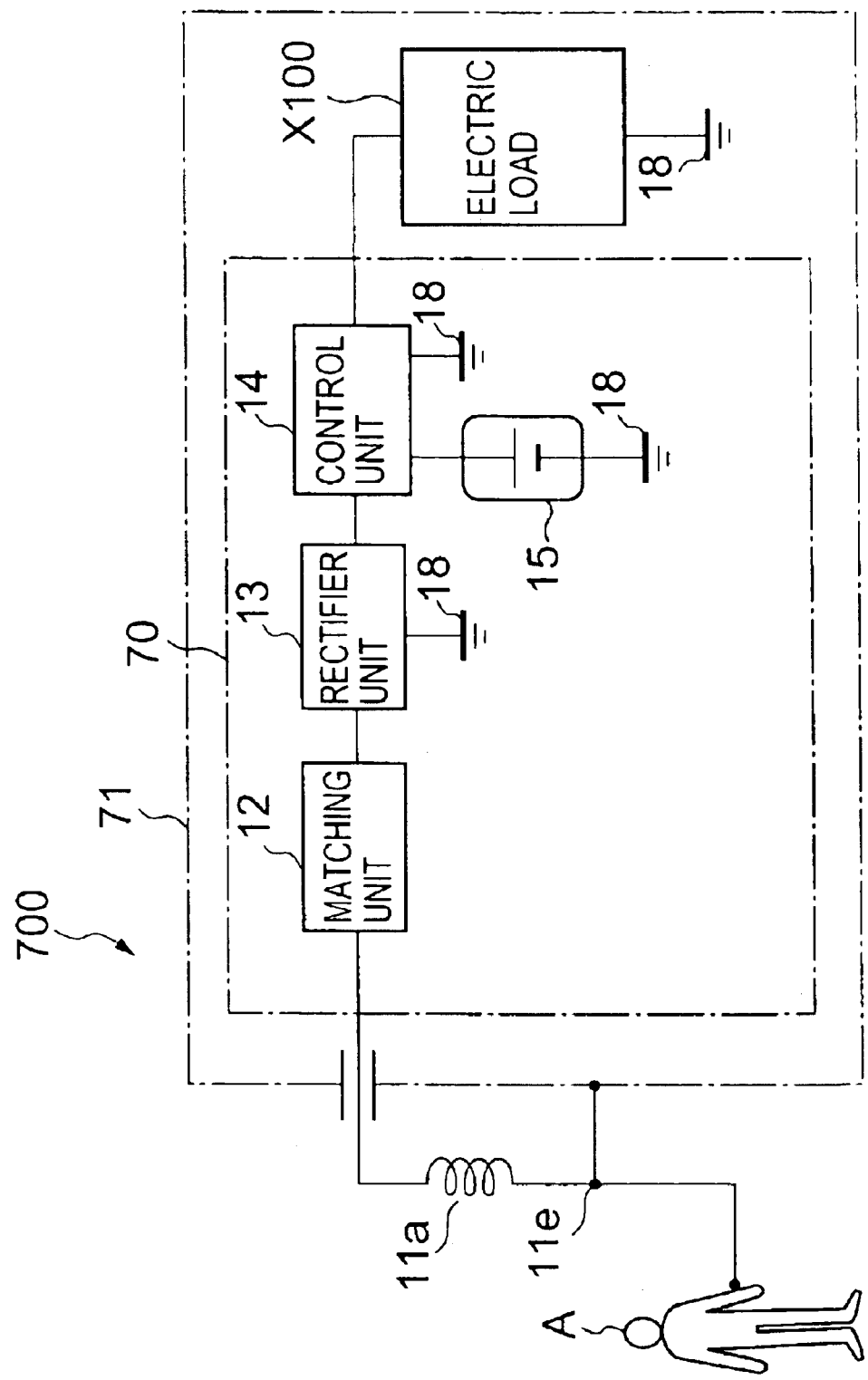
FIG. 20 is a block diagram illustrating a functional construction of an electronic equipment according to a seventh embodiment mode of the present invention.

FIG. 20 is a block diagram illustrating the functional construction of an electronic equipment according to a seventh embodiment mode of the present invention. Note that this electronic equipment 700 is an electronic wrist watch in which there is mounted a power supply apparatus 70 and the electric load X100 is used as means for realizing a clock function. Also, among construction elements of the power supply apparatus 70, functions that are the same as those described in the aforementioned first embodiment mode are given the same as reference numerals and the detailed description concerning these functions is omitted.

When the electronic equipment 700 is placed on the human body (arm) A, the antenna terminal 11e of the electronic equipment 700 contacts the human body (arm) A. Under this condition, the human body A functions as a virtual antenna and the antenna 11a that is connected to the human body A in series inputs a radio wave propagating in a free space.

This electronic equipment 700 has a construction where the antenna terminal 11e is connected to a casing 71. That is, the casing 17 has a potential that is the same as the potential of the human body A. With this construction where the human body A and the antenna 11a are connected in series, there is obtained a radio wave propagating in a free space, and the casing 17 has a potential that is the same as the potential of the human body A, the input sensitivity is improved even in comparison with the case of each embodiment mode described above.

Figure 21:
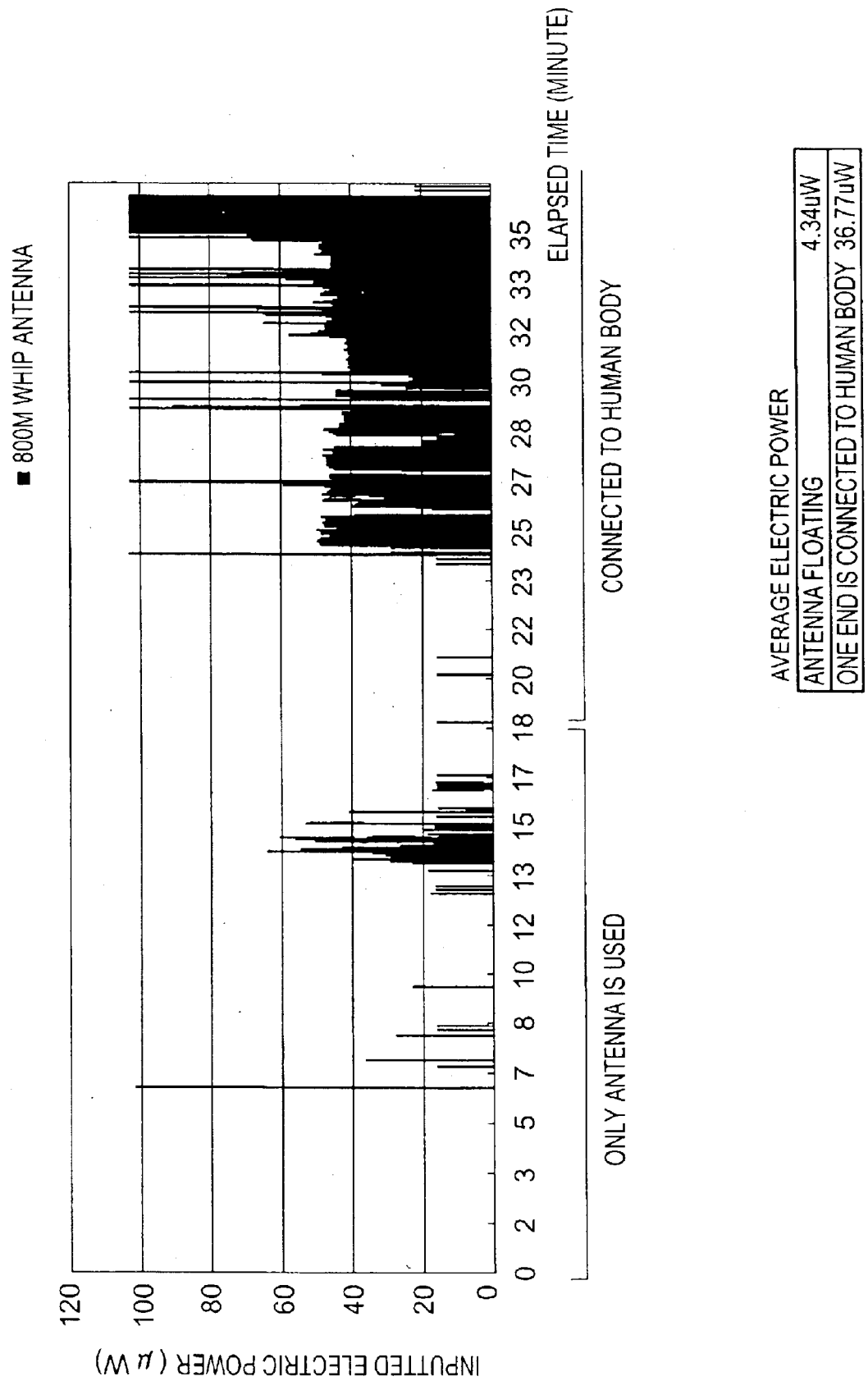
FIG. 21 is a graph illustrating experimental results concerning the level of input electric power of the electronic equipment according to the seventh embodiment mode of the present invention.

FIG. 21 is a graph illustrating experimental results concerning the level of input electric power of the electronic equipment according to the seventh embodiment mode of the present invention. In this graph, there are shown results of measurement of the level of the input electric power under various kinds of circumstances, that is, a state where the electronic equipment 700 is not placed on an arm (a case where only the antenna 11a are used) and a state where the electronic equipment 700 is placed on the arm (a case where the human body antenna as well as the antenna 11a are used). The vertical axis represents the input electric power ($\mu$W) and the horizontal axis represents the states under the various kinds of circumstances.

As shown in this graph, in the case where the electronic equipment 700 is placed on an arm and a radio wave propagating in a free space is received using both of the human body antenna and the antenna 11a, it is found that the input sensitivity is apparently improved.

With the technique of the seventh embodiment mode described above, it becomes possible to collect a radio wave propagating in the air through a human body and an antenna, convert collected electromagnetic energy into electric power, generate electric power having a DC waveform by rectifying electric power having an AC waveform, charge the rectified electric power having the DC waveform into a secondary battery, and supply an electric load with the rectified electric power having the DC waveform or with electric power having a DC waveform discharged from the secondary battery. Also, it becomes possible to have the human body function as the GND of the antenna, which makes it possible to improve the input sensitivity concerning a radio wave.

(Eighth Embodiment Mode)

Figure 22:
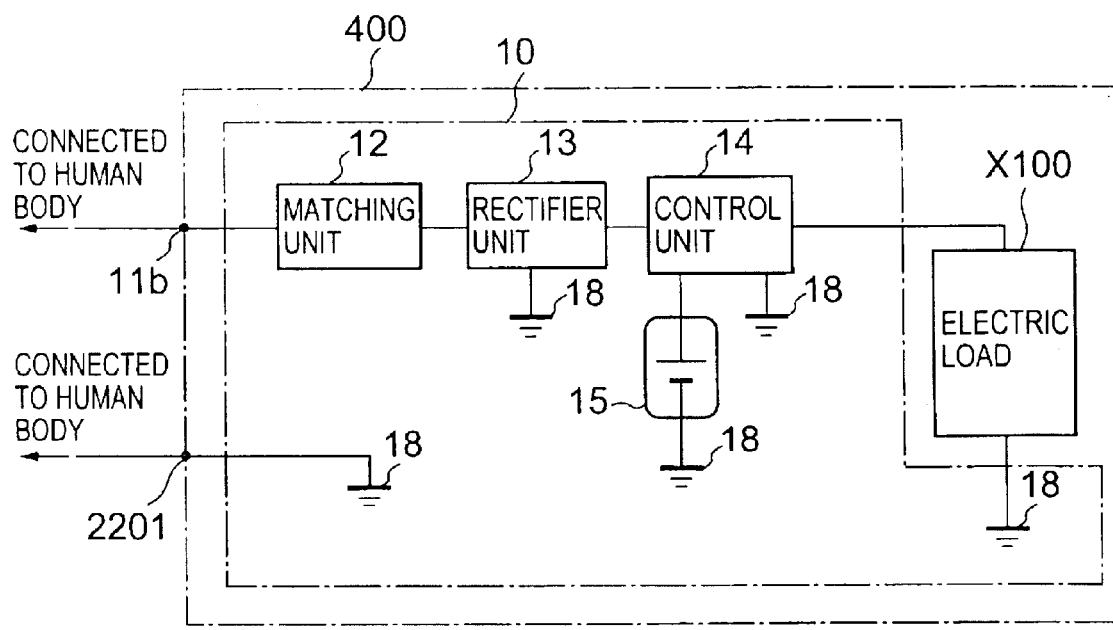
FIG. 22 is a block diagram illustrating a functional construction of an electronic equipment according to an eighth embodiment mode of the present invention.

FIG. 22 is a block diagram illustrating the functional construction of an electronic equipment according to an eighth embodiment mode of the present invention. In the electronic equipment 400 according to this eighth embodiment mode, construction elements that are the same as those described in the aforementioned fourth embodiment mode are given the same reference numerals and detailed description concerning these elements is omitted. This eighth embodiment mode differs from the fourth embodiment mode described above in that there is used a pair of input terminals (a positive electrode terminal 11b and a negative electrode terminal 2201) for establishing connection with the human body A and the negative electrode terminal 2201 is connected to the GND 18 of the electronic circuit within the apparatus.

Figure 23A:
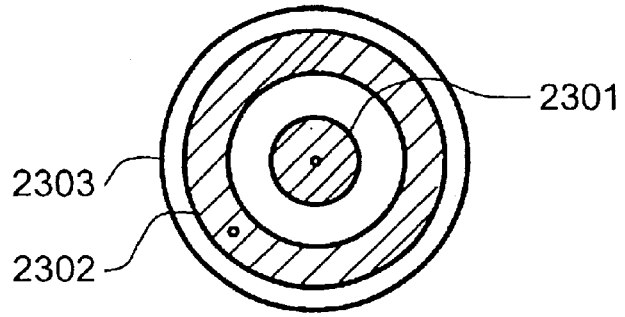
FIGS. 23A and 23B are construction diagrams illustrating a construction of an input terminal according to the eighth embodiment mode of the present invention.
Figure 23B:
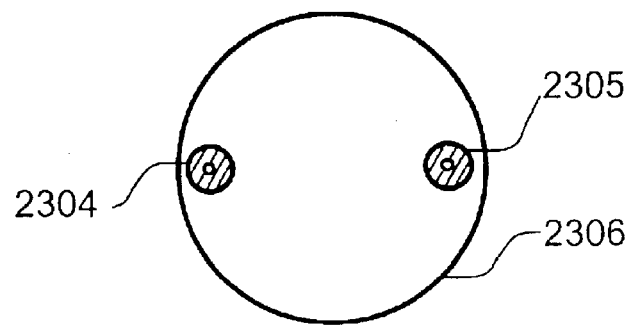

FIG. 23 shows construction diagrams showing the construction of the input terminals according to this eighth embodiment mode. FIG. 23A shows an example where a negative electrode terminal 2302 is formed to have a circular shape whose center is a positive electrode terminal 2301. Note that the positive electrode terminal may be formed to have a circular shape whose center is the negative electrode terminal. Also, FIG. 23B shows an example where both of a positive electrode terminal 2304 and a negative electrode terminal 2305 are formed to have a dotted shape.

In FIGS. 23A and 23B, the positive electrode terminal 2301 and the negative electrode terminal 2302 are formed on a substrate 2303 through printing and the positive electrode terminal 2304 and the negative electrode terminal 2305 are formed on a substrate 2306 through printing. In the case where the electronic equipment 400 is an electronic wrist watch, the back lid of this electronic wrist watch may be constructed so as to be used as the substrates 2303 and 2306. With this construction, when the electronic equipment 400 is placed on an arm, the positive electrode terminal 2301 and the negative electrode terminal 2302, and the positive electrode terminal 2304 and the negative electrode terminal 2305 are connected to a human body.

FIG. 24 is a circuit diagram showing the construction of a matching unit used in this embodiment mode of the present invention. In FIG. 24, the matching unit 2401 is constructed of a single resistance element 2402. Note that there is shown an example where the rectifier unit 2403 is a half wave voltage doubler rectifier circuit constructed of two diodes 2404 (first diode) and 2405 (second diode) that are connected in a forward direction.

An AC signal from an antenna is outputted to the rectifier unit 2403 via the resistance element 2402, is rectified to direct current by the rectifier unit 2403, and is outputted to a control unit. In the case where the leakage of the construction elements of the rectifier unit 2403 is small, the matching unit 2401 having this construction is useful because of its simple construction. In particular, in the case where a voltage step-up circuit of the control unit is constructed as switched capacitor type, the resistance element 2402 effectively achieves functions of a current limiter and the like.

The rectifier unit 2403 substantially obtains electric power that is the same as that in the case of full-wave rectification. However, voltage drops by one diode, so that the voltage dropping is halved in comparison with the case where a bridge rectifier circuit using four diodes is used, which means that this rectifier unit is effective.

Also, of the diodes 2404 and 2405, the diode (the diode 2405 in FIG. 24) that is connected to the storage battery side is constructed so that its ratio (If/IR) between forward current and reverse current is smaller than that of the other diode (the diode 2404). That is, a Schottky barrier diode, whose leakage current is small, is used as the diode 2404, while a Schottky barrier diode, whose forward voltage dropping Vf is small, is used as the diode 2405. With this construction, it becomes possible to reduce voltage losses and suppress leakage current. For instance, a diode, whose If/IR is larger than 10, is selected as the diode 2404 and a diode, whose If/IR is smaller than 10, is selected as the diode 2405.

FIG. 25 is a circuit diagram showing another construction of the matching unit used in this embodiment of the present invention. In FIG. 25, the matching unit 2501 has a parallel resonance circuit constructed of a capacitor 2502 and an inductor 2503. The capacitor 2504 is a floating capacitance. For instance, the values of the capacitor 2502 and the inductor 2503 are respectively 0.1 $\mu$F and 1.5 mH. Note that the capacitor 2502 and the inductor 2503 may be interchanged.

An AC signal input from a human body (antenna) into the matching unit 2501 is output to the control unit via the rectifier unit 2505. There is shown an example where the rectifier unit 2505 is a voltage doubler rectifier circuit constructed of two diodes 2506 and 2507 connected in a forward direction.

Figure 26:
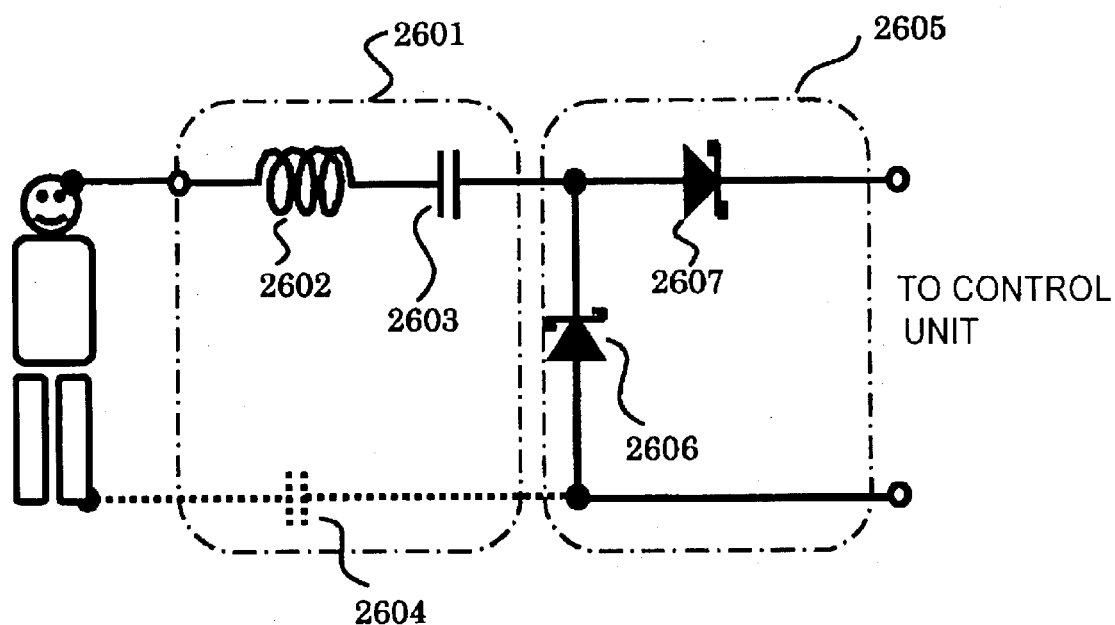
FIG. 26 is a circuit diagram illustrating still another construction of the matching unit used in the embodiment mode of the present invention.

FIG. 26 is a circuit diagram showing another construction of the matching unit used in this embodiment of the present invention. In FIG. 26, the matching unit 2601 has a series resonance circuit constructed of an inductor 2602 and a capacitor 2603. The capacitor 2604 is a floating capacitance. For instance, the values of the inductor 2602 and the capacitor 2603 are respectively 2.7 mH and 0.1 $\mu$F.

An AC signal inputted from a human body (antenna) into the matching unit 2601 is output to the control unit via the rectifier unit 2605. There is shown an example where the rectifier unit 2601 is a voltage doubler rectifier circuit constructed of two diodes 2606 and 2607 connected in a forward direction.

Figure 27:
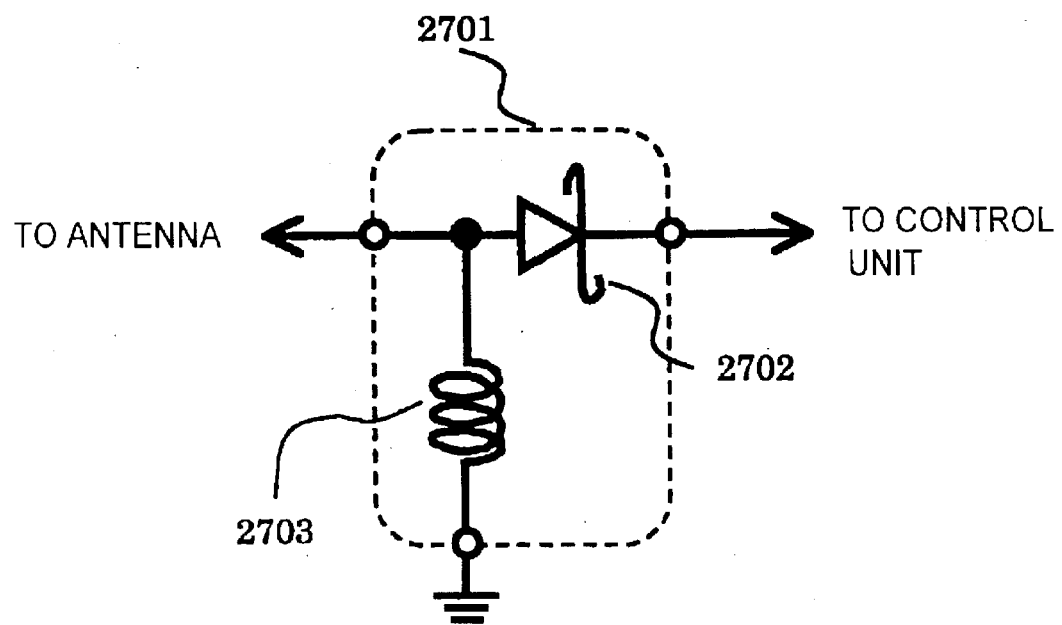
FIG. 27 is a circuit diagram illustrating another construction of the rectifier unit used in an embodiment mode of the present invention.

FIG. 27 is a circuit diagram showing another construction of the rectifier unit used in this embodiment mode of the present invention. In FIG. 27, the rectifier unit 2701 is constructed to have a single diode 2702 and an inductor 2703 that is connected between an antenna and the diode 2702. The AC signal from the antenna side is rectified by the Schottky barrier diode 2702 and is output to the control unit side. Reference numeral 2703 denotes an inductor that takes a value of several nH and is used to give a bias from the ground to the diode 2702. The rectifier unit 2701 is constructed to have the inductor 2703 that gives a bias to the single diode 2702, so that the circuit construction is extremely simplified.

Figure 28:
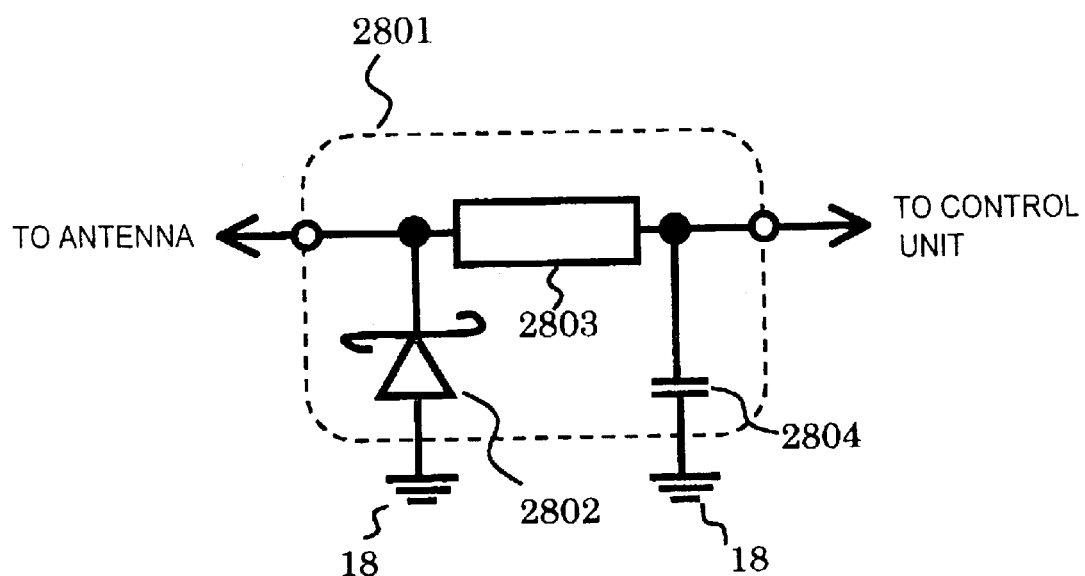
FIG. 28 is a circuit diagram illustrating another construction of the rectifier unit used in the embodiment mode of the present invention.

FIG. 28 is a circuit diagram showing another construction of the rectifier unit used in this embodiment mode of the present invention. In FIG. 28, the rectifier unit 2801 includes a diode 2802, whose anode is connected to the ground 18 side and cathode is connected to the AC signal side, a $\lambda/4$ line 2803, whose one end is connected to the cathode of the diode 2802, a conductor (not shown) arranged so as to oppose the $\lambda/4$ line 2803, and a capacitor 2804 that is connected between the other end of the $\lambda/4$ line 2803 and the ground 18.

Figure 29:
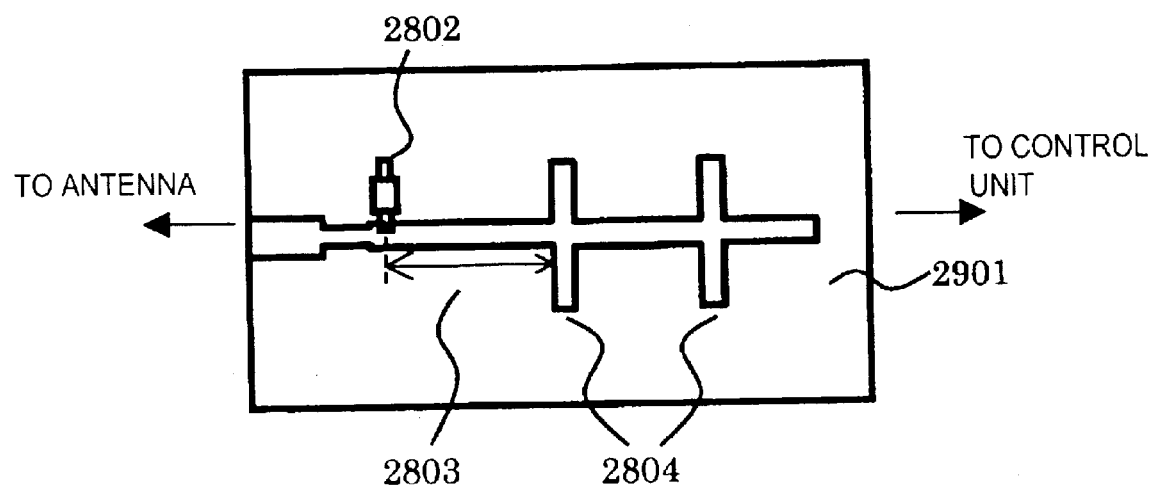
FIG. 29 is an outside drawing showing a physical construction of the rectifier unit shown in FIG. 28.

FIG. 29 shows the external appearance illustrating the physical construction of the rectifier unit 2801. Portions that are the same as those in FIG. 28 are given the same reference numerals. In FIG. 29, a wiring pattern formed using a conductor, the $\lambda/4$ line 2803, and the capacitor 2804 are formed through printing and the diode 2802 is soldered on one surface of a printed circuit board 2901. Also, a conductor (not shown) is formed through printing on the entire of the other surface of the printed circuit board 2901. The conductor forms the ground and is arranged so as to oppose the $\lambda/4$ line 2803.

By constructing the rectifier unit 2801 in this manner, it becomes possible to obtain electric power equivalent to full-wave rectification (see Kiyohiko Ito, "Basic Research Concerning Earth Station Terminal Element for Receiving Electric Power from Solar Power Generation Satellite (Rectenna) (1983, Report on Results of General Study B of Scientific Study Subsidized by Ministry of Education)").

Figure 30A:
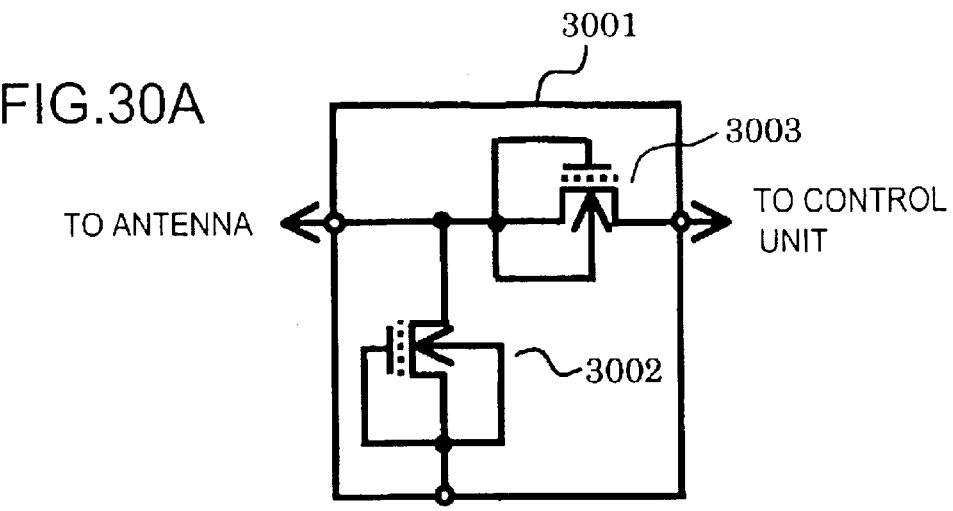
FIGS. 30A–30C are circuit diagrams illustrating other constructions of the rectifier unit used in the embodiment mode of the present invention.
Figure 30C:
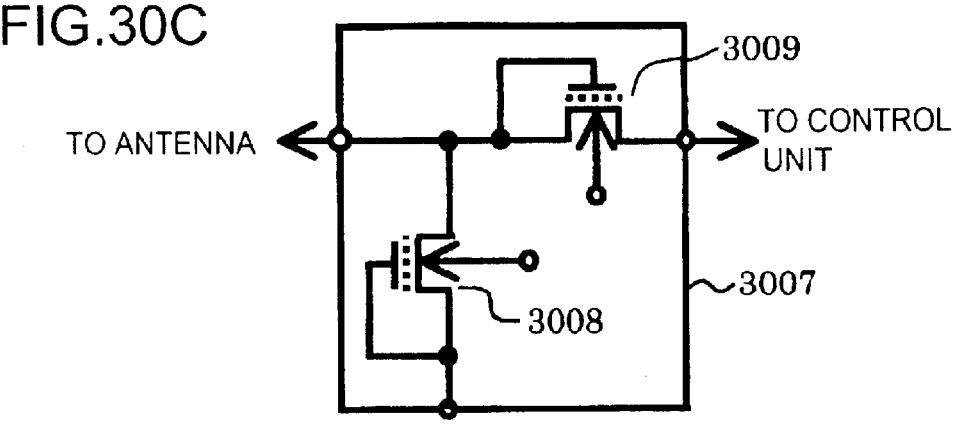
Figure 30B:
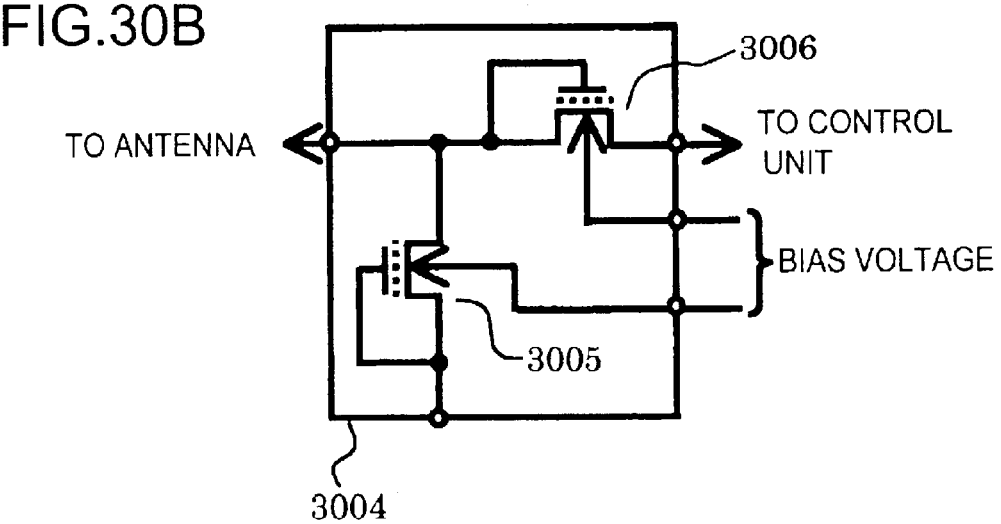

FIGS. 30A–30C are circuit diagrams of another construction of the rectifier unit used in this embodiment mode of the present invention. In each embodiment mode described above, a diode is used as a rectifier element. However, this embodiment mode relates to a construction example where a MOSFET (MOS type field effect transistor) is used instead of the diode as a rectifier element, and the diode is replaced with a MOSFET. Also, FIG. 30A is a circuit diagram showing a fundamental construction, while FIGS. 30B and 30C are circuit diagrams showing a modification thereof.

In FIG. 30A, the rectifier unit 3001 includes rectifier elements 3002 and 3003 constructed of N-channel MOSFETs. It is more preferable that the N-channel MOSFETs are of the depletion type. The rectifier elements 3002 and 3003 respectively correspond to diodes 2404 and 2405 of the rectifier unit 2403 in FIG. 24.

In FIG. 30B, the rectifier unit 3004 includes rectifier elements 3005 and 3006 constructed of N-channel MOSFETs of depression type. The rectifier elements 3005 and 3006 respectively correspond to diodes 2404 and 2405 of the rectifier unit 2403 in FIG. 24.

The rectifier elements 3005 and 3006 are constructed so that a back gate bias voltage is applied to the substrates thereof and their threshold voltages Vth are variable, thereby improving the trade-off between leakage current and forward voltage drop. It is possible to perform the same operation by applying a bias to a Schottky barrier diode, although MOSFETs are subjected to voltage control. As a result, it becomes possible to reduce power consumption required to perform the control.

Also, in FIG. 30C, the rectifier unit 3007 includes rectifier elements 3008 and 3009 constructed of N-channel MOSFETs formed on an SOI (Silicon On Insulator) or SOS (Silicon On Sapphire) substrate. It is more preferable that the N-channel MOSFETs are of the depletion type. The rectifier elements 3008 and 3009 respectively correspond to diodes 2404 and 2405 of the rectifier unit 2403 in FIG. 24. There may be realized full discrete using a sub-floating construction. The capacitance is zero, so that there is obtained a superior impedance characteristic.

(Ninth Embodiment Mode)

Figure 31:
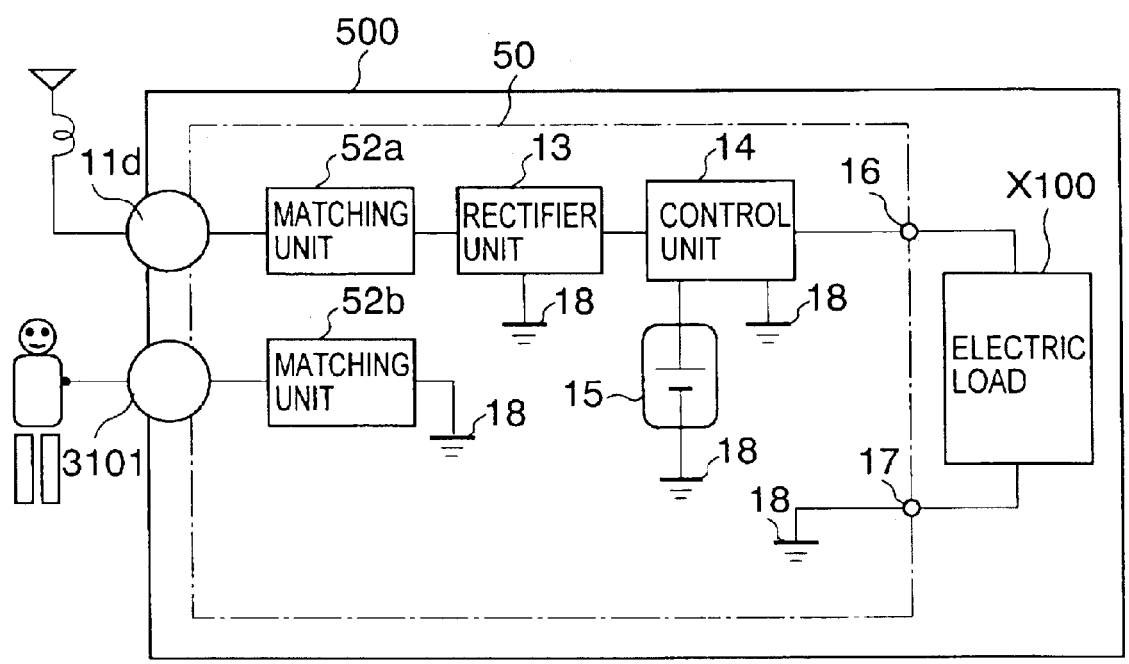
FIG. 31 is a block diagram illustrating a functional construction of an electronic equipment according to a ninth embodiment mode of the present invention.

FIG. 31 is a block diagram illustrating a functional construction of an electronic equipment according to a ninth embodiment mode of the present invention. In the electronic equipment 400 according to this ninth embodiment mode, portions that are the same as the construction elements described in the aforementioned fifth embodiment mode are given the same reference numerals and the detailed description concerning these portions is omitted. This ninth embodiment mode mainly differs from the aforementioned fifth embodiment mode in that a pair of input terminals (a positive electrode terminal 11d and a negative electrode terminal 3101) for establishing contact with a human body A are used in the ninth embodiment mode. Note that the matching unit 52b may be omitted in FIG. 31.

Figure 32:
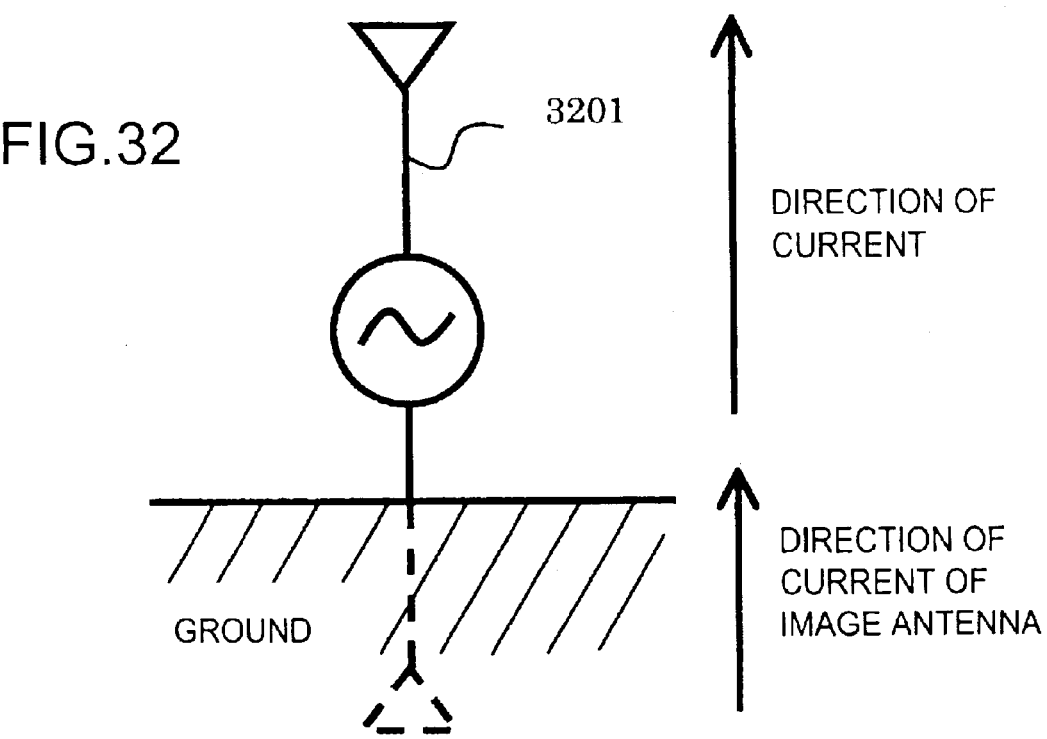
FIG. 32 is an explanatory drawing illustrating an operation according to the ninth embodiment mode of the present invention.
Figure 33:
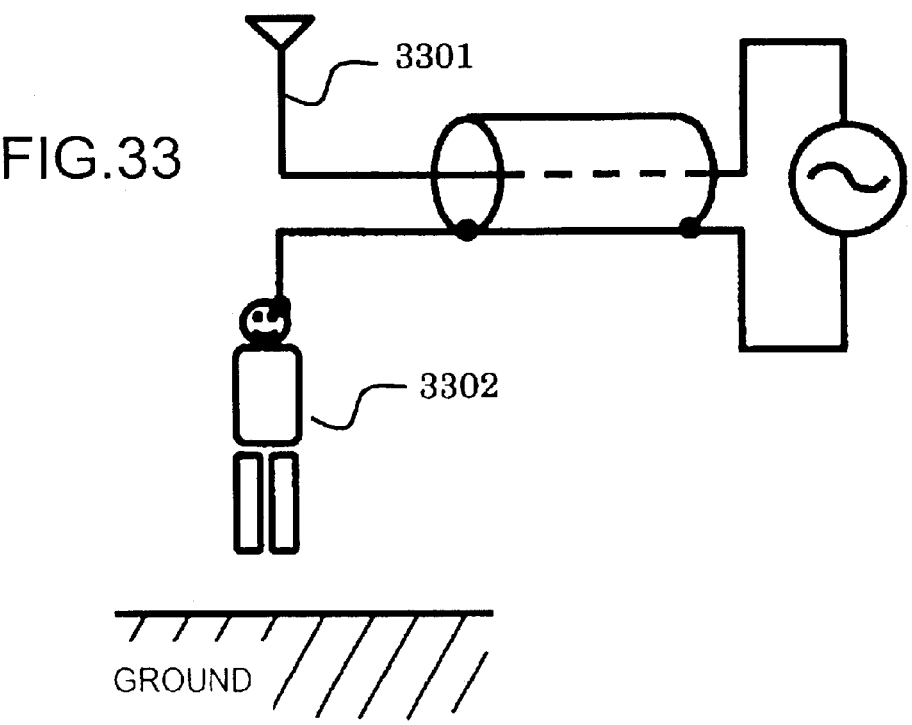
FIG. 33 is an explanatory drawing illustrating the operation according to the ninth embodiment mode of the present invention.

FIGS. 32 and 33 are explanatory drawings illustrating an operation according to this ninth embodiment mode.

As shown in FIG. 32, it may be the that the electronic equipment having the GND that is a power supply is a mono pole antenna construction having a mini ground, and it may be regarded that this equipment is a mono pole antenna having an unbalanced construction that is grounded from an antenna engineering viewpoint. With this construction, in the case where the GND is supposedly regarded as an ideal ground, an image antenna is formed in the ground (the same situation is obtained by connecting the human body to the GND side) and current having an in-phase flows thereto during transmission and reception. If the GND is regarded as an ideal ground, in the case of an electromagnetic wave of a vertically polarized wave, there occurs the 60% reduction of power efficiency at the worst. The GND constructed from the human body is not so strong. However, if the antenna 3201 is $\lambda/4$, for instance, this results in a gain that is lower than the original $\lambda/4$. In the case where the antenna unit constructs a horizontally polarized wave using a spiral or snake pattern or the like, for instance, current flowing to the image antenna has an opposite phase this time and there occurs a canceling-out action. As a result, attenuation becomes more prominent. It is possible to empirically confirm that almost no output flies in the case where a transceiver like this is actually placed on the ground.

In contrast to this, with the construction shown in FIG. 33, it is possible to regard the electronic equipment as a dipole antenna having completely balanced two lines that are not grounded from the antenna engineering viewpoint. If the original length of the antenna 3301 is λ/4 and the length of the human body antenna 3302 is regarded as λ/4, for instance, the total length becomes λ/2 and there is obtained an antenna whose gain is around 2 dB. As a result, a power receiving capability is improved.

FIG. 34 shows an antenna used in the electronic equipment according to this embodiment mode of the present invention. There is shown an example where the electronic equipment is an electronic wrist watch. Also, FIG. 34A shows an external appearance of the electronic equipment 3401, FIG. 34B is a front view of the antenna 3402, FIG. 34C is a cross-sectional view taken along the line A—A of FIG. 34B, and FIG. 34D is an enlarged view of a circular conductor pattern (patch) 3405 that is a construction element of the antenna. In these drawings, each same portion is given the same reference numeral.

As shown in FIG. 34A, a flat antenna (patch antenna) 3402 is arranged under the dial plate of the electronic equipment 3401. Note that in FIG. 34A, it is possible to see the antenna 3402 from the dial plate side. However, the construction may be changed so that it becomes impossible to see the antenna 3402.

As to the antenna 3402, as shown in FIGS. 34B and 34C, a wavy wiring conductor pattern 3404 is formed under a base 3408 of the dial plate and on one surface of a circular insulating substrate 3403 to connect a plurality of antenna conductors (patches) 3405 constructing the antenna. As to the characteristics of the substrate 3403, it is preferable that its tan δ is in a range of from $10^{-3}$ to $10^{-4}$ and its relative dielectric constant ϵr is in a range of from 1.2 to 5.0.

The antenna is connected to an internal circuit in a central portion 3406. It is preferable that the line length of a connection portion to the internal circuit is set at 1/(integer portion of λ). Also, a conductor (back plane) 3407 used as the GND is arranged on the entire of the other surface of the insulating substrate 3403. The wiring 3404 is constructed so that its length is elongated as much as possible to obtain a characteristic impedance Z0 of 100 Ω. As shown in FIG. 34D, each patch 3405 is formed so as to have a diameter of (λ/2)·√ϵr (√ϵr is an effective dielectric constant).

As described above, the flat antenna 3402 according to this embodiment mode has a construction where the back plane 3407, the insulating layer 3403, and the antenna conductor 3405 are overlaid on a cross-sectional lower layer.

Also, as to the antenna conductor 3405, the wiring pattern 3404 is allowed to extend from the patch 3405 that is a flat pattern, and this wiring pattern 3404 is also arranged at a position at which the pattern opposes the back plane 3407 with a predetermined interval therebetween.

Also, the flat pattern and the wiring pattern 3404 are formed so as to become the same plane.

Also, the wiring pattern 3404 is arranged on the insulating layer 3403.

In the case of a helical antenna (mono pole), it is required to separate the antenna from the vicinity of the human body by at least 10 mm to obtain a good characteristic. Also, in the case of a loop antenna, this antenna is placed in the vicinity of the human body, so that it may be conceived that a loop antenna of magnetic field type is suitable. However, in the case of 1 GHz or higher, absorption by the human body is predominant and such an antenna is not suitable.

In contrast to this, in the case of the flat antenna 3403 according to this embodiment mode, there is no shortcoming described above and a very good characteristic is exhibited even in the vicinity of the human body. For instance, this antenna is considerably practical because 0 dBi is obtained at around 2 GHz with a diameter of 20 mm. If a radio wave, whose frequency is 2 GHz or higher, is received and is used as electricity, the construction of the flat antenna 3403 according to this embodiment mode is effective. Also, the antenna 3403 is constructed in the manner described above, so that it is possible to reduce the thickness and size. An analog electronic wrist watch is used as the electronic equipment, so that it is also possible to use hands of the watch as antennas.

It should be noted here that the flat pattern and the wiring pattern 3404 may be formed so as to have a stepped surface or an inclined surface. Also, the flat antenna 3402 may be formed so as to have a flat plate shape, a bent shape, or a ring shape. Also, the antenna conductor 3405 may be formed using a circular pattern, a rectangular pattern, or other flat patterns. Each modification described above is applicable to the antenna to be described later.

FIG. 35 shows another antenna used in the electronic equipment according to this embodiment mode of the present invention. There is shown an example that is suited for the case where the aforementioned electronic equipment is an electronic wrist watch. Also, FIG. 35A is a front view of the antenna 3501 and FIG. 35B is a partial enlarged view of the antenna 3501. In these drawings, each same portion is given the same reference numeral.

As shown in FIGS. 35A and 35B, as to the antenna 3501, a wavy wiring conductor pattern 3503 is formed on one surface of a circular insulating substrate 3502 to connect a plurality of (four in this embodiment mode) circular conductor patterns (patches) 3504 constructing the antenna. A conductor (back plane) 3507 used as the GND is arranged on the entire opposite surface of the insulating substrate 3502. Also, a connection portion 3505 for establishing connection to the circuit of the apparatus is provided in the central portion of the insulating substrate 3502.

Each patch 3504 is formed so that its diameter is approximately equal to (λ/2n)×√ϵr (λ is the wavelength of an electromagnetic wave, n is an integer, and √ϵr is an effective dielectric constant).

As to the patch 3504, from a high frequency viewpoint, its center O becomes 0Ω and its outermost peripheral portion becomes, for instance, 300Ω to 500Ω. Therefore, if the wiring 3503 is connected to the outermost peripheral portion of the patch 3504 and is led out therefrom, there is obtained 500Ω. As a result, the pattern of the wiring 3503 becomes narrow and it becomes substantially difficult to form this wiring. It is required to finally obtain a predetermined value (50Ω, for instance). Therefore, cut-away portions are formed on the wiring 3503 side of the patch 3504, thereby forming a plurality of offset portions 3506. After the wiring 3503 is connected to a point of 200Ω and is temporarily routed using a wiring portion 3508 with 200Ω, this wiring is connected to a matching unit (not shown) using a wiring portion 3509 with 50 Ω.

It should be noted here that each patch 3504 may have a shape other than the circular shape, such as a rectangular. Also, it is not required that the number of the patches 3504 is set at four. That is, the number of the patches may be set at another number and it is more preferable that the number is a multiple of four.

Also, a low permittivity film, Teflon, glass epoxy, or the like may be used to form the substrate 3502. As to the low permittivity film, it is preferable that its relative dielectric constant ϵr is in a range of from 1.2 to 5.0 and its tan δ is in a range of from $10^{-3}$ to $10^{-4}$.

Figure 36:
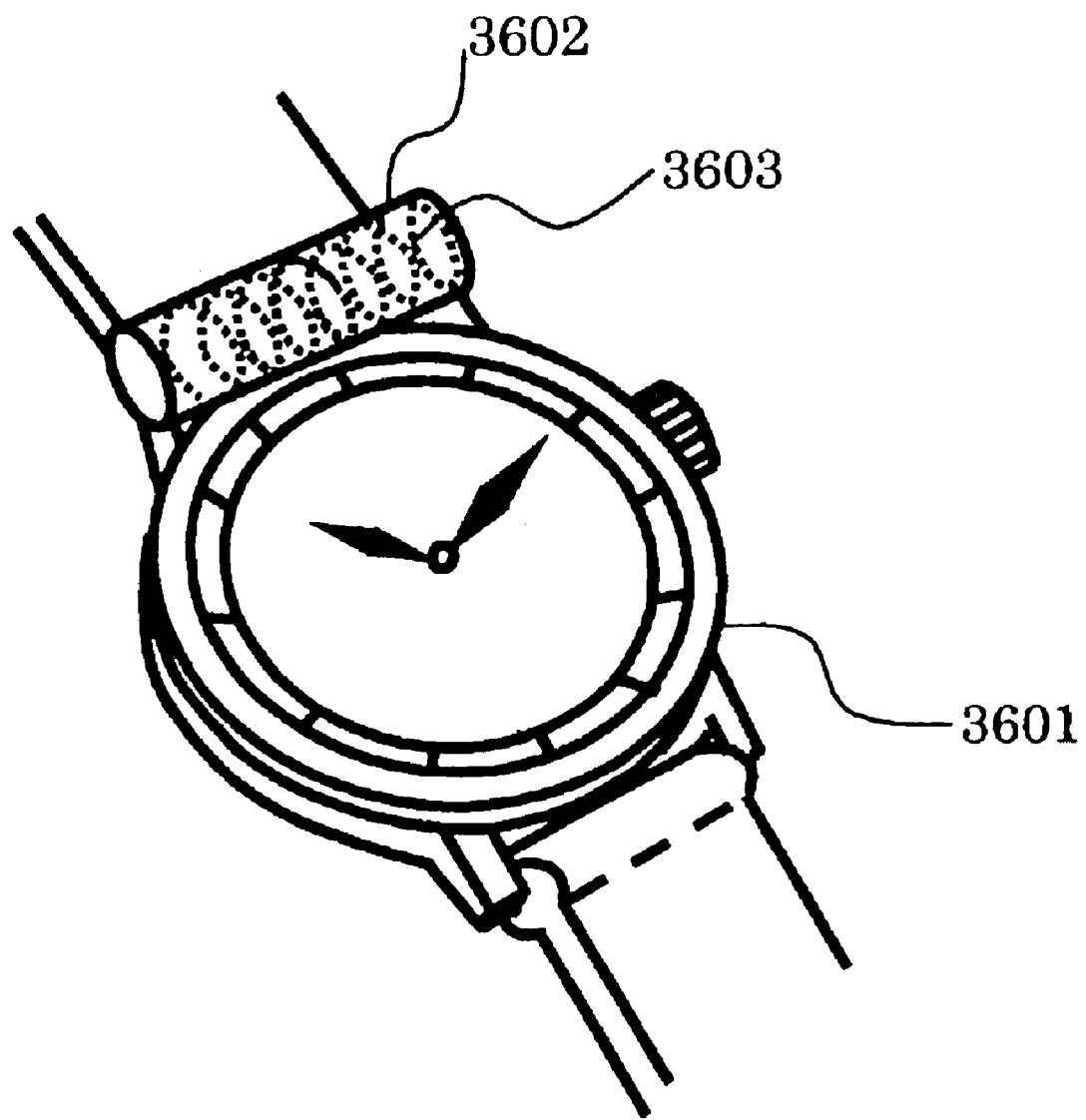
FIG. 36 is a drawing showing still another antenna used by the electronic equipment according to the embodiment mode of the present invention.

FIG. 36 is a drawing showing another antenna used by the electronic equipment according to this embodiment mode of the present invention. There is shown an example in which the electronic equipment is an electronic wrist watch.

In FIG. 36, an antenna 3603 is contained in an antenna container unit 3602 that is integrally formed with an electronic wrist watch 3601. In this embodiment mode, the antenna 3603 is used as a whip antenna formed with a coil-shaped electric wire.

FIG. 37 shows another antenna used by the electronic equipment according to this embodiment mode of the present invention. There is shown an example in which the electronic equipment is an electronic wrist watch. Also, FIG. 37A is an exploded perspective view of the electronic wrist watch and the antenna, FIG. 37B is a front view of the antenna 3703, and FIG. 37C is a cross-sectional view taken along the line A—A in FIG. 37B. In these drawings, each same portion is given the same reference numeral.

In FIG. 37, flexible flat antennas 3702 and 3703 are integrally arranged on surfaces of external portions of the electronic wrist watch 3701. For instance, the antenna 3702 is an antenna for a 1.5 GHz band and the antenna 3703 is an antenna for an 800 MHz band.

The antennas 3702 and 3703 differ from each other only in the used frequency band and are constructed to have the same construction. Therefore, the construction of the antennas 3702 and 3703 will be described by taking the antenna 3703 as an example.

As shown in FIGS. 37B and 37C, as to the antenna 3703, a line-shaped antenna conductor 3704 is formed through printing on one surface of a band-shaped insulating film 3706 and an insulating film 3707 is provided so as to cover the antenna conductor 3704. A connection unit 3705 is provided at the central portion of the film 3706 so as to continue to the antenna conductor 3704, and the antenna conductor 3704 is connected to the matching unit of the electronic circuit within the apparatus via the connection unit 3705.

Also, there is obtained a construction where a conductor (back plane) 3708 used as the GND is formed through printing on the entire of the other surface of the film 3706. The conductor 3708 also functions as a reflecting plate and there may be a case where a gain difference of several dB is caused by the presence or absence of the conductor 3708. In accordance with the usage manner, the presence or absence and the shape of the conductor 3708 are changed.

It should be noted here that a single antenna may be used instead of the plurality of antennas 3702 and 3703. In this case, the antenna may be arranged in the entire peripheral region of the side surface of the electronic wrist watch 3701. Also, the antenna may be arranged within a wristband.

Figure 38:
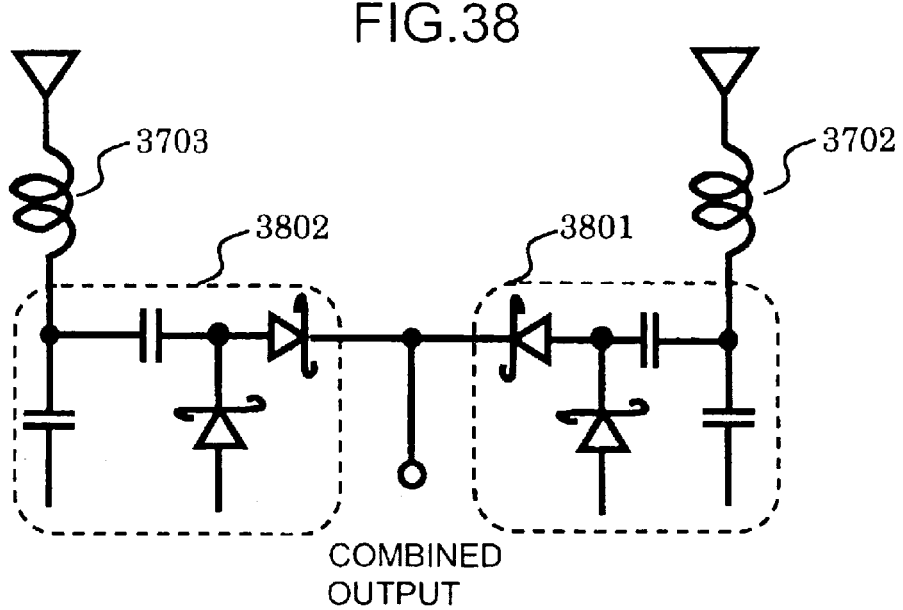
FIG. 38 is a circuit diagram in which the antenna shown in FIG. 37 is used.

FIG. 38 is a circuit diagram that uses the antennas 3702 and 3703 shown in FIG. 37. The same portions as in FIG. 37 are given the same reference numerals.

In FIG. 38, an AC signal generated by the antenna 3702 is rectified to direct current by the rectifier unit 3801 and an AC signal generated by the antenna 3703 is rectified to direct current by the rectifier unit 3802. The outputs from respective rectifier units 3801 and 3802 are combined with each other and are output.

Figure 39:
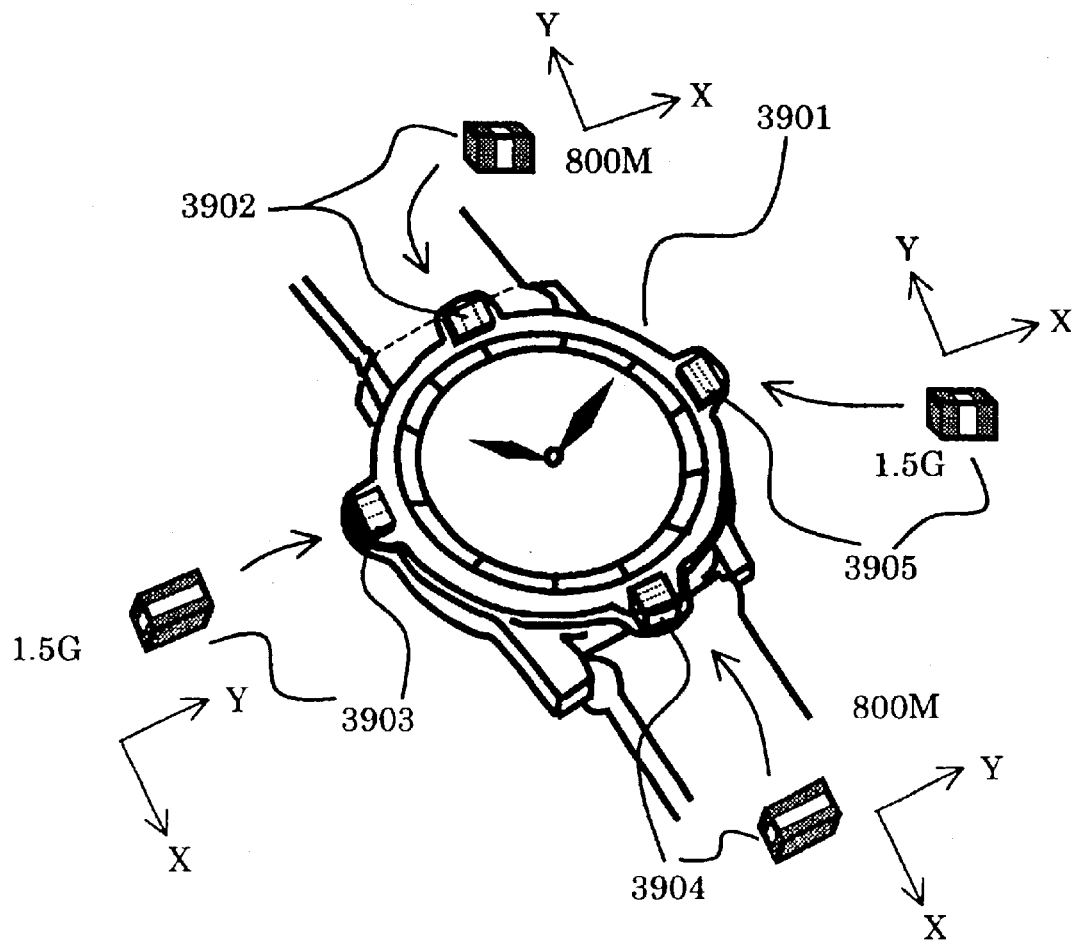
FIG. 39 is a drawing showing another antenna used by the electronic equipment according to the embodiment mode of the present invention.
Figure 40:
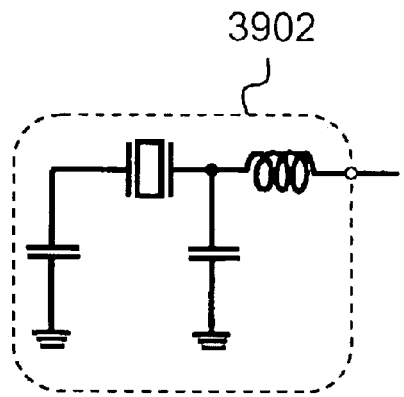
FIG. 40 is a drawing showing an equivalent circuit of the antenna used in FIG. 39.

FIG. 39 is a drawing showing another antenna used by the electronic equipment according to this embodiment mode of the present invention, and shows an example where the aforementioned electronic equipment is an electronic wrist watch. Also, FIG. 40 shows an equivalent circuit of the antenna used in this embodiment mode.

In FIG. 39, a plurality of dielectric antennas 3902 to 3905 are contained within the outer peripheral portion of the shell of the electronic wrist watch 3901. The antennas 3902 and 3904 are antennas for an 800 MHz band, while the antennas 3903 and 3905 are antennas for a 1.5 GHz band. There is obtained a construction where a dielectric is sandwiched between a pair of electrodes.

The antennas 3902 and 3904 that use the same frequency band and the antennas 3903 and 3905 that use the same frequency band are arranged so that their directions alternatively differ from each other. That is, each of the antennas 3902 to 3905 has a directivity in a predetermined direction. Therefore, in order to receive electromagnetic waves in every direction, the antennas 3902 and 3904 are arranged so that their directions differ from each other by 90°, and the antennas 3903 and 3905 are arranged so that their directions differ from each other by 90°.

Respective antennas 3902 to 3905 have basically the same construction. The antenna 3902 is shown by way of an example of its construction by the equivalent circuit shown in FIG. 40.

Figure 41:
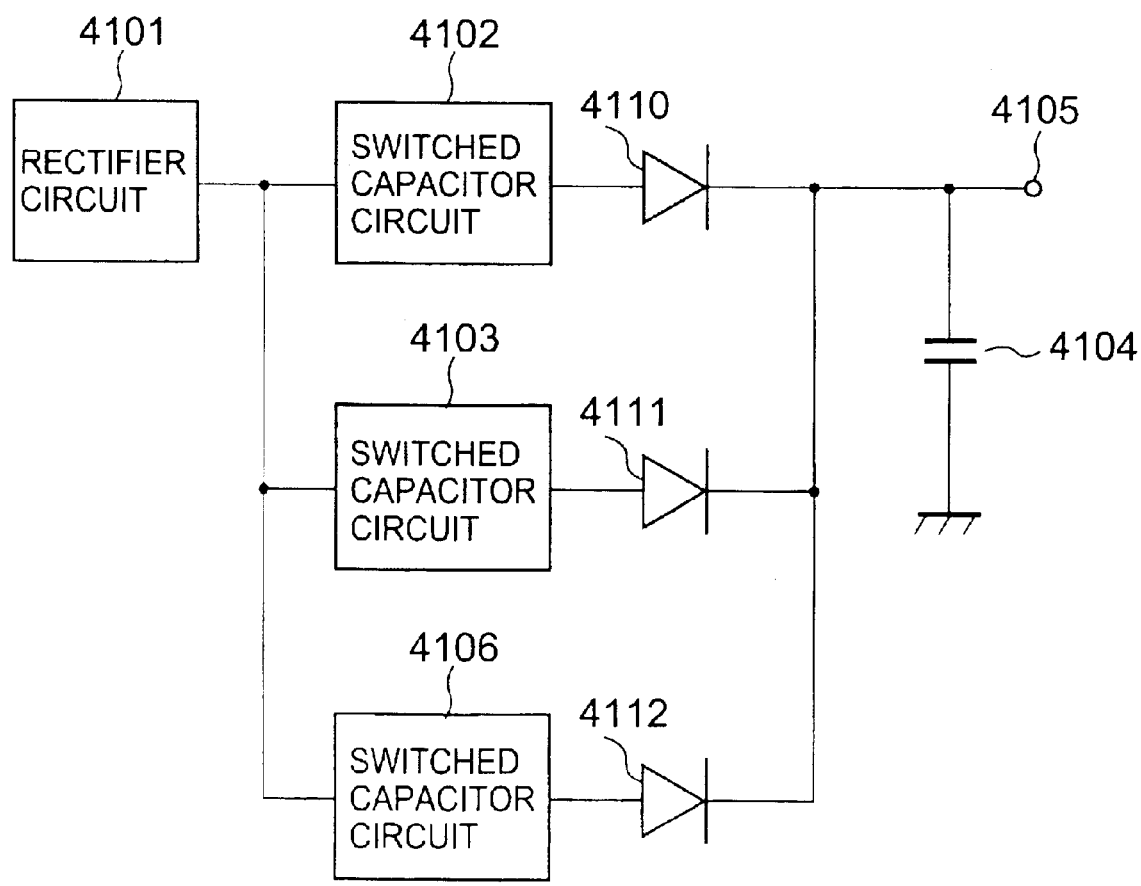
FIG. 41 is a block diagram illustrating another circuit construction of the control unit of the power supply apparatus shown in FIG. 1.

FIG. 41 is a block diagram illustrating another circuit construction of the control unit of the power supply apparatus shown in FIG. 1. For instance, as shown in FIG. 41, a plurality of switched capacitor circuits 4102, 4103, and 4106 (which each correspond to FIG. 6) may be provided for the rectifier circuit 4101 and be arranged in parallel to each other with their unique backflow prevention diodes 4110, 4111, and 4112. With this construction, the phases of clock signals for controlling the turning ON/OFF of the switching element are shifted from each other for the respective switched capacitor circuits 4102, 4103, and 4106. For instance, three switched capacitor circuits are used in this case, so that there is obtained a good balance when the phases are shifted from each other by 90°. In this manner, it becomes possible to reduce the dead time due to the turning ON/OFF of the switches and there is improved efficiency.

Figure 42:
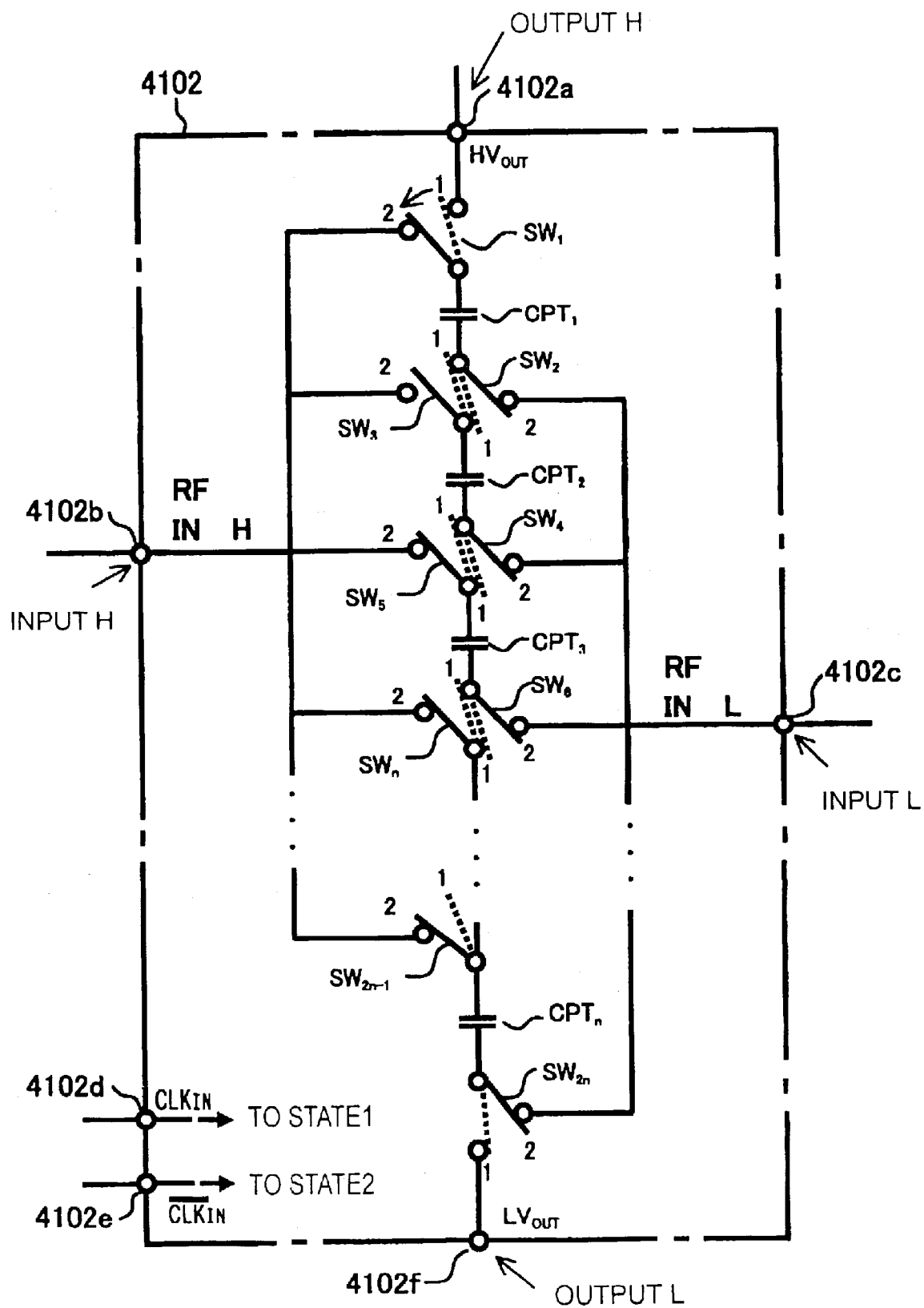
FIG. 42 is a circuit shown the switched capacitor circuit 4102.
Figure 43:
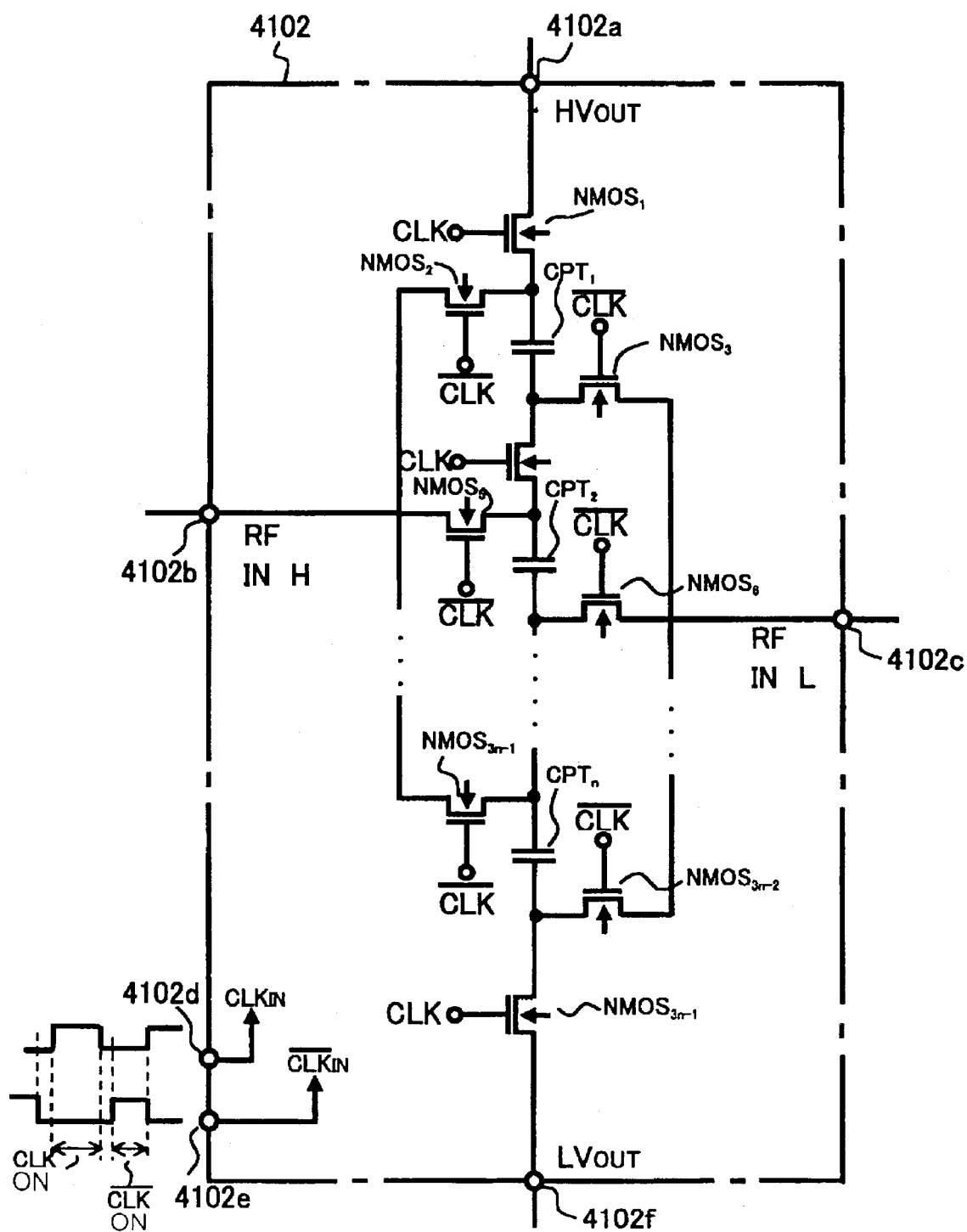
FIG. 43 shows a specific example of the circuit construction of the switched capacitor circuit 4102 illustrated in FIG. 42.

Also, the circuits shown in FIGS. 42 and 43 may be used as the switched capacitor circuit 4102. In this switched capacitor circuit 4102, symbols SW1 to SW2$n$ denote switches and symbols CPT1 to CPT$n$ represent capacitors. In addition, in FIGS. 42 and 43, reference symbols 4102$b$ and 4102$c$ denote input terminals and reference symbols 4102$a$ and 4102$f$ represent output terminals.

A clock signal for switching each of the switches SW1 to SW2$n$ to the "1" side (state 1) is inputted into the clock input terminal 4102$d$, while a reverse clock signal for switching each of the switches SW1 to SW2$n$ to the "2" side (state 2) is inputted into the reverse clock input terminal 4102$e$.

The aforementioned capacitors CPT1 to CPT$n$ are connected in series and are inserted between an HV output terminal 4102$a$ and an LV output terminal 4102$f$ under the state 1, and are connected in parallel and are connected to the switches SW1 to SW2$n$ so that these capacitors are inserted between RF input terminals 4102$b$ and 4102$c$ under the state 2. Also, the switches SW1 to SW2$n$ are connected between the respective terminals 4102$a$ and 4102$b$ so that the capacitors CPT1 to CPT$n$ are connected in the manner described above.

How this switched capacitor circuit 4102 operates will be described below. Under the state 1, the capacitors CPT1 to CPT$n$ that are connected in series are connected to a storage capacitor 4104 via the HV output terminal 4102$a$ and perform discharging. Also, under the state 2, the capacitors CPT1 to CPT$n$ that are connected in parallel are connected via the RF input terminals 4102$b$ and 4102$c$ and electricity is accumulated in the respective capacitors CPT1 to CPT$n$.

The states 1 and 2 are alternatively repeated at a predetermined frequency (cycle) by the switches SW1 to SW2n, whose switching is controlled by the clock signal and the reverse clock signal inputted into the clock input terminal 4102d and the reverse clock input terminal 4102e. Accordingly, the aforementioned charging and discharging operation of the capacitors CPT1 to CPTn is repeated at the predetermined frequency and electric charges are pumped into the storage capacitor 4104.

FIG. 43 shows a specific example of the circuit construction of the switched capacitor circuit 4102 illustrated in FIG. 42. In FIG. 43, each of NMOS 1 to NMOS 3n-1 represents an N-channel type MOSFET. In addition, in FIG. 43, portions given the same reference numerals as in FIG. 42 represent the same or equivalent portions.

Figure 44:
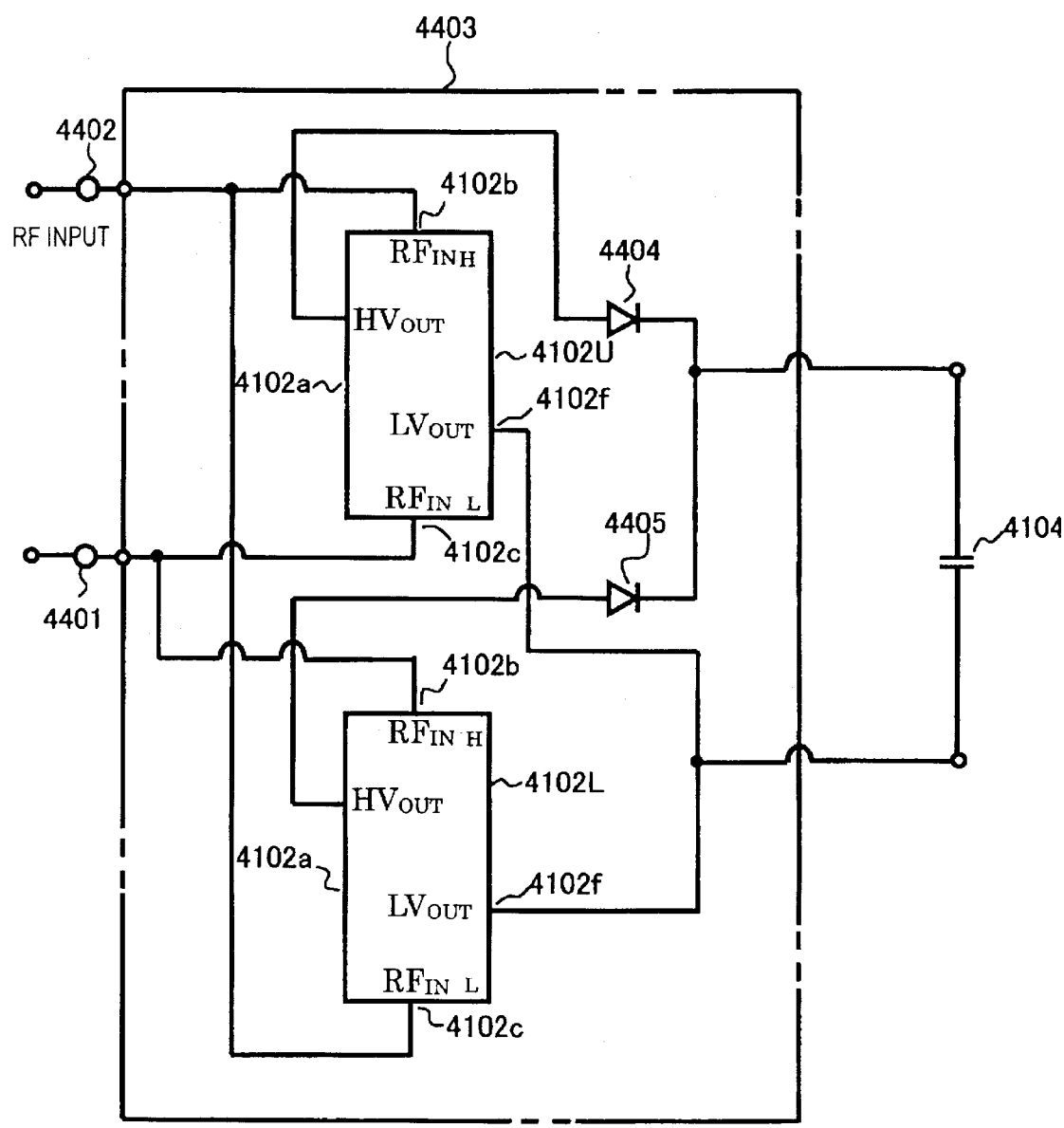
FIG. 44 shows a still another embodiment mode of a control unit.

FIG. 44 shows another embodiment mode of the control unit. In this embodiment mode, electric charges accumulated in each capacitor of the switched capacitor circuit 4102 are directly accumulated in the storage capacitor by performing the switching of switching elements without performing the clock control described above. In FIG. 44, reference numeral 4401 denotes an RF input terminal H; 4402, an RF input terminal C; 4403, an integrated circuit (control unit) constructed from a signal chip (monolithic) IC; 4102U and 4102L, switched capacitor circuits; and 4404 and 4405, backflow prevention diodes.

The switched capacitor circuits 4102U and 4102L accumulate electricity in the storage capacitor 4104 using a voltage output HVOUT by obtaining RF inputs from the RF input terminals 4401 and 4402.

The switched capacitor circuits 4102U and 4102L include an RFH input terminal 4102b, an RFL input terminal 4102c, an HV output terminal 4102a, and an LV output terminal 4102f.

The RFH input terminal 4102b and the RFL input terminal 4102c of these switched capacitor circuits 4102U and 4102L form a so-called cross-connection with respect to the RF inputs. That is, the RFH input terminal 4102b of the switched capacitor circuit 4102U and the RFL input terminal 4102c of the switched capacitor circuit 4102L are each connected to the RF input terminal H4402. Also, the RFL input terminal 4102b of the switched capacitor circuit 4102U and the RFH input terminal 4102c of the switched capacitor circuit 4102L are each connected to the RF input terminal 4401.

On the other hand, the HV output terminal 4102a of the switched capacitor circuit unit 4102U is connected to one end of the storage capacitor 4104 via the backflow prevention diode 4404, and the HV output terminal 4102a of the switched capacitor circuit 4102L is connected to one end of the storage capacitor 4104 via the backflow prevention diode 4405.

Also, the LV output terminal 4102f of the switched capacitor circuit 4102U and the LV output terminal 4102f of the switched capacitor circuit 4102L are commonly connected to one end of the storage capacitor 4104.

Figure 45:
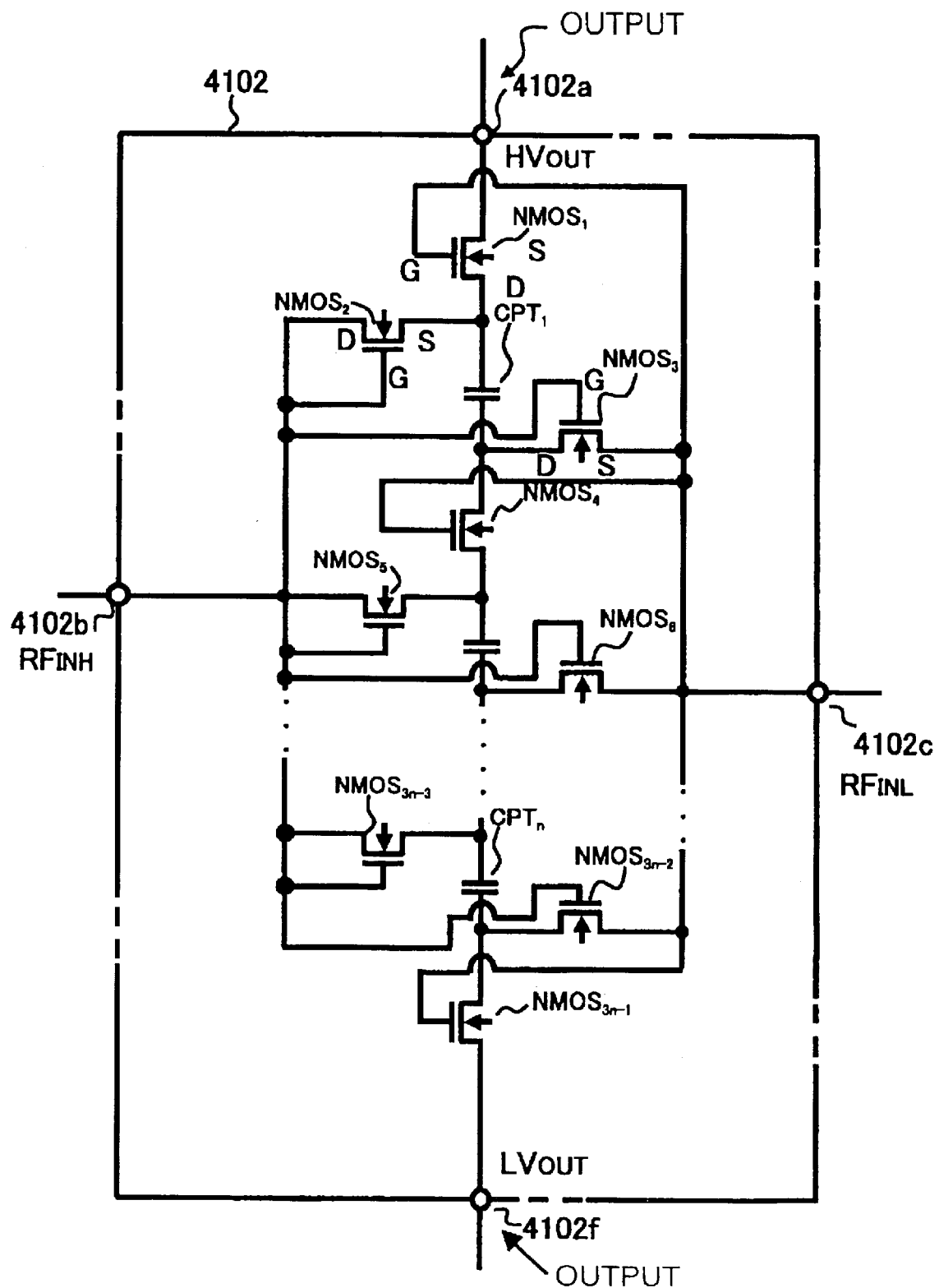
FIG. 45 shows a specific example of a circuit construction of the switched capacitor circuit 4102 illustrated in FIG. 44.

FIG. 45 shows a specific example of a circuit construction of the switched capacitor circuit 4102 illustrated in FIG. 44. The construction in FIG. 45 is approximately the same as the construction in FIG. 43, although the clock control of switches is not performed in FIG. 45. That is, in this embodiment mode, an inputted microwave pulse performs the opening/closing of the switches by directly driving the MOS gate that is a switching element. Consequently, it becomes unnecessary to perform the clock control described above, so that the amount of consumed electric charges is reduced and there is realized an efficient operation. In addition, in FIG. 45, the same reference symbols as in FIG. 43 denote the same or equivalent portions.

Figure 46:
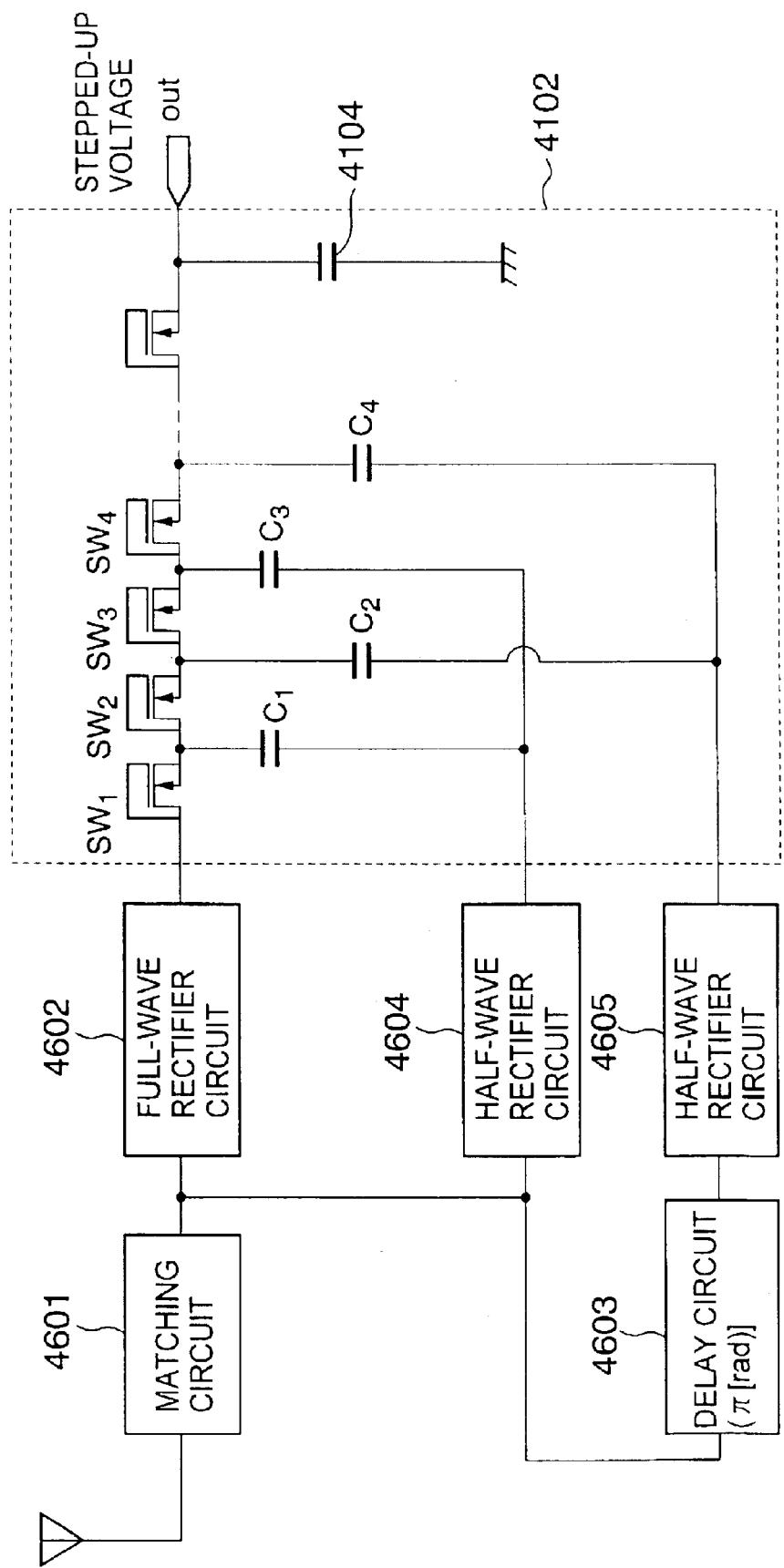
FIG. 46 is a circuit diagram showing a still another embodiment mode.

FIG. 46 is a circuit diagram showing a still another embodiment mode. In this embodiment mode, without using a clock signal (CK) that is shown in FIG. 1 and is used in the first embodiment mode, the switching of the respective switches SW1, SW2, SW3, . . . is performed by utilizing the amplitude of the frequency (RF signal) of a microwave received by a reception circuit 4601. That is, the RF signal of the microwave received by the reception circuit 4601 is sent from a full wave rectifier circuit 4602 to one end of respective capacitors C1, C2, C3, . . . of the switched capacitor circuit 4102. Also, the RF signal is alternatively connected to the capacitors C1, C2, C3, . . . before the full wave rectifier circuit 4602 via the half wave rectifier circuits 4604 and 4605. In addition, the phase of the RF signal is shifted by π [rad] by a delay circuit 4603 at the half wave rectifier circuit 4605. In this embodiment mode, a clock generating circuit becomes unnecessary, so that power consumption is reduced accordingly and it becomes possible to use electric power with higher efficiency.

Figure 47:
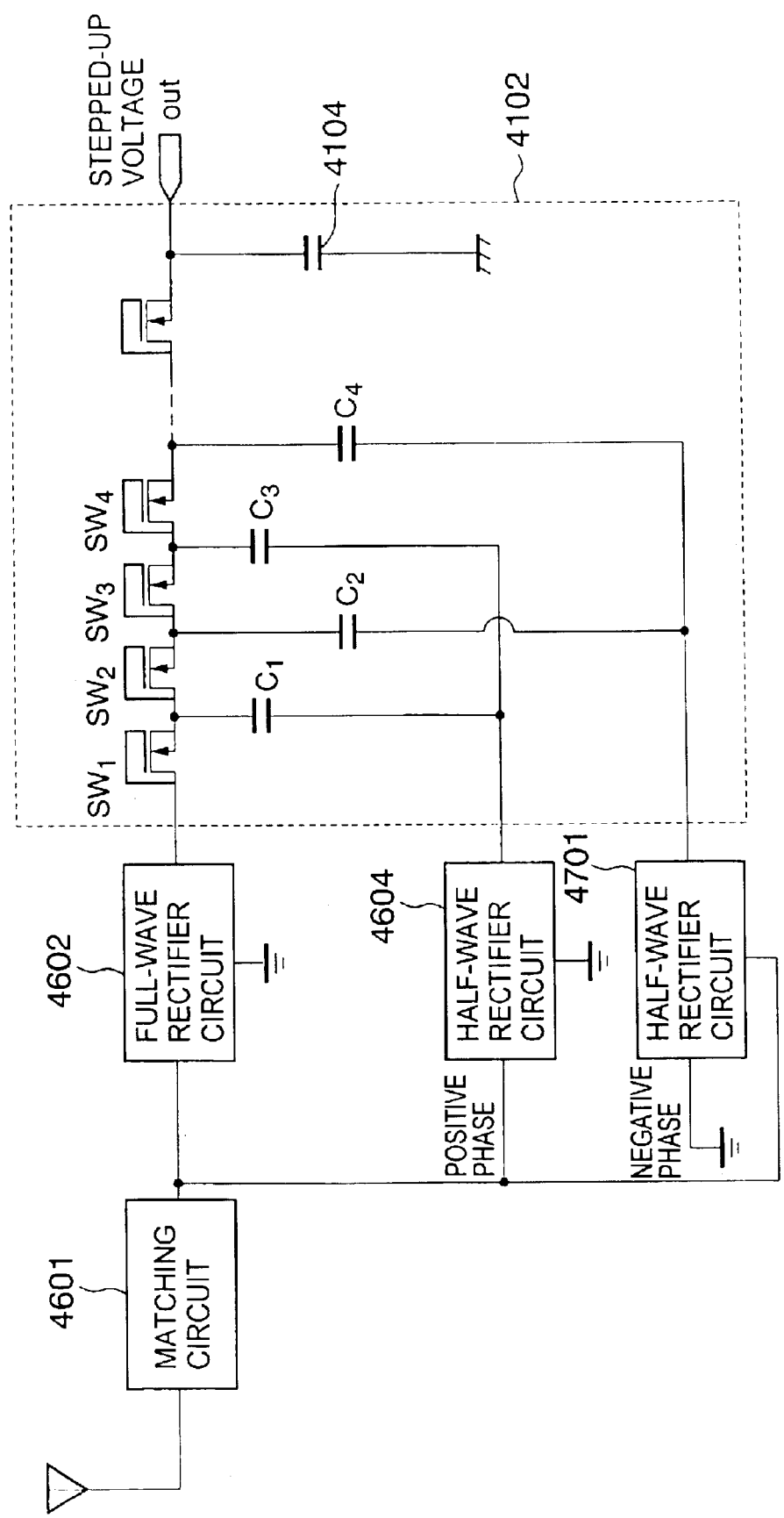
FIG. 47 is a circuit diagram showing a still another embodiment mode.
Figure 48A:
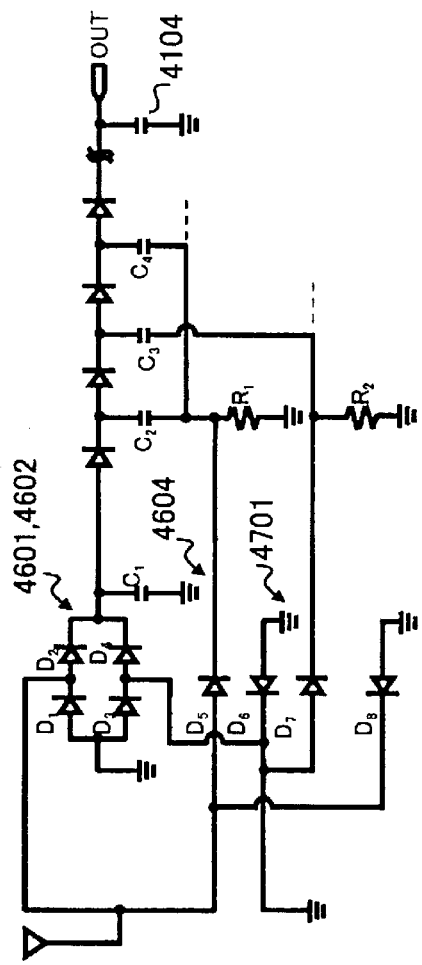
FIGS. 48A and 48B are circuit diagrams showing a still another embodiment mode.
Figure 48B:
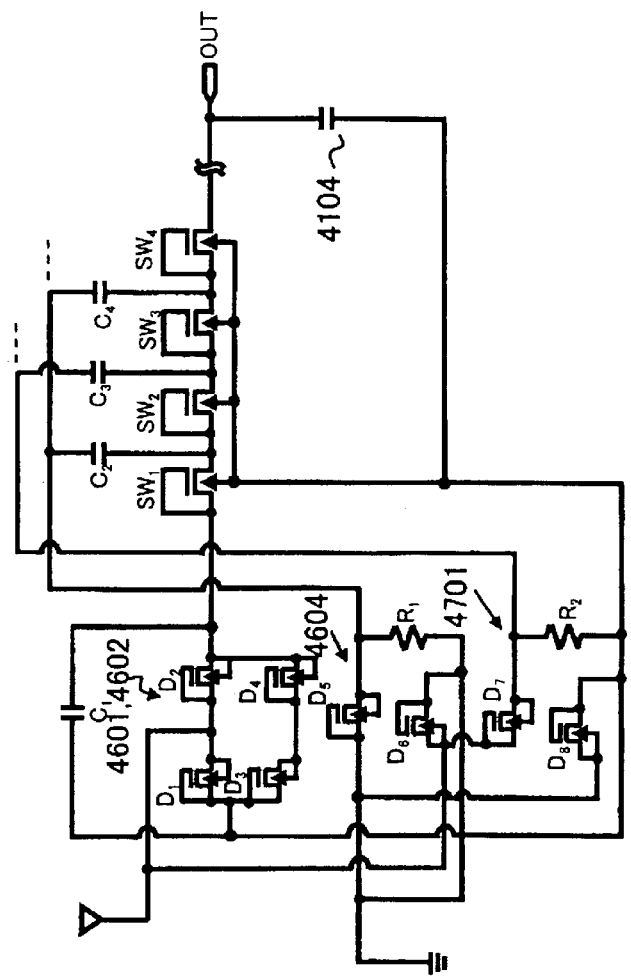

FIGS. 47 and 48 are circuit diagrams showing a still another embodiment mode. FIGS. 48A and 48B are each a drawing showing a specific construction of the circuit shown in FIG. 47. In this embodiment mode, like in the embodiment mode shown in FIG. 46, without using the clock signal (CK), the switching of the respective switches SW1, SW2, SW3, . . . is performed by utilizing the amplitude of the frequency (RF signal) of a microwave received by the reception circuit 4601. Also, without providing the delay circuit 4603, there is used a half wave rectifier circuit 4701 having an opposite phase. Other aspects are the same as those in the embodiment mode illustrated in FIG. 46 described above. Note that in FIG. 48B, symbols D1 to D8 denote MOSFET gates.

Figure 49:
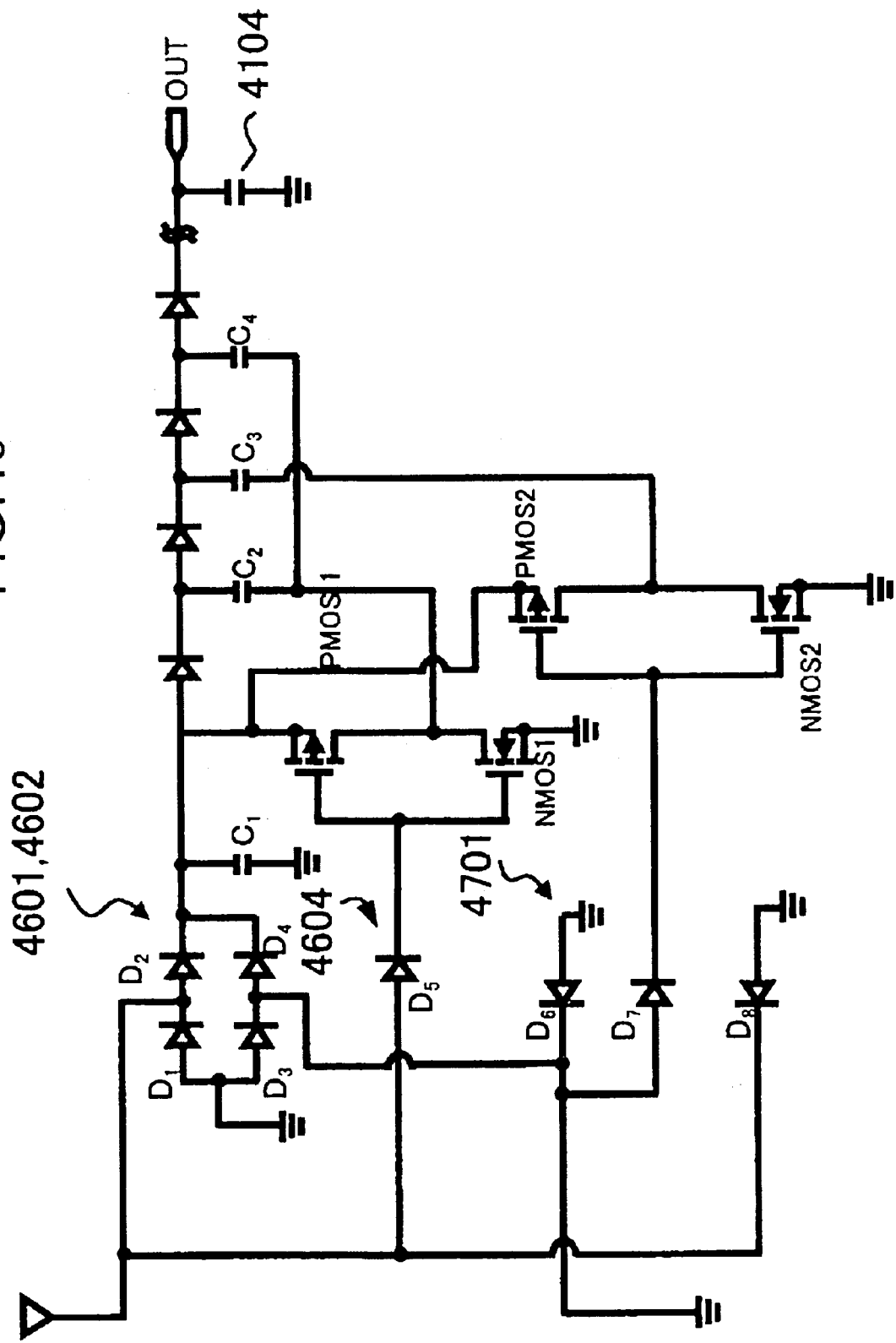
FIG. 49 is a drawing showing a still another specific construction of the circuit shown in FIG. 47.

FIG. 49 is a drawing showing a still another specific construction of the circuit shown in FIG. 47. Construction elements R1 and R2 shown in FIG. 48A are replaced with MOSFETs. With the circuit shown in FIG. 49, self power consumption is reduced and there is realized higher efficiency.

As described above, according to the present invention, it becomes possible to collect a radio wave propagating in the air, convert collected electromagnetic energy into electric power, generate electric power having a DC waveform by rectifying electric power having an AC waveform, charge the rectified electric power having the DC waveform into a storage battery, and supply an electric load with the rectified electric power having the DC waveform or with electric power having a DC waveform discharged from the storage battery. In particular, it becomes possible to extract electromagnetic energy from a pulse wave used for the transmission and reception of data by a mobile telephone or the like and to perform charging. This makes it possible to provide a power supply apparatus that becomes an unprecedented ecological energy source. Accordingly, there is also achieved an effect that the number of disposable batteries is reduced. Also, from viewpoints of quantative grasp and risk aversion concerning harmful electric fields, it also becomes possible to provide a new electric field monitoring apparatus, which raises an expectation that a new market will be created.

What is claimed is:

1. A power supply apparatus comprising: an electromagnetic energy conversion unit for collecting electromagnetic energy from a radio wave that propagates through air and converting the electromagnetic energy into AC power; a rectifier unit for rectifying the AC power into DC power; a voltage step-up circuit for stepping up a voltage of the DC power; a storage battery connected to be charged with the DC power and which discharges the charged DC power to a load; and a control unit for controlling the charging and discharging of the storage battery.

2. A power supply apparatus according to claim 1; further comprising a first input terminal that is placed in contact with a human body to input the radio wave via the human body; and a second input terminal that connects a ground within the apparatus to the human body; wherein the rectifier unit rectifies the AC power input from the electromagnetic energy conversion unit and the first input terminal.

3. A power supply apparatus according to claim 2; wherein the first and second input terminals respectively comprise a positive electrode terminal and a negative electrode terminal each of which come into contact with the human body; and wherein the electrode terminals have a circular shape and are concentrically arranged or spaced apart.

4. A power supply apparatus according to claim 1; further comprising a matching unit for performing impedance matching between the electromagnetic energy conversion unit and the rectifier unit.

5. A power supply apparatus according to claim 4; wherein the matching unit comprises a resistor.

6. A power supply apparatus according to claim 4; wherein the matching unit is a series resonance circuit having a capacitor and an inductor.

7. A power supply apparatus according to claim 4; wherein the matching unit is a resonance circuit having a capacitor and an inductor.

8. A power supply apparatus according to claim 1; wherein the control unit comprises two backflow prevention rectifier elements that perform rectification toward the storage battery, and the voltage-step up circuit is connected to an input terminal side of one of the backflow prevention rectifier elements.

9. A power supply apparatus according to claim 8; wherein the control unit further comprises monitoring means for monitoring an input voltage of the DC power, terminating an operation of the voltage step-up circuit if the input voltage is higher than a predetermined value so that the input DC power is directly supplied to the storage battery, and controlling an operation of the voltage step-up circuit to step up the input voltage if the input voltage is lower than the predetermined value.

10. A power supply apparatus according to claim 9; wherein the control unit further comprises a storage battery voltage monitoring means for monitoring a storage battery voltage and terminating driving of the voltage step-up circuit if the storage battery voltage is a predetermined value or more.

11. A power supply apparatus according to claim 1; wherein the voltage step-up circuit is of a switched capacitor type having one or more stages each comprising a switch element connected to a capacitor and an oscillation circuit for generating a clock signal for controlling a timing of a step-up operation performed by the voltage-step up circuit.

12. A power supply apparatus according to claim 11; wherein the voltage step-up circuit further comprises a buffer circuit connected to an output of the oscillation circuit for amplifying a potential at one end of the capacitor in accordance with the clock signal, a power supply of the buffer circuit being connected to an output side of the rectifier unit so that the buffer circuit is operated by the DC power.

13. A power supply apparatus according to claim 11; wherein the voltage step-up circuit comprises a plurality of the stages, and the switch element convert a parallel connection of the capacitors of the respective stages into a series connection.

14. A power supply apparatus according to claim 11; further comprising a matching unit for performing impedance matching between the electromagnetic energy conversion unit and the rectifier unit.

15. A power supply apparatus according to claim 14; wherein the oscillation circuit generates a clock signal for controlling the switch element of each stage from an RF signal output by the matching unit.

16. A power supply apparatus according to claim 11; wherein the voltage step-up circuit further comprises a plurality of half wave rectifier circuits for outputting rectifier signals having phases shifted from each other by 180°, and the oscillator circuit generates the clock signal from the rectifier signals for controlling the switch element of each stage of the voltage step-up circuit.

17. A power supply apparatus according to claim 11; wherein the control unit further comprises an additional one or more voltage step-up circuits electrically connected in parallel, each of the voltage step-up circuits includes a backflow prevention element, and the clock signal is applied to each of the voltage step-up circuits with different phases to sequentially operate the respective voltage step-up circuits.

18. A power supply apparatus according to claim 1; wherein the electromagnetic energy conversion unit is one of a whip antenna using a spiral electric wire and a dielectric antenna using a dielectric.

19. A power supply apparatus according to claim 1; wherein the rectifier unit comprises a half wave voltage-doubler rectifier circuit comprised of a first diode and a second diode connected together in a forward direction.

20. A power supply apparatus according to claim 19; wherein a ratio If/IR of a forward current to a reverse current of one of the first and second diodes is smaller than If/IR of the other of the first and second diodes.

21. A power supply apparatus according to claim 20; wherein at least one of the diodes is formed by a MOSFET.

22. A power supply apparatus according to claim 1; wherein the rectifier unit includes a single diode and an inductor for biasing the diode.

23. A power supply apparatus according to claim 1; wherein the rectifier unit comprises diode having an anode connected to ground and a cathode connected to an AC signal side, a $\lambda/4$ line having one end connected to a cathode of the diode, a conductor opposing the $\lambda/4$ line, and a capacitor connected between the other end of the $\lambda/4$ line and ground.

24. A power supply apparatus according to claim 1; wherein the diode comprises a MOSFET.

25. A power supply apparatus according to claim 1; wherein the electromagnetic energy conversion unit comprises an antenna.

26. A power supply apparatus according to claim 1; wherein the electromagnetic energy conversion unit is a flat antenna comprised of a layered structure of a back plane, an insulating layer, and an antenna conductor.

27. A power supply apparatus according to claim 26; wherein the flat antenna has has one of a flat plate shape, a bent shape, and a ring shape.

28. A power supply apparatus according to claim 27; wherein the antenna conductor has one of a circular pattern and a rectangular pattern.

29. A power supply apparatus according to claim 28; wherein the antenna conductor has a flat pattern.

30. A power supply apparatus according to claim 29; wherein the antenna conductor has a wiring pattern extending from the flat pattern and opposing the back plane.

31. A power supply apparatus according to claim 30; wherein the flat pattern and the wiring pattern have one of a stepped surface or an inclined surface.

32. A power supply apparatus according to claim 31; wherein the wiring pattern is on the insulating layer.

33. An electronic device comprising: a power supply apparatus according to claim 1; and an electronic circuit driven by the DC power output by the power supply apparatus.

34. An electronic wristwatch comprising: a case; a power supply apparatus according to claim 1 provided in the case; and a time counting mechanism provided in the case and being driven by the DC power output by the power supply apparatus.

35. An electronic wristwatch according to claim 34; wherein the electronic energy conversion unit comprises an antenna formed on a dial of the wristwatch.

36. An electronic wristwatch according to claim 34; wherein the electronic energy conversion unit comprises an electrode provided on the case for coming into contact with a human body when the wristwatch is being worn.

37. A power supply apparatus comprising: an electromagnetic energy conversion unit for collecting electromagnetic energy from a radio wave that propagates through air and converting the electromagnetic energy into AC power; an input terminal that is brought into contact with a human body to input the radio wave via the human body; a rectifier unit for rectifying the AC power input from the electromagnetic energy conversion unit or the input terminal and outputting DC power; a voltage step-up circuit for stepping up a voltage of the DC power; a storage battery connected to be charged with the DC power and which discharges the charged DC power to a load; and a control unit for controlling the charging and discharging of the storage battery.

38. A power supply apparatus according to claim 37; wherein the input terminal comprises a positive electrode terminal and a negative electrode terminal each of which comes into contact with the human body; and wherein the electrode terminals have a circular shape and are concentrically arranged or spaced apart.

39. A power supply apparatus according to claim 37; further comprising a matching unit for performing impedance matching between the electromagnetic energy conversion unit and the rectifier unit.

40. A power supply apparatus according to claim 39; wherein the matching unit comprises a resistor.

41. A power supply apparatus according to claim 39; wherein the matching unit is a series resonance circuit having a capacitor and an inductor.

42. A power supply apparatus according to claim 39; wherein the matching unit is a resonance circuit having a capacitor and an inductor.

43. A power supply apparatus according to claim 37; wherein the control, unit comprises two backflow prevention rectifier elements that perform rectification toward the storage battery, and the voltage step-up circuit is connected to an input terminal side of one of the backflow prevention rectifier elements.

44. A power supply apparatus according to claim 43; wherein the control unit further comprises monitoring means for monitoring an input voltage of the DC power, terminating an operation of the voltage step-up circuit if the input voltage is higher than a predetermined value so that the input DC power is directly supplied to the storage battery, and controlling an operation of the voltage step-up circuit to step up the input voltage if the input voltage is lower than the predetermined value.

45. A power supply apparatus according to claim 44; wherein the control unit further comprises a storage battery voltage monitoring means for monitoring a storage battery voltage and terminating driving of the voltage step-up circuit if the storage battery voltage is a predetermined value or more.

46. A power supply apparatus according to claim 37; wherein the voltage step-up circuit is of a switched capacitor type having one or more stages each comprising a switch element connected to a capacitor and an oscillation circuit for generating a clock signal for controlling a timing of a step-up operation performed by the voltage-step up circuit.

47. A power supply apparatus according to claim 46; wherein the voltage step-up circuit further comprises a buffer circuit connected to an output of the oscillation circuit for amplifying a potential at one end of the capacitor in accordance with the clock signal, a power supply of the buffer circuit being connected to an output side of the rectifier unit so that the buffer circuit is operated by the DC power.

48. A power supply apparatus according to claim 46; wherein the voltage step-up circuit comprises a plurality of the stages, and the switch element convert a parallel connection of the capacitors of the respective stages into a series connection.

49. A power supply apparatus according to claim 46; further comprising a matching unit for performing impedance matching between the electromagnetic energy conversion unit and the rectifier unit.

50. A power supply apparatus according to claim 49; wherein the oscillation circuit generates a clock signal for controlling the switch element of each stage from an RF signal output by the matching unit.

51. A power supply apparatus according to claim 46; wherein the voltage step-up circuit further comprises a plurality of half wave rectifier circuits for outputting rectifier signals having phases shifted from each other by 180°, and the oscillator circuit generates the clock signal from the rectifier signals for controlling the switch element of each stage of the voltage step-up circuit.

52. A power supply apparatus according to claim 46; wherein the control unit further comprises an additional one or more voltage step-up circuits electrically connected in parallel, each of the voltage step-up circuits includes a backflow prevention element, and the clock signal is applied to each of the voltage step-up circuits with different phases to sequentially operate the respective voltage step-up circuits.

53. A power supply apparatus according to claim 37; wherein the electromagnetic energy conversion unit is a flat antenna comprised of a layered structure of a back plane, an insulating layer, and an antenna conductor.

54. A power supply apparatus according to claim 53; wherein the antenna conductor has one of a circular pattern or a rectangular pattern.

55. A power supply apparatus according to claim 53; wherein the antenna conductor has a flat pattern.

56. A power supply apparatus according to claim 55; wherein the antenna conductor further comprises a wiring pattern extending from the flat pattern and opposing the back plane.

57. A power supply apparatus according to claim 56; wherein the flat pattern and the wiring pattern have either a stepped surface or an inclined surface.

58. A power supply apparatus according to claim 57; wherein the wiring pattern is on the insulating layer.

59. A power supply apparatus according to claim 56; wherein the flat pattern and the wiring pattern lie in the same plane.

60. A power supply apparatus according to claim 59; wherein the wiring pattern is on the insulating layer.

61. A power supply apparatus according to claim 53; wherein the flat antenna has one of a flat plate shape, a bent shape, and a ring shape.

62. A power supply apparatus according to claim 37; wherein the electromagnetic energy conversion unit is one of a whip antenna using a spiral electric wire and a dielectric antenna using a dielectric.

63. A power supply apparatus according to claim 37; wherein the rectifier unit comprises a half wave voltage-doubler rectifier circuit comprised of first diode and a second diode connected together in a forward direction.

64. A power supply apparatus according to claim 63; wherein a ratio If/IR of a forward current to a reverse current of one of the first and second diodes is smaller than If/IR of the other of the first an second diodes.

65. A power supply apparatus according to claim 64; wherein at least one of the diodes comprises a MOSFET.

66. A power supply apparatus according to claim 37; wherein the rectifier unit includes a single diode and an inductor for biasing the diode.

67. A power supply apparatus according to claim 66; wherein the diode is formed of a MOSFET.

68. A power supply apparatus according to claim 37; wherein the rectifier unit comprises a diode having an anode connected to ground and a cathode connected to an AC signal side, a λ/4 line having one end connected to a cathode of the diode, a conductor opposing the λ/4 line and a capacitor connected between the other end of the λ/4 line and ground.

69. A power supply apparatus according to claim 68; wherein the diode comprises a MOSFET.

70. A power supply apparatus according to claim 37; wherein the electromagnetic energy conversion unit comprises an antenna.

71. An electronic device comprising: a power supply apparatus according to claim 37; and an electronic circuit driven by the DC power output by the power supply apparatus.

72. An electronic wristwatch comprising: a case; a power supply apparatus according to claim 37 provided in the case; and a time counting mechanism provided in the case and being driven by the DC power output by the power supply apparatus.

73. An electronic wristwatch according to claim 72; wherein the electronic energy conversion unit comprises an antenna formed on a dial of the wristwatch.

74. An electronic wristwatch according to claim 72; wherein the electronic energy conversion unit comprises an electrode provided on the case for coming into contact with a human body when the wristwatch is being worn.

75. A power supply apparatus comprising: an input terminal that is brought into contact with a human body to input electromagnetic energy from a radio wave propagating in the air via the human body; a rectifier unit for rectifying AC power input from the input terminal and outputting DC power; a voltage step-up circuit for stepping up a voltage of the DC power; a storage battery connected to be charged with the rectified DC power and which discharges the charged DC power to a load; and a control unit for controlling the charging and discharging of the storage battery.

76. A power supply apparatus according to claim 75; wherein the input terminal comprises a positive electrode terminal and a negative electrode terminal each of which comes into contact with the human body; and wherein the electrode terminals have a circular shape and are concentrically arranged or spaced apart.

77. A power supply apparatus according to claim 75; further comprising a matching unit or performing impedance matching between and the rectifier unit and one of the input terminal and the electromagnetic energy conversion unit.

78. A power supply apparatus according to claim 77; wherein the matching unit comprises a resistor.

79. A power supply apparatus according to claim 77; wherein the matching unit is a series resonance circuit having a capacitor and an inductor.

80. A power supply apparatus according to claim 77; wherein the matching unit is a resonance circuit having a capacitor and an inductor.

81. A power supply apparatus according to claim 75; wherein the control unit comprises two backflow prevention rectifier elements that perform rectification toward the storage battery, and the voltage step-up circuit is connected to an input terminal side of one of the backflow prevention rectifier elements.

82. A power supply apparatus according to claim 81; wherein the control unit further comprises monitoring means for monitoring an input voltage of the DC power, terminating an operation of the voltage step-up circuit if the input voltage is higher than a predetermined value so that the input DC power is directly supplied to the storage battery, and controlling an operation of the Voltage step-up circuit to step up the input voltage if the input voltage is lower than the predetermined value.

83. A power supply apparatus according to claim 82; wherein the control unit further comprises a storage battery voltage monitoring means for monitoring a storage battery voltage and terminating driving of the voltage step-up circuit if the storage battery voltage is a predetermined value or more.

84. A power supply apparatus according to claim 75; wherein the voltage step-up circuits of a switched capacitor type having one or more stages each comprising a switch element connected to a capacitor and an oscillation circuit for generating a clock signal for controlling a timing of a step-up operation performed by the voltage-step up circuit.

85. A power supply apparatus according to claim 84; wherein the voltage step-up circuit further comprises a buffer circuit connected to an output of the oscillation circuit for amplifying a potential at one end of the capacitor in accordance with the clock signal, a power supply of the buffer circuit being connected to an output side of the rectifier unit so that the buffer circuit is operated by the DC power.

86. A power supply apparatus according to claim 84; wherein the voltage step-up circuit comprises a plurality of the stages, and the switch elements convert a parallel connection of the capacitors of the respective stages into a series connection.

87. A power supply apparatus according to claim 84; further comprising a matching unit for performing impedance matching between the electromagnetic energy conversion unit and the rectifier unit.

88. A power supply apparatus according to claim 87; wherein the oscillation circuit generates a clock signal for controlling the switch element of each stage from an RF signal output by the matching unit.

89. A power supply apparatus according to claim 84; wherein the voltage step-up circuit further comprises a plurality of half wave rectifier circuits for outputting rectifier signals having phases shifted from each other by 180°, and the oscillator circuit generates the clock signal from the rectifier signals for controlling the switch element of each stage of the voltage step-up circuit.

90. A power supply apparatus according to claim 84; wherein the control unit further comprises an additional one or more voltage step-up circuit electrically connected in parallel, each of the voltage step-up circuits includes a backflow prevention element, and the clock signal is applied to each of the voltage step-up circuits with different phases to sequentially operate the respective voltage step-up circuits.

91. A power supply apparatus according to claim 75; wherein the rectifier unit comprises a half wave voltage-doubler rectifier circuit comprised of first diode and a second diode connected together in a forward direction.

92. A power supply apparatus according to claim 91; wherein a ratio If/IR of a forward current to a reverse current of one of the first and second diodes is smaller than If/IR of the other of the first and second diodes.

93. A power supply apparatus according to claim 92; wherein at least one of the first and second diodes comprises a MOSFET.

94. A power supply apparatus according to claim 75; wherein the rectifier unit comprise a single diode and an inductor for biasing the diode.

95. A power supply apparatus according to claim 94; wherein the diode comprises a MOSFET.

96. A power supply apparatus according to claim 75; wherein the rectifier unit comprises a diode having an anode connected to ground and a cathode connected to an AC signal side, a λ/4 line having one end connected to a cathode of the diode, a conductor opposing the λ/4 line, and a capacitor connected between the other end of the λ/4 line and ground.

97. A power supply apparatus according to claim 96; wherein the diode comprises a MOSFET.

98. An electronic device comprising: a power supply apparatus according to claim 75; and an electronic circuit driven by the DC power.

99. An electronic wristwatch comprising: a case; a power supply apparatus according to claim 75 provided in the case; and a time counting mechanism provided in the case and being driven by the DC power output by the power supply apparatus.

100. An electronic wristwatch according to claim 99; wherein the electronic energy conversion unit comprises an antenna formed on a dial of the wristwatch.

101. An electronic wristwatch according to claim 99; wherein the electronic energy conversion unit comprises an electrode provided on the case for coming into contact with a human body when the wristwatch is being worn.

* * * * *